US012786540B2

(12) United States Patent
Cheng et al.

(10) Patent No.: US 12,786,540 B2
(45) **Date of Patent: *Nov. 3, 2026**

(54) LENS ASSEMBLY, OPTICAL UNIT AND ELECTRONIC DEVICE

(71) Applicant: LARGAN PRECISION CO., LTD., Taichung City (TW)

(72) Inventors: Jyun-Jia Cheng, Taichung City (TW); Yu Chen Lai, Taichung City (TW); Ming-Ta Chou, Taichung City (TW); Cheng-Feng Lin, Taichung City (TW); Chen-Yi Huang, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 369 days.

This patent is subject to a terminal disclaimer.

(21) Appl. No.: 18/424,410

(22) Filed: Jan. 26, 2024

(65) Prior Publication Data

US 2024/0196074 A1 Jun. 13, 2024

Related U.S. Application Data

(63) Continuation of application No. 17/523,758, filed on Nov. 10, 2021, now Pat. No. 11,924,534.

(Continued)

(51) Int. Cl.
*H04N 23/55* (2023.01)
*G02B 5/00* (2006.01)

(Continued)

(52) U.S. Cl.
CPC ............. *H04N 23/55* (2023.01); *G02B 5/005* (2013.01); *G02B 5/208* (2013.01); *G02B 7/022* (2013.01)

(58) Field of Classification Search
CPC ........ H04N 23/55; G02B 5/005; G02B 5/208; G02B 7/022; G02B 27/0018;

(Continued)

(56) References Cited

U.S. PATENT DOCUMENTS 4,615,603 A 10/1986 Kitagishi et al.
8,031,412 B2 10/2011 Shintani (Continued)

FOREIGN PATENT DOCUMENTS

CN 205608268 U 9/2016
CN 104317164 B 3/2018

(Continued)

OTHER PUBLICATIONS

Taiwan Office Action dated Nov. 20, 2023 in application No. TW111149602.

(Continued)

*Primary Examiner* — Sinh Tran
*Assistant Examiner* — Zhenzhen Wu
(74) *Attorney, Agent, or Firm* — Maschoff Brennan

(57) ABSTRACT

This disclosure provides a lens assembly that has an optical path and includes a lens element and a light-blocking membrane layer. The lens element has an optical portion, and the optical path passes through the optical portion. The light-blocking membrane layer is coated on the lens element and adjacent to the optical portion. The light-blocking membrane layer has a distal side and a proximal side that is located closer to the optical portion than the distal side. The proximal side includes two extension structures and a recessed structure. Each of the extension structures extends along a direction away from the distal side, and the extension structures are not overlapped with each other in a direction in parallel with the optical path. The recessed (Continued)

structure is connected to the extension structures and recessed along a direction towards the distal side.

26 Claims, 63 Drawing Sheets

Related U.S. Application Data

(60) Provisional application No. 63/222,829, filed on Jul. 16, 2021.

(51) Int. Cl.
*G02B 5/20* (2006.01)
*G02B 7/02* (2021.01)

(58) Field of Classification Search
CPC .......... G02B 13/002; G02B 1/10; G02B 5/00; G02B 13/0055; G02B 13/0065; G02B 13/18; G03B 17/12; G03B 17/17
See application file for complete search history.

(56) References Cited

U.S. PATENT DOCUMENTS

| | | | | |
|---|---|---|---|---|
| 8,102,609 | B2 | 1/2012 | Tsuchiya et al. | |
| 9,207,364 | B2 | 12/2015 | Yang et al. | |
| 2009/0185291 | A1 | 7/2009 | Tsuchiya et al. | |
| 2011/0242684 | A1 | 10/2011 | Shinohara | |
| 2014/0198355 | A1* | 7/2014 | Miwa | G01J 1/0411 358/482 |
| 2015/0077841 | A1* | 3/2015 | Matsuo | G02B 5/003 359/359 |
| 2015/0253576 | A1* | 9/2015 | Sugihara | G02B 5/04 359/633 |
| 2015/0309225 | A1 | 10/2015 | Moore | |
| 2016/0011415 | A1 | 1/2016 | Takada | |
| 2016/0170204 | A1 | 6/2016 | Liang | |
| 2021/0048665 | A1 | 2/2021 | Nakamura et al. | |
| 2021/0063617 | A1* | 3/2021 | Yang | G02B 5/208 |
| 2022/0308271 | A1* | 9/2022 | Hanato | G02B 5/003 |

FOREIGN PATENT DOCUMENTS

| | | | |
|---|---|---|---|
| CN | 105190390 | B | 7/2018 |
| CN | 208351037 | U | 1/2019 |
| CN | 105093371 | B | 6/2019 |
| CN | 107305290 | B | 11/2019 |
| CN | 111070742 | A | 4/2020 |
| TW | I582514 | B | 5/2017 |

OTHER PUBLICATIONS

Indian Examination Report issued in corresponding application No. 202234008778, dated Feb. 16, 2023.

CN Office Action dated Nov. 14, 2025 in application No. 202111254263.1.

EU Examination Search Report dated Dec. 5, 2025 in application No. 21214009.9.

EU Examination Report dated Oct. 24, 2024 in application 21214009.9.

* cited by examiner

LENS ASSEMBLY, OPTICAL UNIT AND ELECTRONIC DEVICE

RELATED APPLICATIONS

This application is a continuation patent application of U.S. application Ser. No. 17/523,758 filed on Nov. 10, 2021, which claims priority to U.S. Provisional Application 63/222,829, filed on Jul. 16, 2021, which is incorporated by reference herein in its entirety.

BACKGROUND

Technical Field

The present disclosure relates to a lens assembly, an optical unit and an electronic device, more particularly to a lens assembly and an optical unit applicable to an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, conventional optical systems are difficult to meet the requirement of high optical quality of an electronic device under diversified development in recent years, especially a light-blocking membrane layer disposed on a lens element for eliminating stray light. Conventional light-blocking membrane layer usually has shortcomings of poor blocking-range controlling, over light blocking or severe decline of passable light, thereby unable to meet the optical quality requirement in the market of the current technology trends. Therefore, how to improve the light-blocking membrane layer to accurately control light-blocking range so as to obviously eliminate stray light for meeting the requirement of high-end-specification electronic devices is an important topic in this field nowadays.

SUMMARY

According to one aspect of the present disclosure, a lens assembly has an optical path, and the lens assembly includes a lens element and a light-blocking membrane layer. The lens element has an optical portion, and the optical path passes through the optical portion. The light-blocking membrane layer is coated on the lens element and adjacent to the optical portion. The light-blocking membrane layer has a distal side and a proximal side. The proximal side is located closer to the optical portion than the distal side. The proximal side includes two extension structures and a recessed structure. The extension structures extend along a direction away from the distal side, and the extension structures are not overlapped with each other in a direction in parallel with the optical path. The recessed structure is connected to the extension structures and recessed along a direction towards the distal side. When a shortest distance between the two extension structures at a side farthest from the distal side is ΔG, the following condition is satisfied: $0.1\ [\mathrm{um}] \leq \Delta G \leq 299.5\ [\mathrm{um}]$.

According to another aspect of the present disclosure, a lens assembly has an optical path, and the lens assembly includes a reflection component and a light-blocking membrane layer. The reflection component has an optical portion, and the optical path passes through the optical portion. The light-blocking membrane layer is coated on the reflection component and adjacent to the optical portion. The light-blocking membrane layer has a distal side and a proximal side. The proximal side is located closer to the optical portion than the distal side. The proximal side includes two extension structures and a recessed structure. The extension structures extend along a direction away from the distal side, and the extension structures are not overlapped with each other in a direction in parallel with the optical path. The recessed structure is connected to the two extension structures and recessed along a direction towards the distal side. When a shortest distance between the two extension structures at a side farthest from the distal side is ΔG, the following condition is satisfied: $0.1\ [\mathrm{um}] \leq \Delta G \leq 299.5\ [\mathrm{um}]$.

According to another aspect of the present disclosure, a lens assembly has an optical path, and the lens assembly includes a light-transmittable component and a light-blocking membrane layer. The light-transmittable component has an optical portion, and the optical path passes through the optical portion. The light-blocking membrane layer is coated on the light-transmittable component and adjacent to the optical portion. The light-blocking membrane layer has a distal side and a proximal side. The proximal side is located closer to the optical portion than the distal side. The proximal side includes two extension structures and a recessed structure. The extension structures extend along a direction away from the distal side, and the two extension structures are not overlapped with each other in a direction in parallel with the optical path. The recessed structure is connected to the two extension structures and recessed along a direction towards the distal side. When a shortest distance between the two extension structures at a side farthest from the distal side is ΔG, the following condition is satisfied: $0.1\ [\mathrm{um}] \leq \Delta G \leq 299.5\ [\mathrm{um}]$.

According to another aspect of the present disclosure, a lens assembly has an optical path, and the lens assembly includes a light-transmittable component and a light-blocking membrane layer. The light-transmittable component has an optical portion, and the optical path passes through the optical portion. The light-blocking membrane layer is coated on the light-transmittable component and adjacent to the optical portion. The light-blocking membrane layer further has a plurality of light-blocking areas that are spaced apart from one another. The plurality of light-blocking areas include a first light-blocking area and a second light-blocking area. The first light-blocking area is located closer to the optical path than the second light-blocking area. When a shortest distance between the first light-blocking area and rest areas of the light-blocking membrane layer is D1, and a shortest distance between the second light-blocking area and rest areas of the light-blocking membrane layer is D2, the following condition is satisfied: $0.15 \leq D2/D1 \leq 1.5$.

According to another aspect of the present disclosure, a lens assembly has an optical path, and the lens assembly includes a light-transmittable component and a light-blocking membrane layer. The light-transmittable component has an optical portion, and the optical path passes through the optical portion. The light-blocking membrane layer is coated on the light-transmittable component and adjacent to the optical portion. The light-transmittable component further has a first light-passable opening and a second light-passable opening that are surrounded by the light-blocking membrane layer. The first light-passable opening is closer to the optical path than the second light-passable opening. A reference plane perpendicular to the optical path is defined. When a projection area of the first light-passable opening on the reference plane is HA1, a shortest distance between the first light-passable opening and the optical path on the reference plane is HD1, a projection area of the second light-passable opening on the reference plane is HA2, and a shortest distance between the second light-passable opening and the optical path on the reference plane is HD2, the following condition is satisfied: $0.02 \leq (HA2^{0.5}/HD2)/(HA1^{0.5}/HD1) \leq 0.98$.

According to another aspect of the present disclosure, an optical unit includes one of the aforementioned lens assemblies.

According to another aspect of the present disclosure, an electronic device includes the aforementioned optical unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
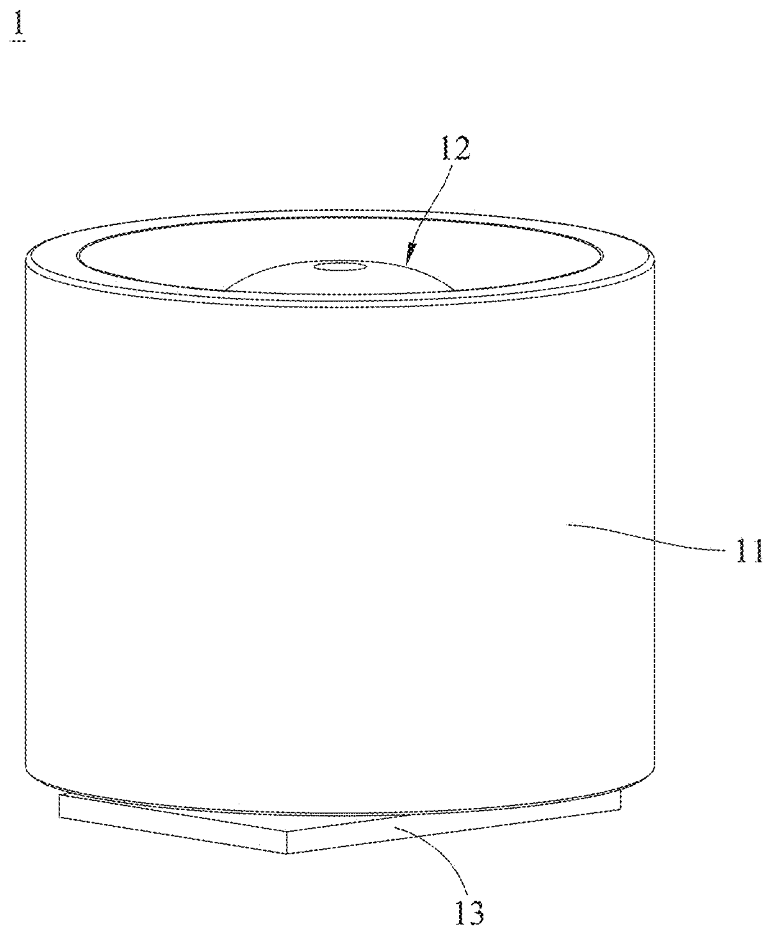
FIG. 1 is an isometric view of an optical unit according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a lens assembly that can be applied to an imaging system or a light emitting system. The imaging system can be an image lens module with an auto focus function or an optical image stabilization function, but the present disclosure is not limited thereto. The light emitting system can be a projection module or a display module with a zoom function, an aberration correction function or a 3D image generation function, but the present disclosure is not limited thereto.

When the lens assembly is applied to the imaging system, the incident side is considered as an object side, the emitting side is considered as an image side, and an image surface at the image side on which an image sensor is disposed can be defined. When the lens assembly is applied to the light emitting system, a light source can be, but is not limited to, an image source (e.g., liquid crystal module, digital light processing module, etc.), a laser light source, or an ultraviolet/infrared light source that is disposed at the incident side. Light from the light source at the incident side can be converged or diverged by the lens assembly and then emits towards the emitting side. Moreover, lens assembly can also be applied to the imaging system and the light emitting system at the same time, such as a time of flight (ToF) system or a lidar, but the present disclosure is not limited thereto.

The lens assembly has an optical path. The lens assembly includes an optical component and a light-blocking membrane layer. The optical component can be a light-transmittable component for the optical path to pass through or can be a reflection component for changing the direction of the optical path. Moreover, the light-transmittable component can by a lens element, a prism, or a filter, but the present disclosure is not limited thereto. Moreover, the reflection component can have a total reflection surface, a specular reflection surface or a partial reflection surface, but the present disclosure is not limited thereto. Note that the partial reflection means that light is partially reflected but partially passes or is absorbed. Further, light can be selectively and partially reflected according to its characteristics, such as wavelength.

The optical component has an optical portion, and the optical path passes through the optical portion. When the optical component is the lens element, the lens element can be a molded glass lens element which can be manufactured by a compression molding process, an injection molding process, or an injection-compression molding process. When the optical component is a reflection component, the reflection component can have a V-shaped groove. The V-shaped groove can have two light-blocking surfaces that are gradually spaced apart from each other from the optical portion along a direction away from the optical path. Moreover, the V-shaped groove can further have a plurality of curved protrusions that are sequentially arranged and are connected to the light-blocking surfaces.

The optical component can have at least one aspheric surface where the optical portion can pass. When the optical component is the reflection component, the aspheric surface of the reflection component can provide a light convergence function or a light divergence function so as to reduce the quantity of the components in the lens assembly. Moreover, the aspheric surface can also be a freeform surface.

The optical component can further have an optical surface and a connection surface. The optical portion can pass to the optical surface. The optical portion can generate refraction or reflection on the optical surface. Specifically, the surface shape of the optical surface can be, but is not limited to, a flat surface, a spherical surface, or an aspheric surface, and the optical surface can be, but is not limited to, a light-transmittable surface, a reflective surface, or a light splitting surface. The connection surface can be connected to the optical surface with a boundary therebetween. The boundary can be generated by two non-parallel planes, a chamfer, a rounded corner, or any method to connect two surfaces.

The optical component can further have an incident surface, at least one reflection surface and an emitting surface that are sequentially passed by the optical portion along the optical path.

The optical component can further have an edge portion that is recessed along a direction towards the optical path or protruded along a direction away from the optical path. The edge portion can be configured to correspond to a counterpart portion of a carrier, and the edge portion can be configured to be disposed opposite to the counterpart portion so that the optical component is accommodated in the carrier. Therefore, it is favorable for positioning the orientation of the optical component with respect to the carrier.

The optical component can further have a first light-passable opening and a second light-passable opening that are surrounded by the light-blocking membrane layer, and the first light-passable opening is closer to the optical path than the second light-passable opening. Therefore, it is favorable for increasing the light amount passing through the edge of the optical portion so as to increase optical quality.

The light-blocking membrane layer is coated on the optical component and is adjacent to the optical portion. Moreover, the light-blocking membrane layer can also be coated on the edge portion of the optical component. Therefore, it is favorable for preventing generating stray light at the edge portion. Moreover, the light-blocking membrane layer can also be coated on the optical surface and the boundary at the same time. Since stray light may be easily generated on two connected surfaces of the optical component at a side close to the boundary due to a relatively large change of lens surface, coating the light-blocking membrane layer on the optical surface and the boundary at the same time can reduce the stray light. Moreover, the light-blocking membrane layer can also be coated on at least one of the two light-blocking surfaces of the V-shaped groove. Moreover, the light-blocking membrane layer can also be coated on the plurality of curved protrusions of the V-shaped groove so as to form extension structures and recessed structure which will be descried later.

Figure 79:
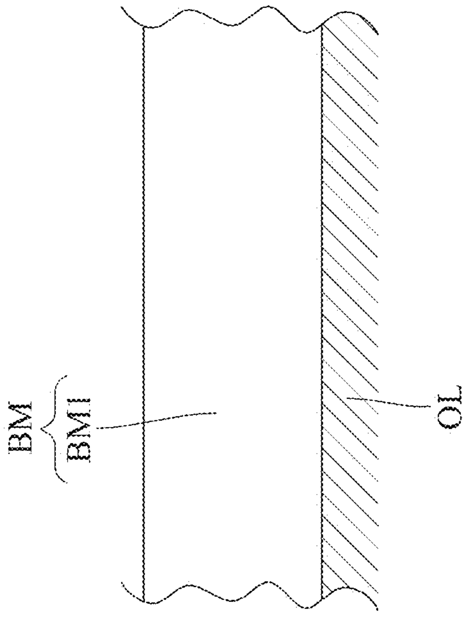
FIG. 79 shows a light-blocking membrane layer coated on an optical component according to the present disclosure.

The light-blocking membrane layer can be a single-layer membrane including a light-blocking layer with a light blocking function. In detail, the light-blocking layer can be a black coating that achieves the purpose of blocking light by absorbing visible light. The light-blocking layer can also be a neutral-density coating that achieves the purpose of blocking light by preventing light from passing through. However, the abovementioned methods and coatings are not intended to limit the present disclosure. The light-blocking layer can have different degrees of light-blocking due to different light-blocking methods and manufacturing processes, and light with specific wavelengths can selectively pass through. The light-blocking layer can have various light-blocking characteristics at the same time so as to further increase optical quality. Please refer to FIG. 79, which shows the light-blocking membrane layer BM coated on the optical component OL, wherein the light-blocking membrane layer BM in FIG. 79 is a single-layer membrane including the light-blocking layer BM1. However, the thickness of the layer in FIG. 79 is not intended to limit the present disclosure.

Figure 80:
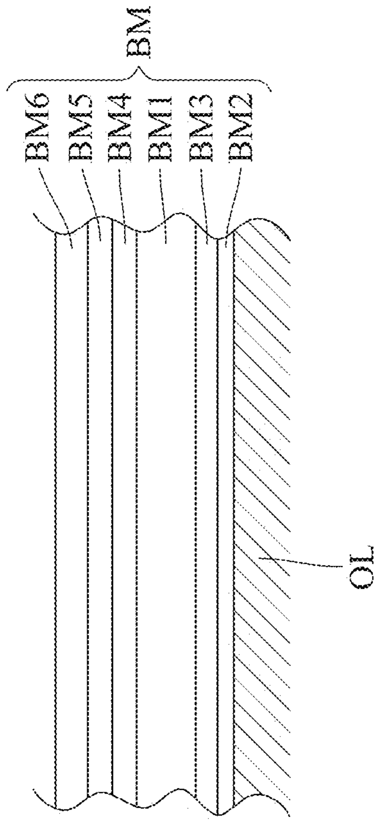
FIG. 80 shows another light-blocking membrane layer coated on an optical component according to the present disclosure.

The light-blocking membrane layer can also be formed by stacking a plurality of layers. In addition to a light-blocking layer, the plurality of layers can further include, but is not limited to, various layers, such as an interlayer, an insulation layer, an ultraviolet/infrared (UV/IR) resistance layer, an anti-reflection layer, and a hydrophobic layer. Therefore, it is favorable for achieving more effects such as better light-blocking, increased adhesion, and longer life span. However, the abovementioned effects are not intended to limit the present disclosure. Please refer to FIG. 80, which shows the light-blocking membrane layer BM coated on the optical component OL, wherein the light-blocking membrane layer BM is formed by stacking a plurality of layers including the interlayer BM2, the IR resistance layer BM3, the light-blocking layer BM1, the UV resistance layer BM4, the anti-reflection layer BM5, and the hydrophobic layer BM6. However, the stacking sequence and the thicknesses of the layers in FIG. 80 are not intended to limit the present disclosure.

The light-blocking membrane layer can also include a photosensitive layer, such that the light-blocking membrane layer can be patterned by irradiating light with specific wavelengths so as to control the light-blocking range in the circumferential direction. Therefore, it is favorable for increasing the precision and quality of light-blocking. Moreover, the photosensitive layer can be a light-blocking layer or an interlayer, but the present disclosure is not limited thereto. When the photosensitive layer is the light-blocking layer, a patterned surface with high-precision can be formed by irradiating light with specific wavelengths so as to increase optical quality. When the photosensitive layer is the interlayer, the patterned light-blocking layer can be coated through the difference in affinity so as to increase optical quality. Moreover, the light-blocking membrane layer can further include a cover layer which insulates the photosensitive layer from air. Therefore, it is favorable for protecting the photosensitive layer. Note that the cover layer can have functions such as air insulation and UV/IR resistance and can further have other functions such as anti-reflection, anti-fouling, and hydrophobic. For example, the anti-reflection layer BM5 and the hydrophobic layer BM6 in FIG. 80. However, the present disclosure is not limited thereto.

Figure 83:
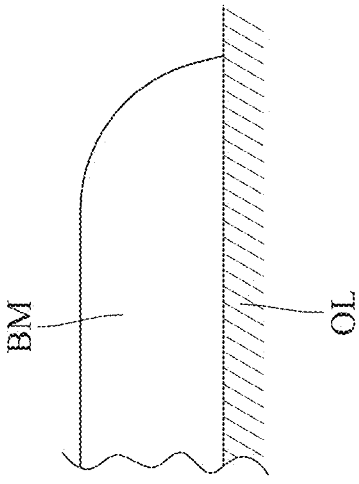
FIG. 83 shows a vertical edge of further another light-blocking membrane layer coated on an optical component according to the present disclosure.
Figure 82:
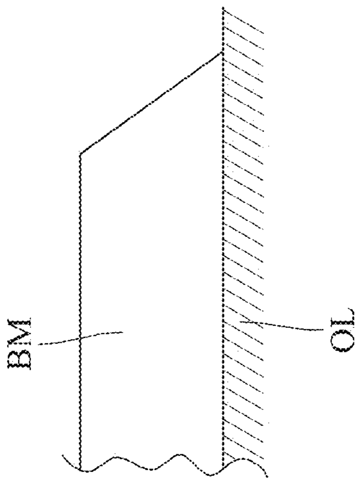
FIG. 82 shows a vertical edge of another light-blocking membrane layer coated on an optical component according to the present disclosure.
Figure 81:
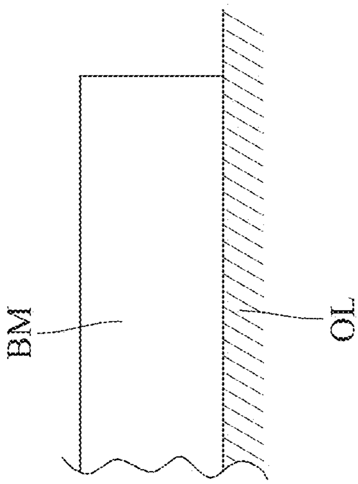
FIG. 81 shows a vertical edge of a light-blocking membrane layer coated on an optical component according to the present disclosure.

The light-blocking membrane layer coated on the optical component can have an edge with a vertical surface. Therefore, it is favorable for simplifying the manufacturing process and increasing manufacturing efficiency. Please refer to FIG. 81, which shows the vertical edge of the light-blocking membrane layer BM coated on the optical component OL. Alternatively, the light-blocking membrane layer coated on the optical component can have an edge with an inclined surface or a curved surface. Therefore, it is favorable for further reducing stray light generated by light passing through the edge so as to increase optical quality. Please refer to FIG. 82 to FIG. 83, which respectively show the inclined edge and the curved edge of the light-blocking membrane layer BM coated on the optical component OL.

The light-blocking membrane layer can have a distal side and a proximal side. The proximal side is located closer to the optical portion than the distal side. The proximal side can include two extension structures and a recessed structure. Each of the extension structures can extend along a direction away from the distal side, and the extension structures can be not overlapped with one another in a direction in parallel with the optical path. The recessed structure can be connected to the extension structures and can be recessed along a direction towards the distal side. Therefore, it is favorable for preventing light diffraction while effectively blocking unwanted light, thereby ensuring optical quality. It is noted that the unwanted light can be stray light generated on the image surface in the imaging system or can generate light spots on the projection surface in the light emitting system, but the present disclosure is not limited thereto. Moreover, the extension structures can also be coated on part of the optical surface. Moreover, the extension structures can be disposed at a side of the V-shaped groove close to the optical path. Moreover, the extension structures can be disposed at least one of the incident surface, the at least one reflection surface and the emitting surface.

The light-blocking membrane layer can further have a plurality of light-blocking areas. Therefore, it is favorable for improving optical quality at periphery of the optical portion. The light-blocking areas can be spaced apart from one another. The light-blocking areas can include a first light-blocking area and a second light-blocking area, and the first light-blocking area is located closer to the optical path than the second light-blocking area. Moreover, the light-blocking areas can be disposed on at least one of the incident surface, the at least one reflection surface and the emitting surface.

A thickness of the light-blocking membrane layer can gradually decrease from the recessed structure to the extension structures. That is, a thickness of the light-blocking membrane layer can gradually increase from a side of the extension structures close to the optical path towards the recessed structure. Therefore, it is favorable for increasing dimensional accuracy of the extension structures so as to ensure optical quality. Moreover, a thickness of the first light-blocking area can be smaller than a thickness of the second light-blocking area.

When a shortest distance between the extension structures at a side farthest from the distal side is $\Delta G$, the following condition can be satisfied: 0.1 [um]$\leq\Delta G\leq$299.5 [um]. Therefore, it is favorable for controlling the degree of blocking light through changing the distance between the extension structures so as to improve optical quality. Moreover, the following condition can also be satisfied: 0.5 [um]$\leq\Delta G\leq$200 [um]. Moreover, the following condition can also be satisfied: 0.7 [um]$\leq\Delta G\leq$150 [um]. Please refer to FIG. 7, which shows $\Delta G$ according to the 1st embodiment of the present disclosure.

When a shortest distance between the first light-blocking area and rest areas of the light-blocking membrane layer is D1, and a shortest distance between the second light-blocking area and rest areas of the light-blocking membrane layer is D2, the following condition can be satisfied: $0.15\leq D2/D1\leq 1.5$. Therefore, it is favorable for making the transition of light smooth from the center to the edge of the optical portion. Please refer to FIG. 38, which shows D1 and D2 according to the 4th embodiment of the present disclosure. It is noted that the term "rest areas of the light-blocking membrane layer" used herein can be considered as a part of the light-blocking membrane layer without including the first light-blocking area when referring D1 or without including the second light-blocking area when referring D2.

A reference plane perpendicular to the optical path is defined. When a projection area of the first light-passable opening on the reference plane is HA1, a shortest distance between the first light-passable opening and the optical path on the reference plane is HD1, a projection area of the second light-passable opening on the reference plane is HA2, and a shortest distance between the second light-passable opening and the optical path on the reference plane is HD2, the following condition can be satisfied: $0.02\leq(HA2\hat{}0.5/HD2)/(HA1\hat{}0.5/HD1)\leq 0.98$. Therefore, it is favorable for making the transition of light smooth from the center to the edge of the optical portion.

There are a first axis and a second axis defined on the reference plane that is perpendicular to the optical path. The first axis, the second axis and the optical path are perpendicular to one another. The optical portion can be symmetrical with respect to at least one of the first axis and the second axis. Moreover, the edge portion can be spaced apart from the first axis or the second axis. When a width of the optical portion along the first axis is S1, and a width of the optical portion along the second axis is S2, the following condition can be satisfied: $0.3<S1/S2<0.9$. Therefore, it is favorable for making the optical portion to be non-circular so as to reduce the size thereof, and it is also favorable for arranging the edge portion to correspond to the width range of the optical portion so as to further position the optical portion and the carrier in a particular direction. Please refer to FIG. 6, which shows S1 and S2 according to the 1st embodiment of the present disclosure.

When an average thickness of the light-blocking membrane layer is T, the following condition can be satisfied: 0.9 [um]$\leq T\leq$10 [μm]. Therefore, it is favorable for reducing the average thickness of the light-blocking membrane layer under the premise that the light-blocking membrane layer can effectively block light so as to prevent generating stray light due to light passing through the edge of the light-blocking membrane layer.

When a longest distance in parallel with the optical path between the extension structures and the recessed structure is $\Delta H$, the following condition can be satisfied: 0.5 [um] $\leq\Delta H\leq$249.5 [um]. Therefore, it is favorable for increasing the incident amount of oblique light so as to increase the amount of passable light. Moreover, the following condition can also be satisfied: 1 [um]$\leq\Delta H\leq$200 [um]. Moreover, the following condition can also be satisfied: 2 [um]$\leq\Delta H\leq$150 [um]. Note that the junction of the light-blocking membrane layer and the optical component is used for calculating $\Delta H$ if the thickness of the light-blocking membrane layer is not negligible. Please refer to FIG. 10 and FIG. 11, which show $\Delta H$ according to the 1st embodiment of the present disclosure.

When a longest distance in parallel with the optical path between the first light-blocking area and the second light-blocking area is $\Delta Hs$, the following condition can be satisfied: 0.5 [um]$\leq\Delta Hs\leq$249.5 [um]. Therefore, it is favorable for increasing the incident amount of oblique light so as to increase the amount of passable light. Moreover, the following condition can also be satisfied: 1 [um]$\leq\Delta Hs\leq$200 [um]. Moreover, the following condition can also be satisfied: 2 [um]$\leq\Delta Hs\leq$150 [um]. Note that the junction of the light-blocking membrane layer and the optical component is used for calculating $\Delta Hs$ if the thickness of the light-blocking membrane layer is not negligible.

When a longest distance in parallel with the optical path between the first light-passable opening and the second light-passable opening is $\Delta Hh$, the following condition can be satisfied: 0.5 [um]$\leq\Delta Hh\leq$249.5 [um]. Therefore, it is favorable for increasing the incident amount of oblique light so as to increase the amount of passable light. Moreover, the following condition can also be satisfied: 1 [um]$\leq\Delta Hh\leq$200 [um]. Moreover, the following condition can also be satisfied: 2 [um]$\leq\Delta Hh\leq$150 [um]. Note that the junction of the light-blocking membrane layer and the optical component is used for calculating $\Delta Hh$ if the thickness of the light-blocking membrane layer is not negligible.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
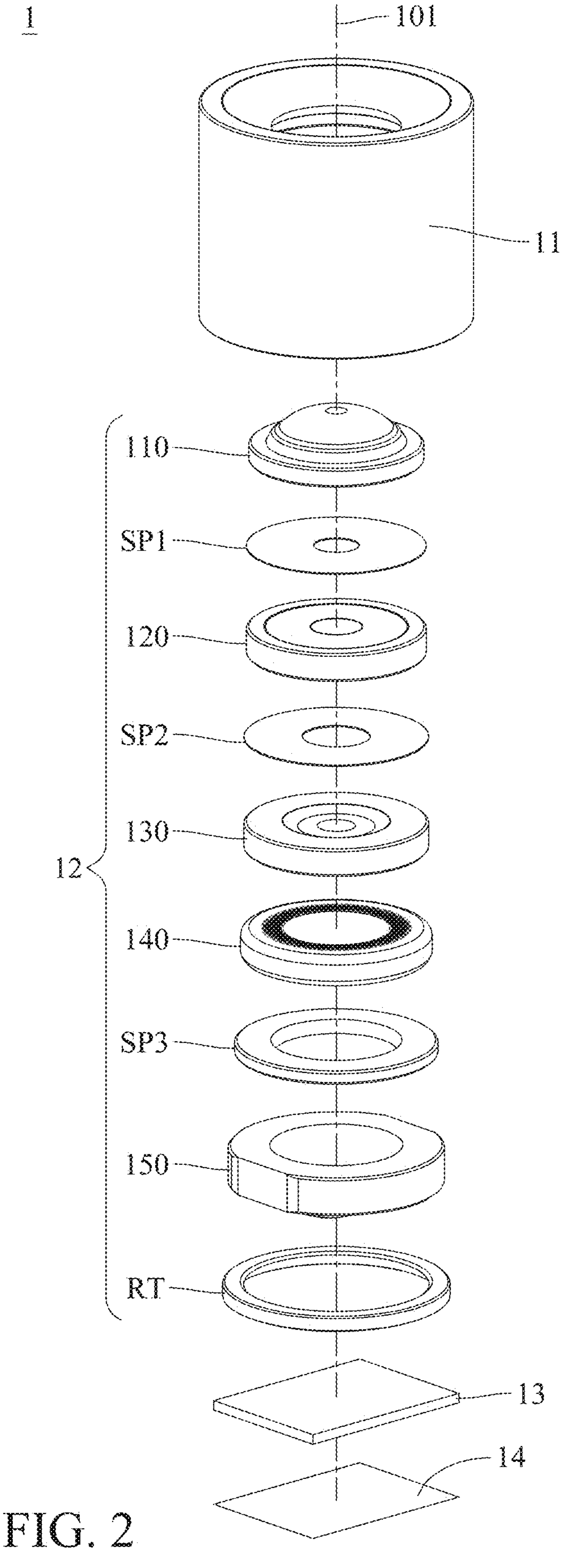
FIG. 2 is an exploded view of the optical unit in FIG. 1.
Figure 3:
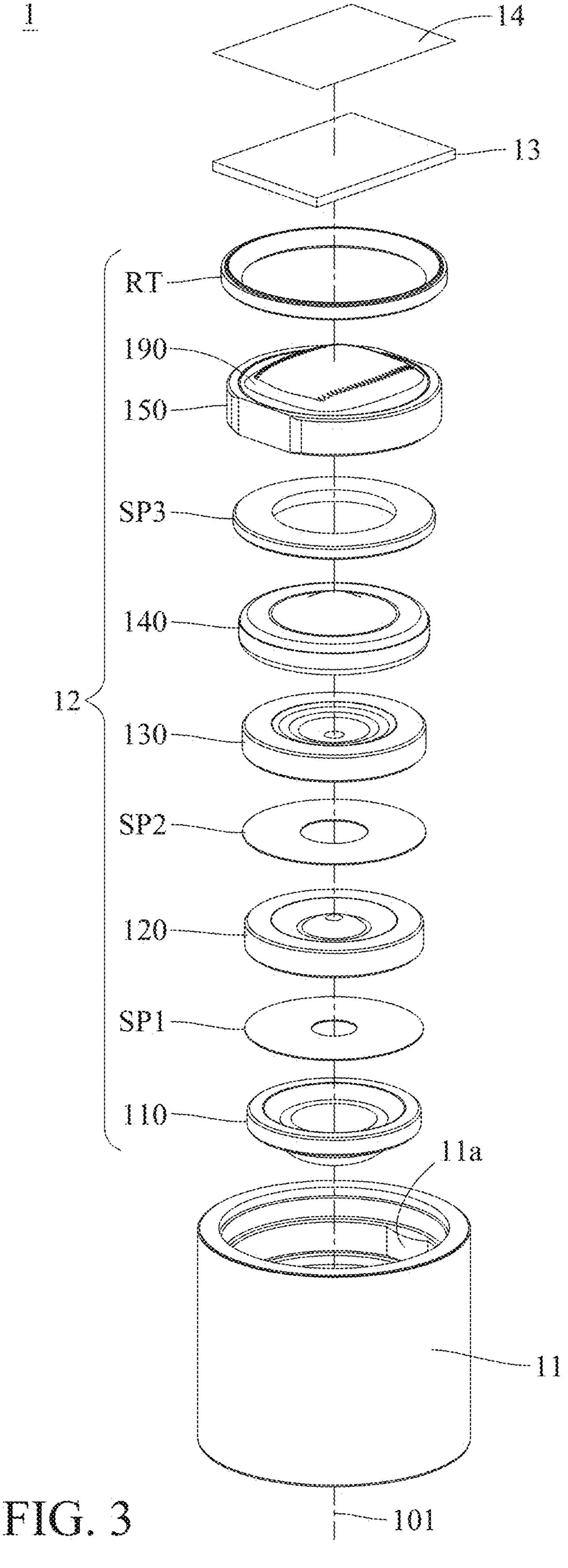
FIG. 3 is another exploded view of the optical unit in FIG. 1.
Figure 4:
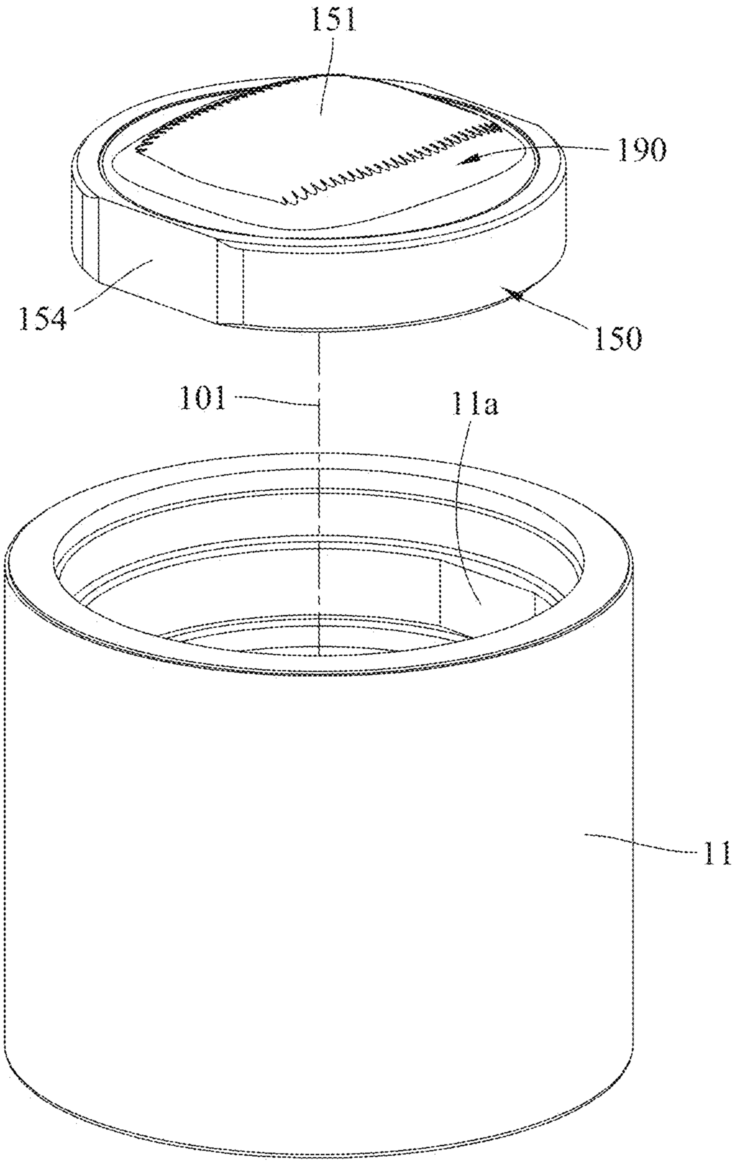
FIG. 4 is a partially exploded view of the optical unit in FIG. 3 for showing a fifth lens element and a carrier thereof.
Figure 5:
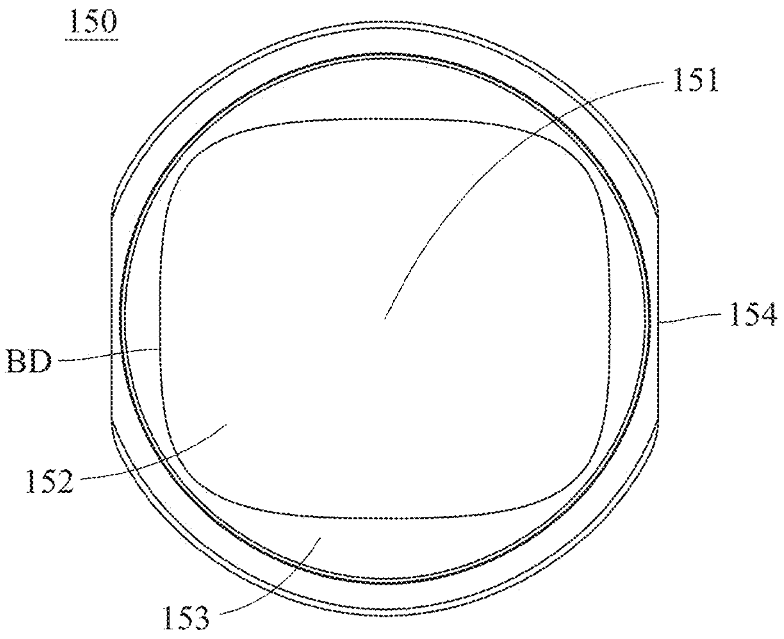
FIG. 5 is an image-side view of the fifth lens element in FIG. 4 with no light-blocking membrane layer coated thereon.
Figure 6:
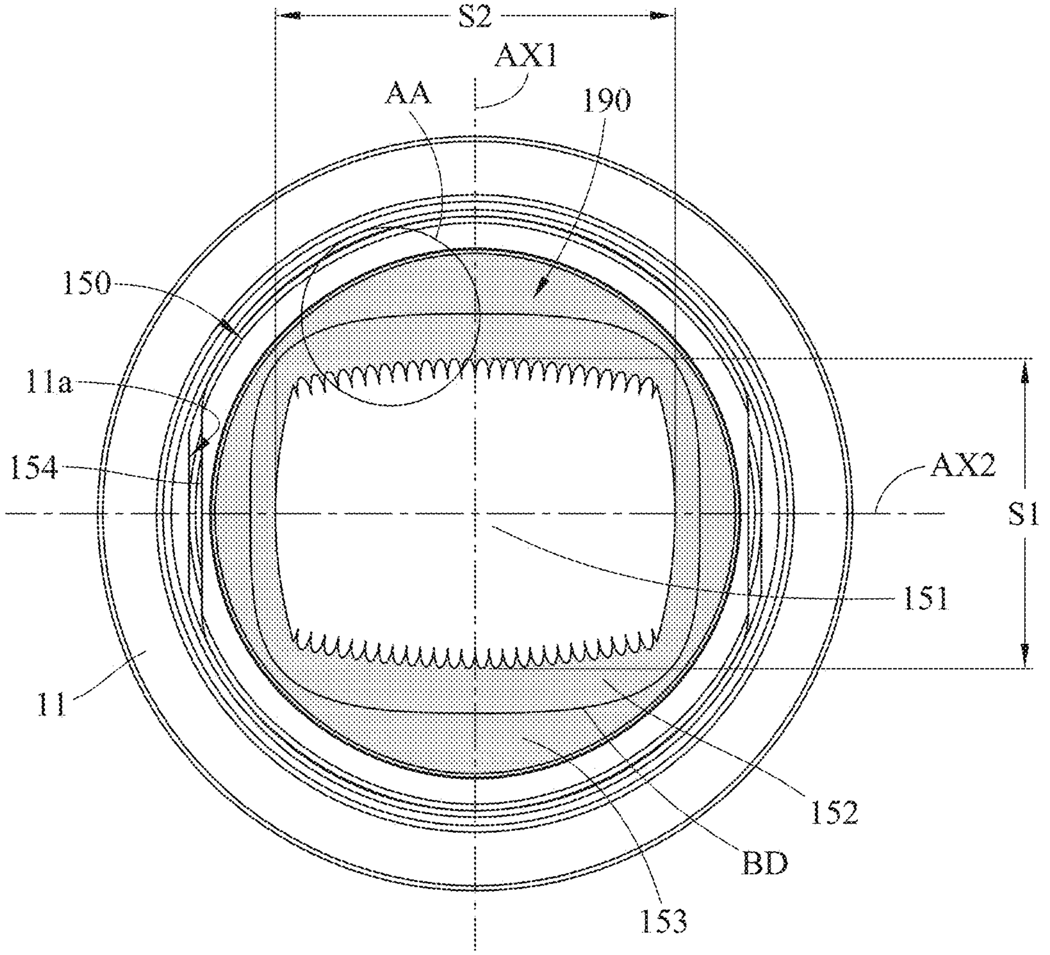
FIG. 6 is an image-side view of the fifth lens element assembled in the carrier in FIG. 4 with a light-blocking membrane layer coated thereon.
Figure 7:
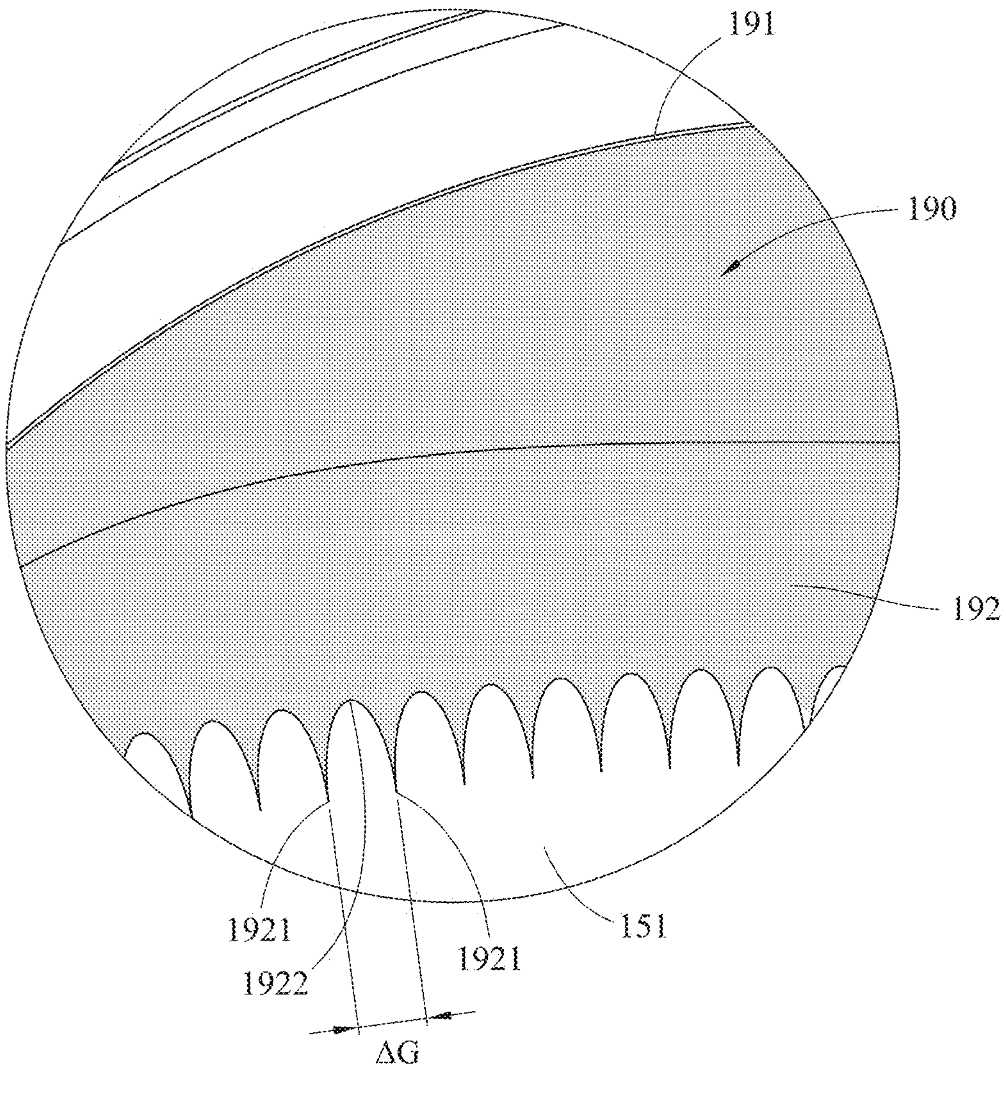
FIG. 7 is an enlarged view of AA region of the fifth lens element in FIG. 6.
Figure 9:
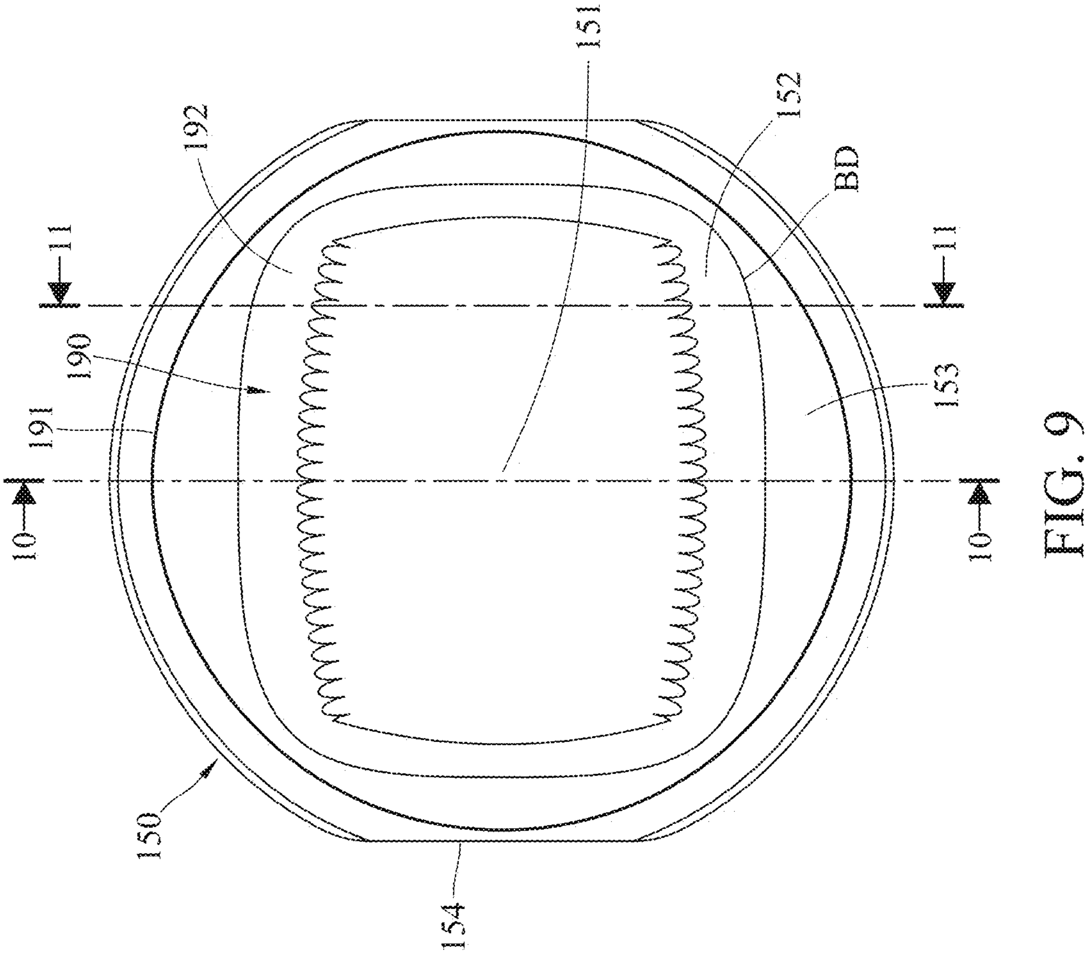
FIG. 9 is an image-side view of the fifth lens element in FIG. 6.
Figure 8:
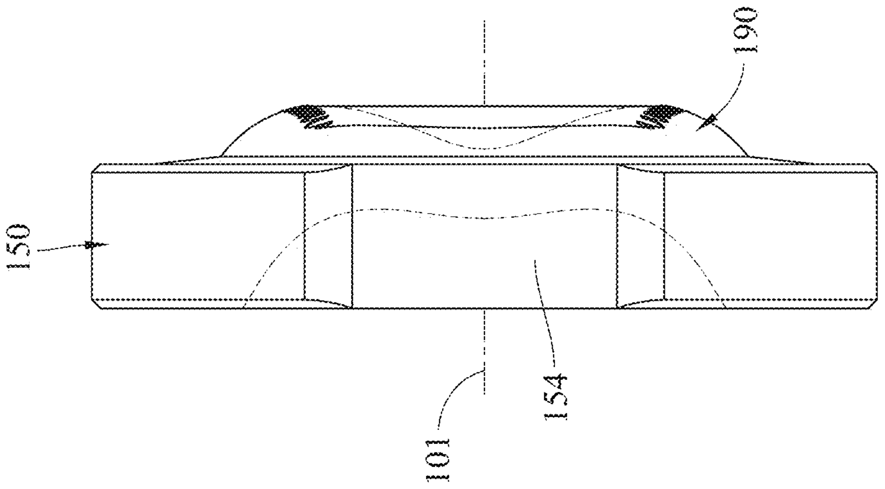
FIG. 8 is a side view of the fifth lens element in FIG. 6.
Figure 11:
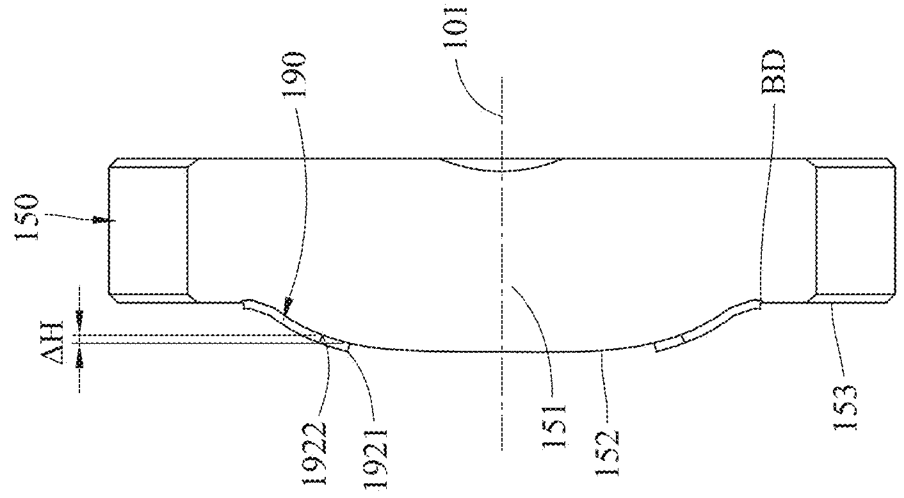
FIG. 11 is a cross-sectional view of the fifth lens element in FIG. 9 taken along line 11-11.
Figure 10:
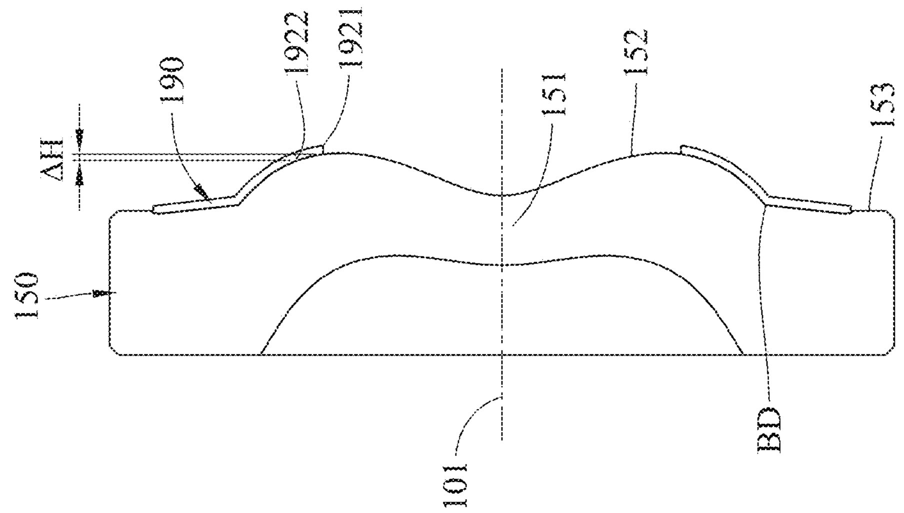
FIG. 10 is a cross-sectional view of the fifth lens element in FIG. 9 taken along line 10-10.

Please refer to FIG. 1 to FIG. 11, where FIG. 1 is an isometric view of an optical unit according to the 1st embodiment of the present disclosure, FIG. 2 is an exploded view of the optical unit in FIG. 1, FIG. 3 is another exploded view of the optical unit in FIG. 1, FIG. 4 is a partially exploded view of the optical unit in FIG. 3 for showing a fifth lens element and a carrier thereof, FIG. 5 is an image-side view of the fifth lens element in FIG. 4 with no light-blocking membrane layer coated thereon, FIG. 6 is an image-side view of the fifth lens element assembled in the carrier in FIG. 4 with a light-blocking membrane layer coated thereon, FIG. 7 is an enlarged view of AA region of the fifth lens element in FIG. 6, FIG. 8 is a side view of the fifth lens element in FIG. 6, FIG. 9 is an image-side view of the fifth lens element in FIG. 6, FIG. 10 is a cross-sectional view of the fifth lens element in FIG. 9 taken along line 10-10, and FIG. 11 is a cross-sectional view of the fifth lens element in FIG. 9 taken along line 11-11.

In this embodiment, the optical unit 1 is an image lens. The optical unit 1 includes a carrier 11, a lens assembly 12 and a filter 13 and has an image surface 14. The carrier 11 has a counterpart portion 11*a* that is a flat area at the inner side of the carrier 11 for easily accommodating and positioning the lens assembly 12 in the carrier 11. The lens assembly 12 has an optical path 101 and includes, in order from an object side to an image side along the optical path 101, a first lens element 110, a first spacer SP1, a second lens element 120, a second spacer SP2, a third lens element 130, a fourth lens element 140, a third spacer SP3, a fifth lens element 150, a light-blocking membrane layer 190 and a retainer RT. The filter 13 is located at an image side of the lens assembly 12. The image surface 14 is located at an image side of the filter 13. Light will be converged and then image on the image surface 14 after passing through the lens assembly 12. When a maximum image height of the lens assembly 12 is 5.0 millimeters (mm), half of a maximum field of view (HFOV) is correspondingly 60.0 degrees, and the optical unit 1 is therefore an ultra-wide-angle lens.

There are a first axis AX1 and a second axis AX2 defined on a reference plane that is perpendicular to the optical path 101, and the first axis AX1, the second axis AX2 and the optical path 101 are perpendicular to one another.

The fifth lens element 150 has an optical portion 151 that is symmetrical with respect to the first axis AX1 and the second axis AX2, and the optical path 101 passes through the optical portion 151. The fifth lens element 150 further has an optical surface 152 and a connection surface 153 at an image side thereof. The optical surface 152 is a light-passable aspheric surface; more specifically, the optical surface 152 is a freeform surface. The optical portion 151 passes through the optical surface 152, and the optical portion 151 generates refraction on the optical surface 152. The connection surface 153 is connected to the optical surface 152 with a boundary BD therebetween.

The fifth lens element 150 further has two edge portions 154 that are recessed along the second axis AX2 towards the optical path 101 and are spaced apart from the first axis AX1. The edge portions 154 correspond to counterpart portions 11*a* of the carrier 11 and are disposed opposite to the counterpart portions 11*a* so that the fifth lens element 150 is easily accommodated and positioned in the carrier 11 for increasing manufacturing efficiency.

The light-blocking membrane layer 190 is surrounding and disposed adjacent to the optical portion 151 and is coated on the optical surface 152, the boundary BD and the connection surface 153 of the fifth lens element 150 so as to reduce stray light generated at the boundary BD and thus increase optical quality. Please refer to FIG. 5 to FIG. 6, which show the steps before and after coating the light-blocking membrane layer 190 on the fifth lens element 150.

The light-blocking membrane layer 190 has a distal side 191 and a proximal side 192 respectively at two ends thereof along the first axis AX1. The proximal side 192 is located closer to the optical portion 151 than the distal side 191. The proximal side 192 includes a plurality of extension structures 1921 and a plurality of recessed structures 1922. The extension structures 1921 and the recessed structures 1922 are disposed on the optical surface 152. Each of the extension structures 1921 extends along a direction away from the distal side 191, and the extension structures 1921 are not overlapped with one another in a direction in parallel with the optical path 101. The recessed structures 1922 are connected to and located between two adjacent extension structures 1921 and are recessed along a direction towards the distal side 191.

A thickness of the light-blocking membrane layer 190 gradually decreases from the recessed structures 1922 to the extension structures 1921. In other words, a thickness of the light-blocking membrane layer 190 gradually increases from a side of the extension structures 1921 close to the optical path 101 towards the recessed structures 1922. It is noted that for clearly showing the coating range of the light-blocking membrane layer 190, the light-blocking membrane layer 190 in FIG. 10 to FIG. 11 is not at its real scale.

When a shortest distance between the extension structures 1921 at a side farthest from the distal side 191 is ΔG, the following condition is satisfied: ΔG=105.5 [um].

When a width of the optical portion 151 along the first axis AX1 is S1, and a width of the optical portion 151 along the second axis AX2 is S2, the following conditions are satisfied: S1=2.384 [mm]; S2=3.072 [mm]; and S1/S2=0.776.

When an average thickness of the light-blocking membrane layer 190 is T, the following condition is satisfied: 0.9 [um]≤T≤10 [um].

As shown in the cross-sectional views of FIG. 10 and FIG. 11, when a longest distance in parallel with the optical path 101 between the extension structures 1921 and the recessed structures 1922 is ΔH, the following conditions are satisfied: ΔH=36.4 [um] while in the cross-sectional view of FIG. 10; ΔH=47.8 [um] while in the cross-sectional view of FIG. 11.

2nd Embodiment

Figure 12:
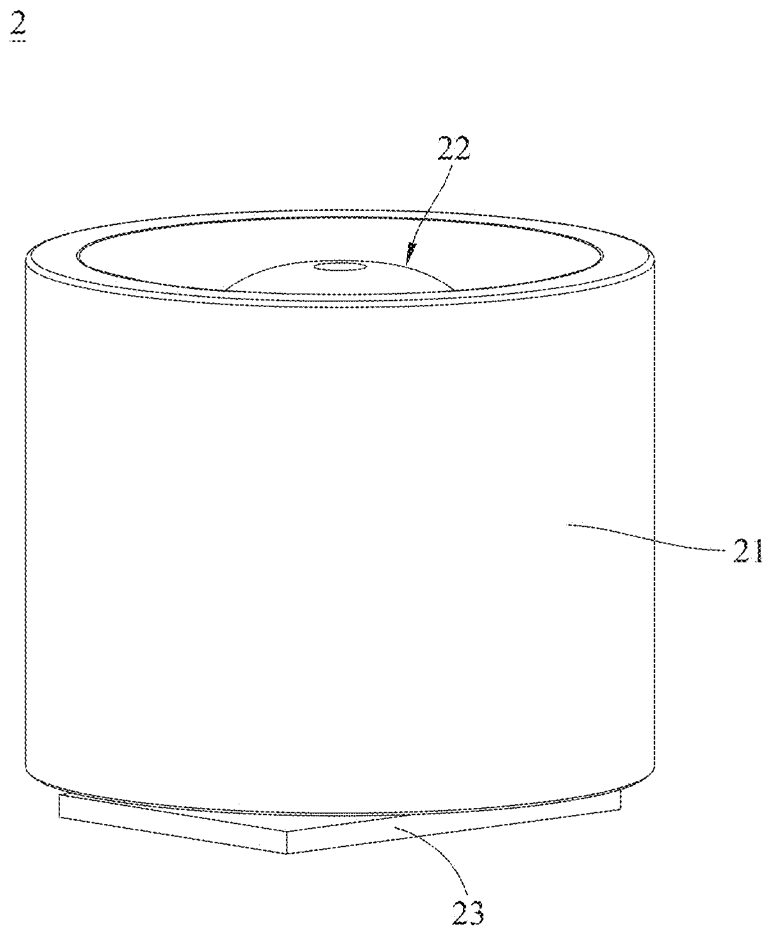
FIG. 12 is an isometric view of an optical unit according to the 2nd embodiment of the present disclosure.
Figure 13:
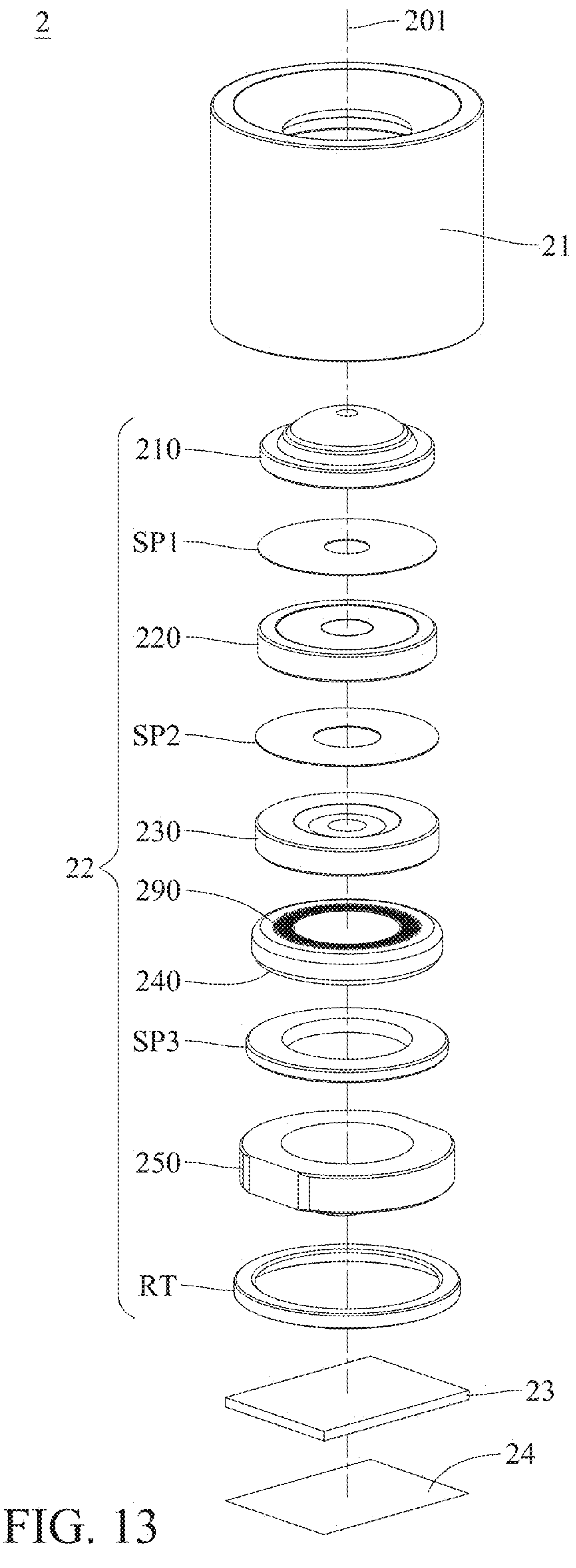
FIG. 13 is an exploded view of the optical unit in FIG. 12.
Figure 14:
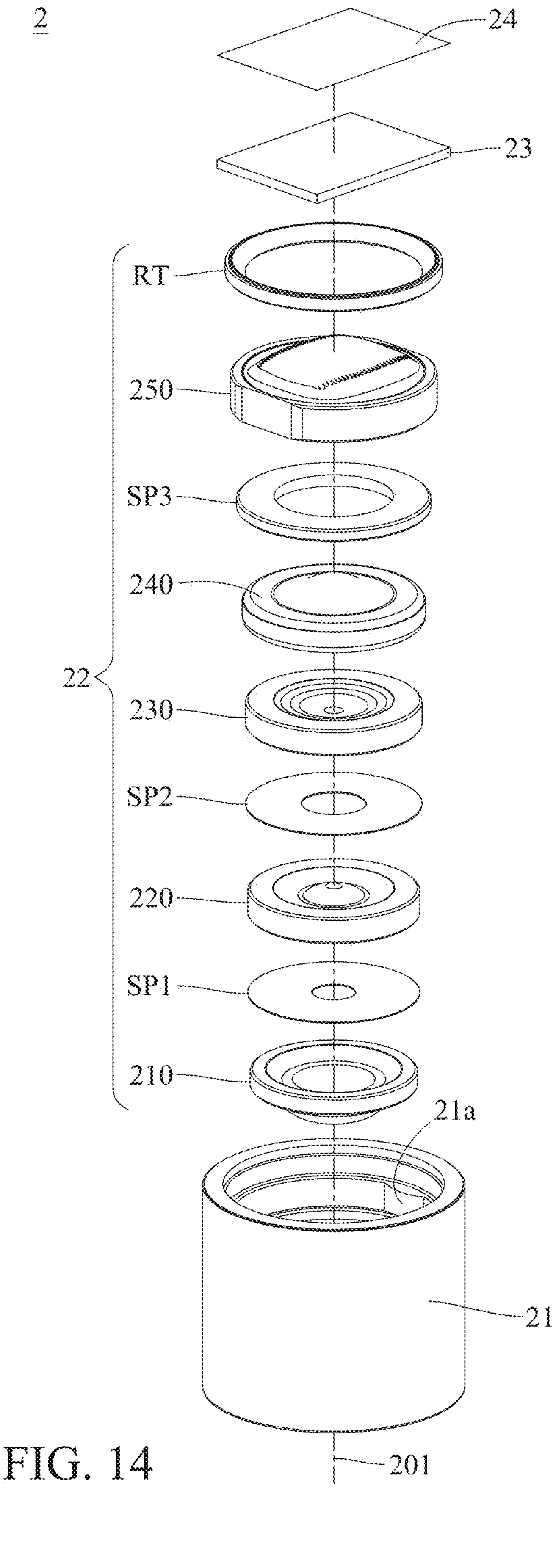
FIG. 14 is another exploded view of the optical unit in FIG. 12.
Figure 15:
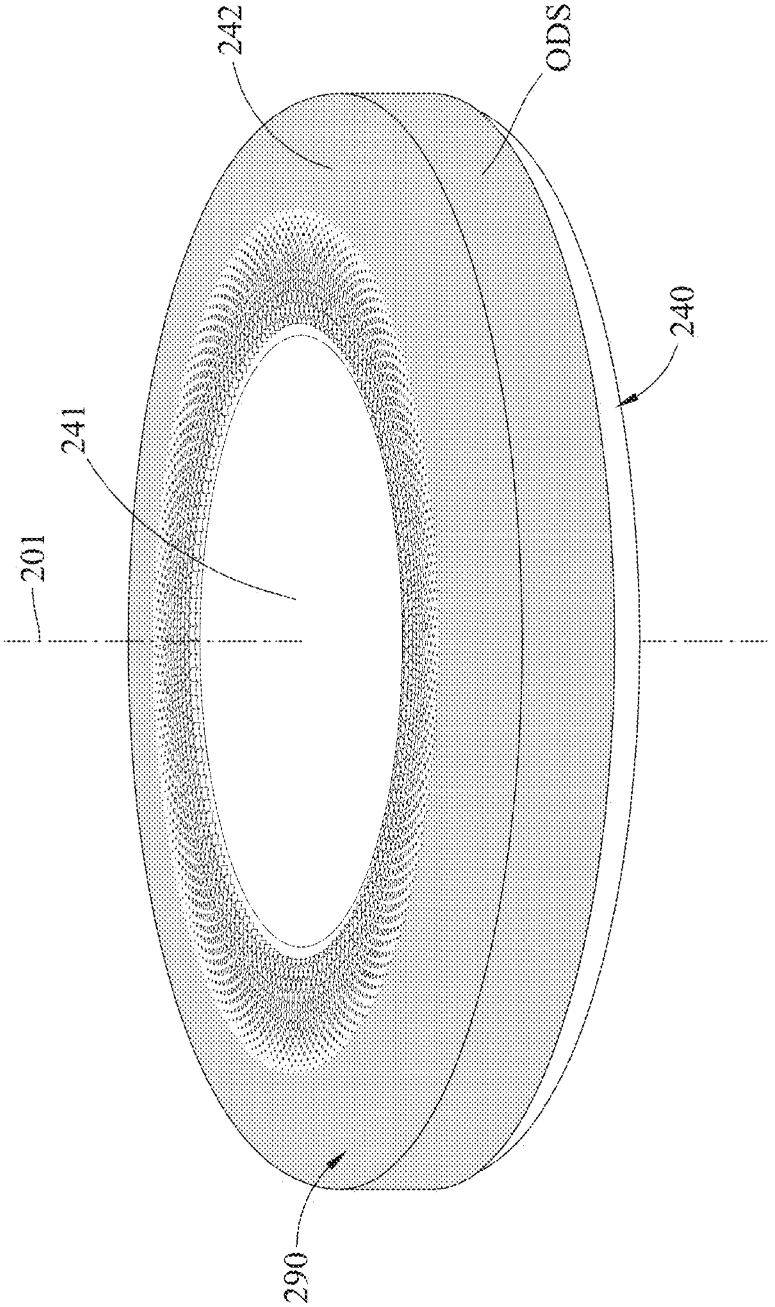
FIG. 15 is an enlarged view of a fourth lens element of the optical unit in FIG. 13.
Figure 16:
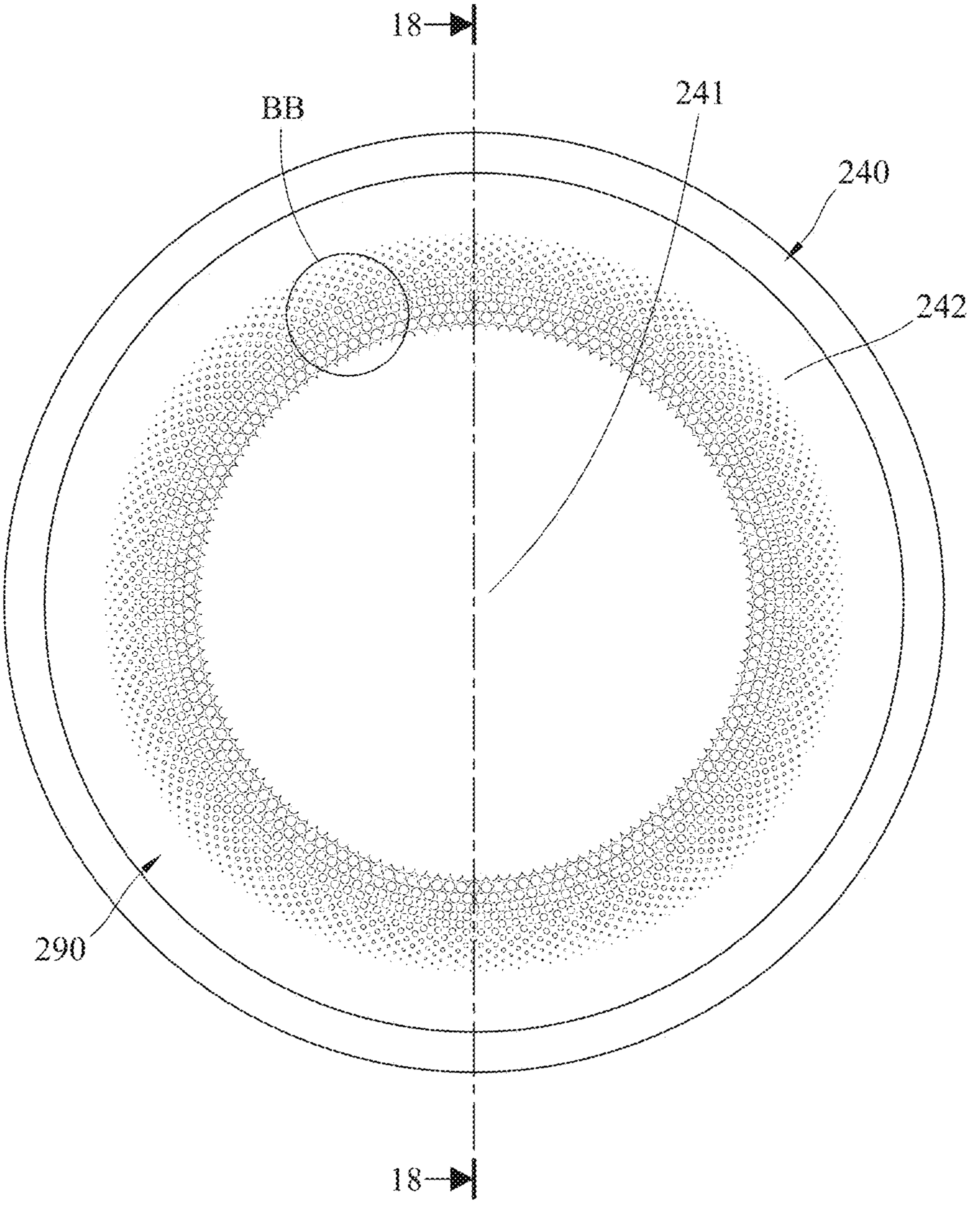
FIG. 16 is an object-side view of the fourth lens element in FIG. 15.
Figure 17:
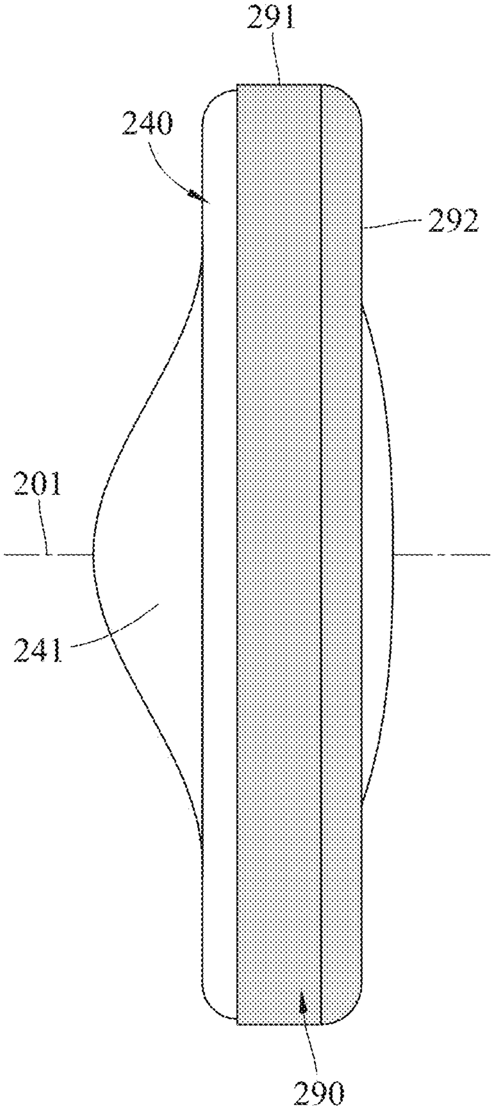
FIG. 17 is a side view of the fourth lens element in FIG. 15.
Figure 18:
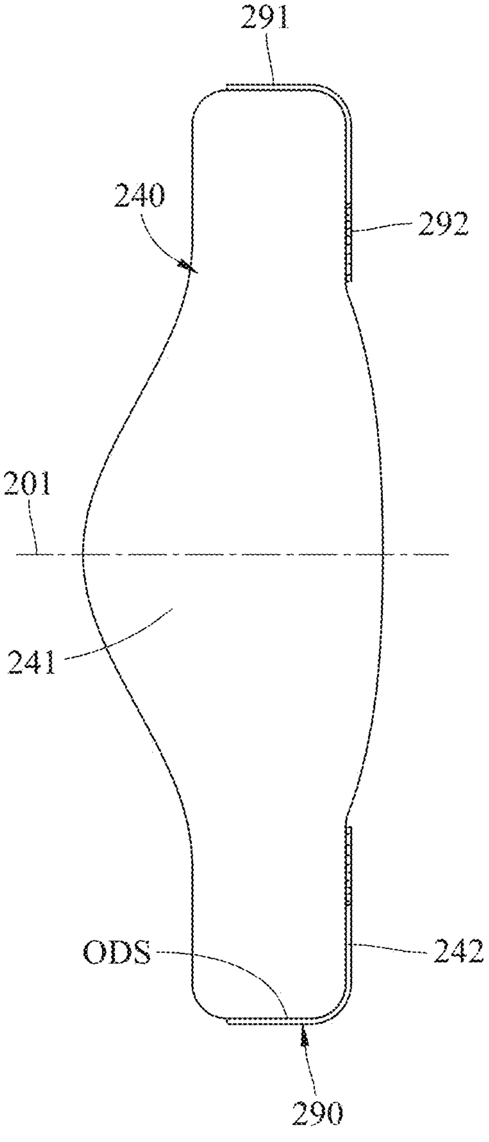
FIG. 18 is a cross-sectional view of the fourth lens element in FIG. 16 taken along line 18-18.
Figure 19:
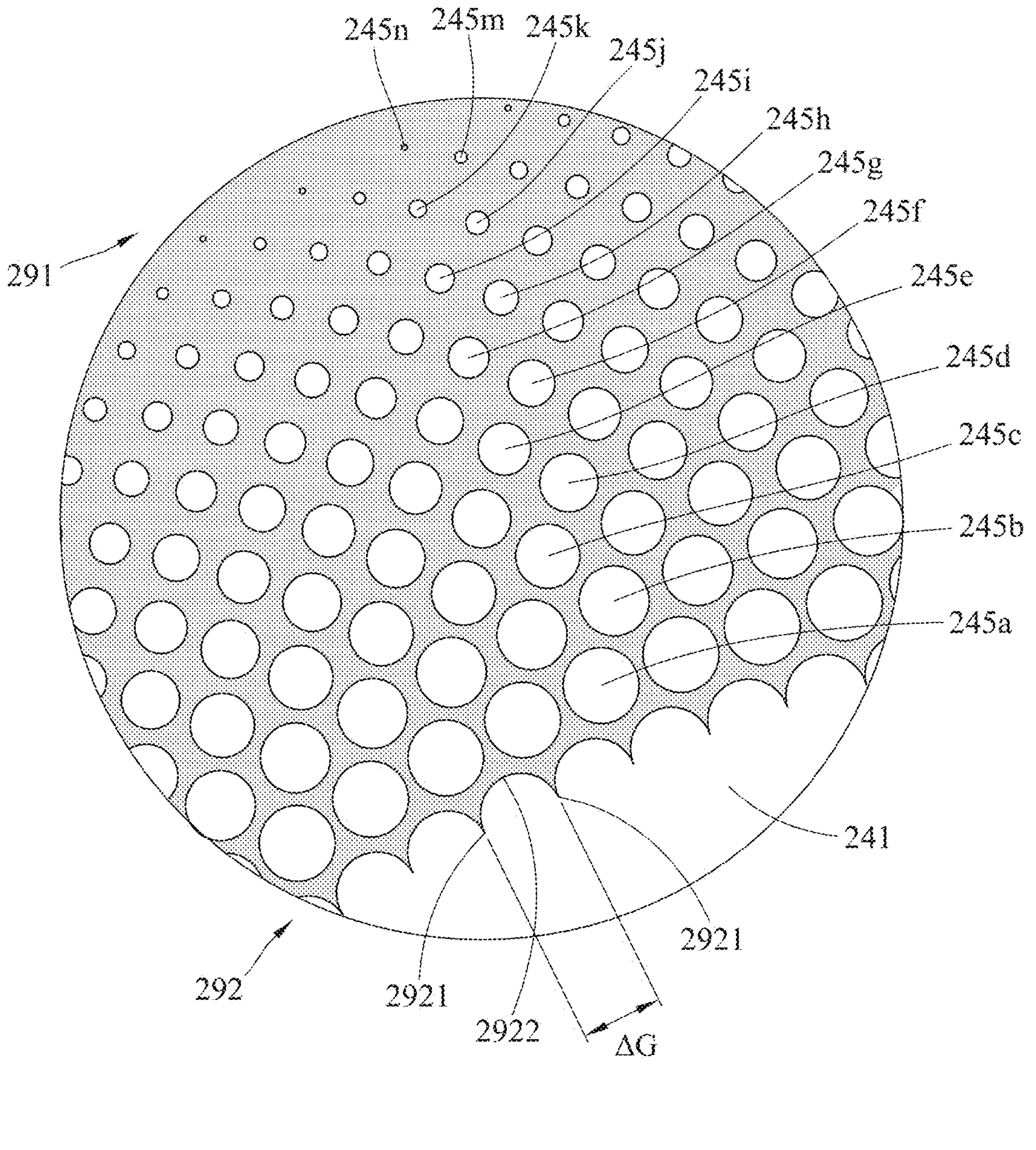
FIG. 19 is an enlarged view of BB region of the fourth lens element in FIG. 16.

Please refer to FIG. 12 to FIG. 19, where FIG. 12 is an isometric view of an optical unit according to the 2nd embodiment of the present disclosure, FIG. 13 is an exploded view of the optical unit in FIG. 12, FIG. 14 is another exploded view of the optical unit in FIG. 12, FIG. 15 is an enlarged view of a fourth lens element of the optical unit in FIG. 13, FIG. 16 is an object-side view of the fourth lens element in FIG. 15, FIG. 17 is a side view of the fourth lens element in FIG. 15, FIG. 18 is a cross-sectional view of the fourth lens element in FIG. 16 taken along line 18-18, and FIG. 19 is an enlarged view of BB region of the fourth lens element in FIG. 16.

In this embodiment, the optical unit 2 is an image lens. The optical unit 2 includes a carrier 21, a lens assembly 22 and a filter 23 and has an image surface 24. The carrier 21 accommodates the lens assembly 22. The lens assembly 22 has an optical path 201 and includes, in order from an object side to an image side along the optical path 201, a first lens element 210, a first spacer SP1, a second lens element 220, a second spacer SP2, a third lens element 230, a light-blocking membrane layer 290, a fourth lens element 240, a third spacer SP3, a fifth lens element 250 and a retainer RT. The filter 23 is located at an image side of the lens assembly 22. The image surface 24 is located at an image side of the filter 23. Light will be converged and then image on the image surface 24 after passing through the lens assembly 22. When a maximum image height of the lens assembly 22 is 5.0 millimeters (mm), half of a maximum field of view (HFOV) is correspondingly 60.0 degrees, and the optical unit 2 is therefore an ultra-wide-angle lens.

The fourth lens element 240 has an optical portion 241, and the optical path 201 passes through the optical portion 241. The fourth lens element 240 is a molded glass lens element, such that the sensitivity of the fourth lens element 240 to temperature changes is reduced. The fourth lens element 240 further has an optical surface 242 at an object side thereof. The optical surface 242 is a light-passable aspheric surface. The optical portion 241 passes through the optical surface 242, and the optical portion 241 generates refraction on the optical surface 242.

The fourth lens element 240 further has a plurality of first light-passable openings 245*a*, a plurality of second light-passable openings 245*b*, a plurality of third light-passable openings 245*c*, a plurality of fourth light-passable openings 245*d*, a plurality of fifth light-passable openings 245*e*, a plurality of sixth light-passable openings 245*f*, a plurality of seventh light-passable openings 245*g*, a plurality of eighth light-passable openings 245*h*, a plurality of ninth light-passable openings 245*i*, a plurality of tenth light-passable openings 245*j*, a plurality of eleventh light-passable openings 245*k*, a plurality of twelfth light-passable openings 245*m* and a plurality of thirteenth light-passable openings 245*n*. Each of the first light-passable openings 245*a* to the thirteenth light-passable openings 245*n* are surrounded by the light-blocking membrane layer 290 for increasing the amount of passable light of the fourth lens element 240. The first light-passable openings 245*a* to the thirteenth light-passable openings 245*n* are sequentially arranged along a direction away from the optical path 201.

The light-blocking membrane layer 290 is surrounding and disposed adjacent to the optical portion 241 and is coated on the optical surface 242 and an outer diameter surface ODS of the fourth lens element 240.

The light-blocking membrane layer 290 has a distal side 291 and a proximal side 292. The distal side 291 is disposed on the outer diameter surface ODS of the fourth lens element 240. The proximal side 292 is disposed on an object side of the fourth lens element 240 and located closer to the optical portion 241 than the distal side 291. The proximal side 292 includes a plurality of extension structures 2921 and a plurality of recessed structures 2922. The extension structures 2921 and the recessed structures 2922 are disposed on the optical surface 242. Each of the extension structures 2921 extends along a direction away from the distal side 291, and the extension structures 2921 are not overlapped with one another in a direction in parallel with the optical path 201. The recessed structures 2922 are connected to and located between two adjacent extension structures 2921 and are recessed along a direction towards the distal side 291.

A thickness of the light-blocking membrane layer 290 gradually decreases from the recessed structures 2922 to the extension structures 2921. In other words, a thickness of the light-blocking membrane layer 290 gradually increases from a side of the extension structures 2921 close to the optical path 201 towards the recessed structures 2922. It is note that for clearly showing the coating range of the light-blocking membrane layer 290, the light-blocking membrane layer 290 in FIG. 18 is not at its real scale.

When a shortest distance between the extension structures 2921 at a side farthest from the distal side 291 is ΔG, the following condition is satisfied: ΔG=51.0 [um].

A reference plane perpendicular to the optical path 201 is defined. When a projection area of the first light-passable opening 245*a* on the reference plane is HA1, a shortest distance between the first light-passable opening 245*a* and the optical path 201 on the reference plane is HD1, a projection area of the second light-passable opening 245*b* on the reference plane is HA2, a shortest distance between the second light-passable opening 245*b* and the optical path 201 on the reference plane is HD2, a projection area of the third light-passable opening 245*c* on the reference plane is HA3, a shortest distance between the third light-passable opening 245*c* and the optical path 201 on the reference plane is HD3, a projection area of the fourth light-passable opening 245*d* on the reference plane is HA4, a shortest distance between the fourth light-passable opening 245*d* and the optical path 201 on the reference plane is HD4, a projection area of the fifth light-passable opening 245*e* on the reference plane is HA5, a shortest distance between the fifth light-passable opening 245*e* and the optical path 201 on the reference plane is HD5, a projection area of the sixth light-passable opening 245*f* on the reference plane is HA6, a shortest distance between the sixth light-passable opening 245*f* and the optical path 201 on the reference plane is HD6, a projection area of the seventh light-passable opening 245*g* on the reference plane is HA7, a shortest distance between the seventh light-passable opening 245*g* and the optical path 201 on the reference plane is HD7, a projection area of the eighth light-passable opening 245*h* on the reference plane is HA8, a shortest distance between the eighth light-passable opening 245*h* and the optical path 201 on the reference plane is HD8, a projection area of the ninth light-passable opening 245*i* on the reference plane is HA9, a shortest distance between the ninth light-passable opening 245*i* and the optical path 201 on the reference plane is HD9, a projection area of the tenth light-passable opening 245*j* on the reference plane is HA10, a shortest distance between the tenth light-passable opening 245*j* and the optical path 201 on the reference plane is HD10, a projection area of the eleventh light-passable opening 245*k* on the reference plane is HA11, a shortest distance between the eleventh light-passable opening 245*k* and the optical path 201 on the reference plane is HD11, a projection area of the twelfth light-passable opening 245*m* on the reference plane is HA12, a shortest distance between the twelfth light-passable opening 245*m* and the optical path 201 on the reference plane is HD12, a projection area of the thirteenth light-passable opening 245*n* on the reference plane is HA13, and a shortest distance between the thirteenth light-passable opening 245*n* and the optical path 201 on the reference plane is HD13, the following conditions in TABLE 1 are satisfied:

TABLE 1

| X | HAX [mm²] | HDX [mm] | HAX^0.5/ HDX | (HAX^0.5/HDX)/ (HA(X-1)^0.5/ HD(X-1)) |
|---|---|---|---|---|
| X = 1 | 1.778E-03 | 1.20421 | 0.0350 | NA |
| X = 2 | 1.515E-03 | 1.25213 | 0.0311 | 0.8886 |
| X = 3 | 1.273E-03 | 1.29541 | 0.0275 | 0.8842 |
| X = 4 | 1.052E-03 | 1.33494 | 0.0243 | 0.8836 |
| X = 5 | 8.520E-04 | 1.37134 | 0.0213 | 0.8765 |
| X = 6 | 6.730E-04 | 1.40503 | 0.0185 | 0.8685 |
| X = 7 | 5.150E-04 | 1.43635 | 0.0158 | 0.8541 |
| X = 8 | 3.790E-04 | 1.46554 | 0.0133 | 0.8418 |
| X = 9 | 2.630E-04 | 1.49277 | 0.0109 | 0.8195 |
| X = 10 | 1.680E-04 | 1.51819 | 0.0085 | 0.7798 |
| X = 11 | 9.500E-05 | 1.54189 | 0.0063 | 0.7412 |
| X = 12 | 4.200E-05 | 1.56393 | 0.0041 | 0.6508 |
| X = 13 | 1.052E-05 | 1.58437 | 0.0020 | 0.4878 |

In TABLE 1, "X" represent to "1" in parameter referring values for the first light-passable opening 245*a* to "13" in parameter referring values for the thirteenth light-passable opening 245*n*. For example, if X equals to "2" (e.g., X=2 in TABLE 1), HAX=HA2, HDX=HD2, HAX^0.5/HDX=HA2^0.5/HD2, and (HAX^0.5/HDX)/(HA(X−1)^0.5/HD(X−1))=(HA2^0.5/HD2)/(HA1^0.5/HD1), wherein HAX^0.5/HDX can represent to aperture ratio. According to TABLE 1, the aperture ratio is gradually decreased along a direction away from the optical path 201, such that the amount of light passing through the lens element is gradually reduced so as to ensure smooth light intensity.

When an average thickness of the light-blocking membrane layer 290 is T, the following condition is satisfied: 0.9 [um]≤T≤10 [um].

When a longest distance in parallel with the optical path 201 between the first light-passable opening 245*a* and the thirteenth light-passable opening 245*n* is ΔHh, the following condition is satisfied: 0.5 [um]≤ΔHh≤249.5 [um].

3rd Embodiment

Figure 20:
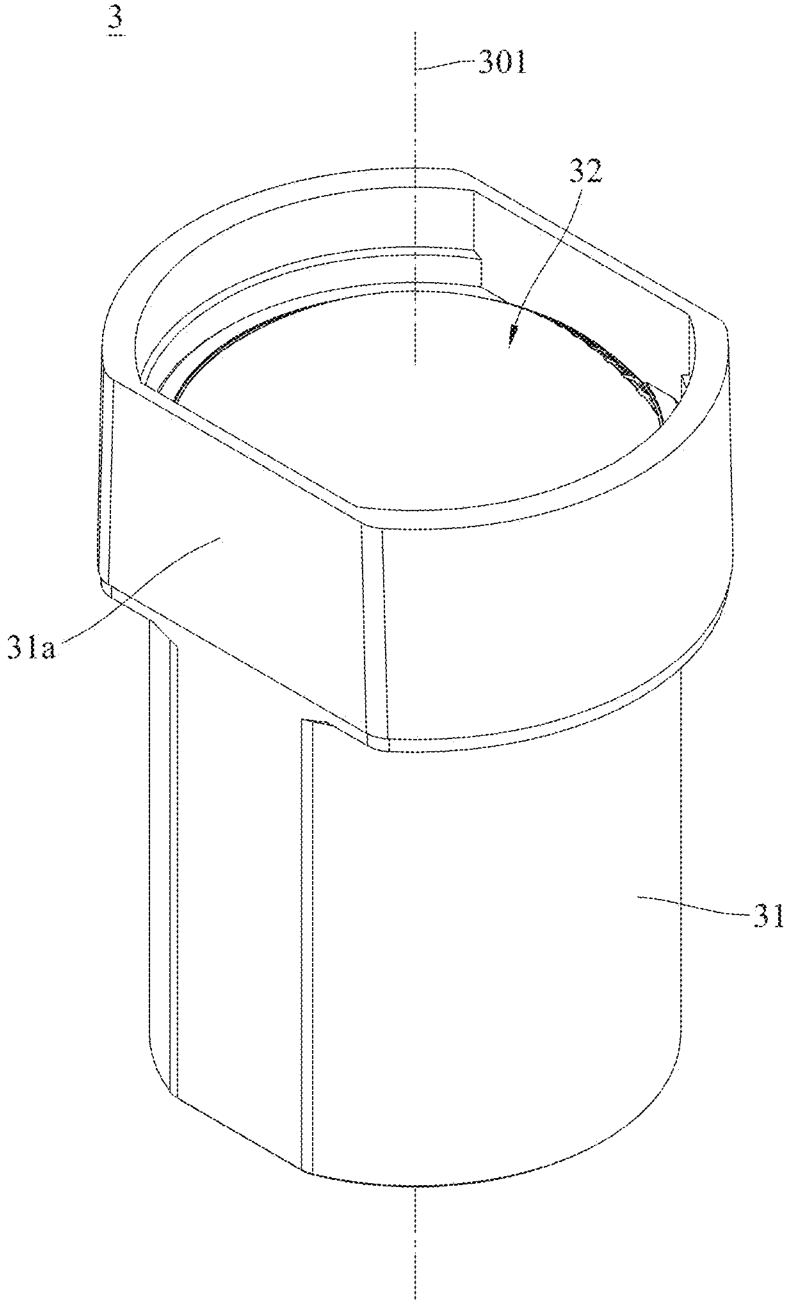
FIG. 20 is an isometric view of an optical unit according to the 3rd embodiment of the present disclosure.
Figure 21:
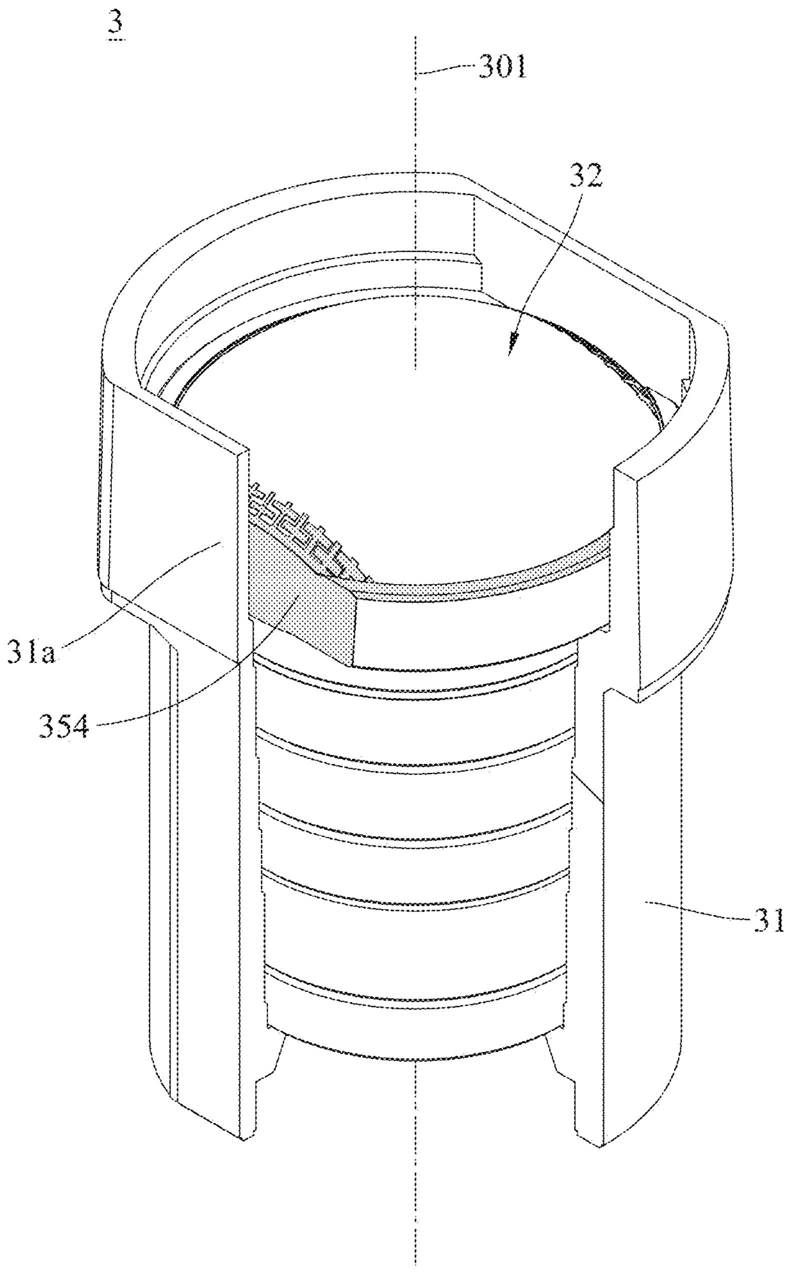
FIG. 21 is an isometric view of the optical unit in FIG. 20 that is partially sectioned.
Figure 22:
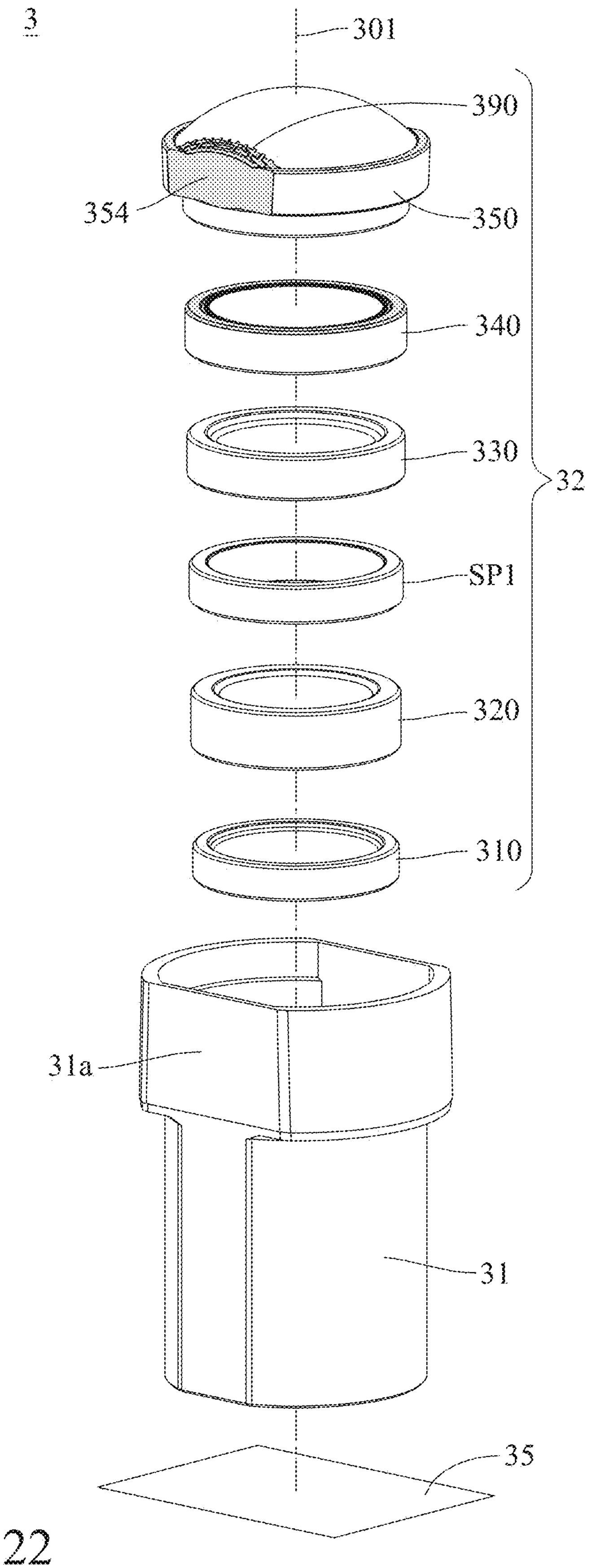
FIG. 22 is an exploded view of the optical unit in FIG. 20.
Figure 23:
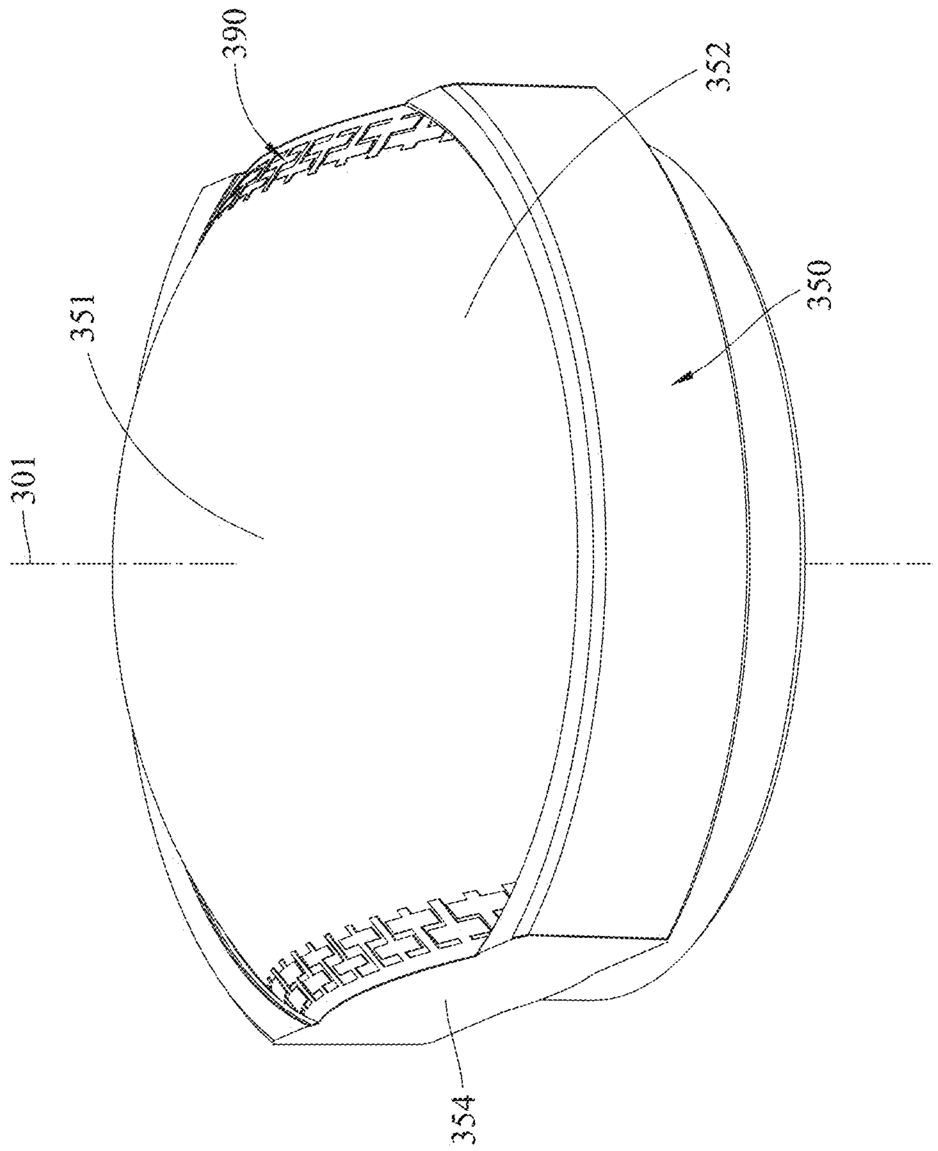
FIG. 23 is an enlarged view of a fifth lens element of the optical unit in FIG. 22.
Figure 25:
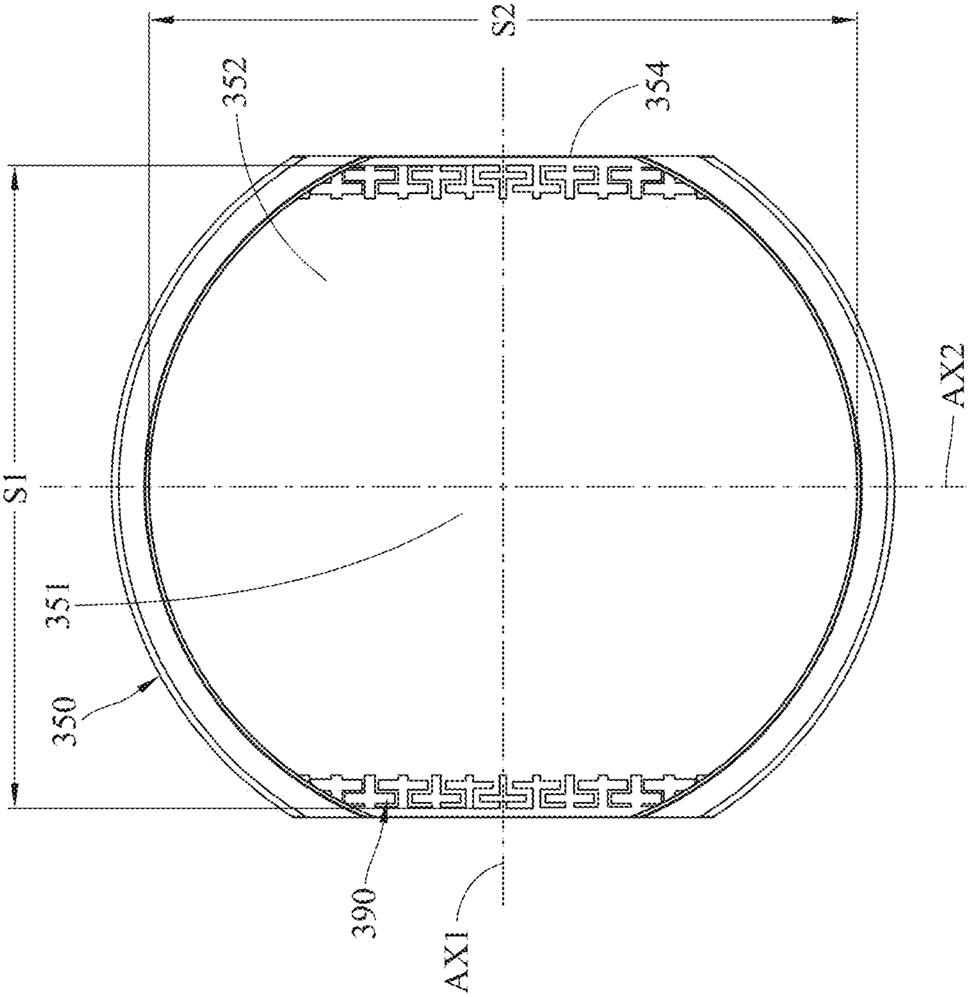
FIG. 25 is an emitting-side view of the fifth lens element in FIG. 23.
Figure 24:
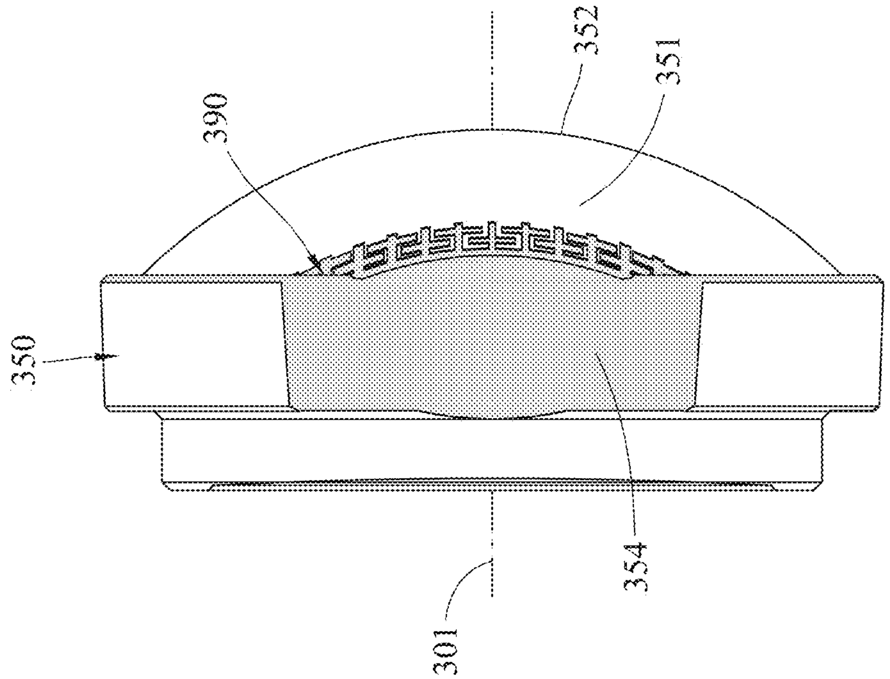
FIG. 24 is a side view of the fifth lens element in FIG. 23 along a first axis.
Figure 27:
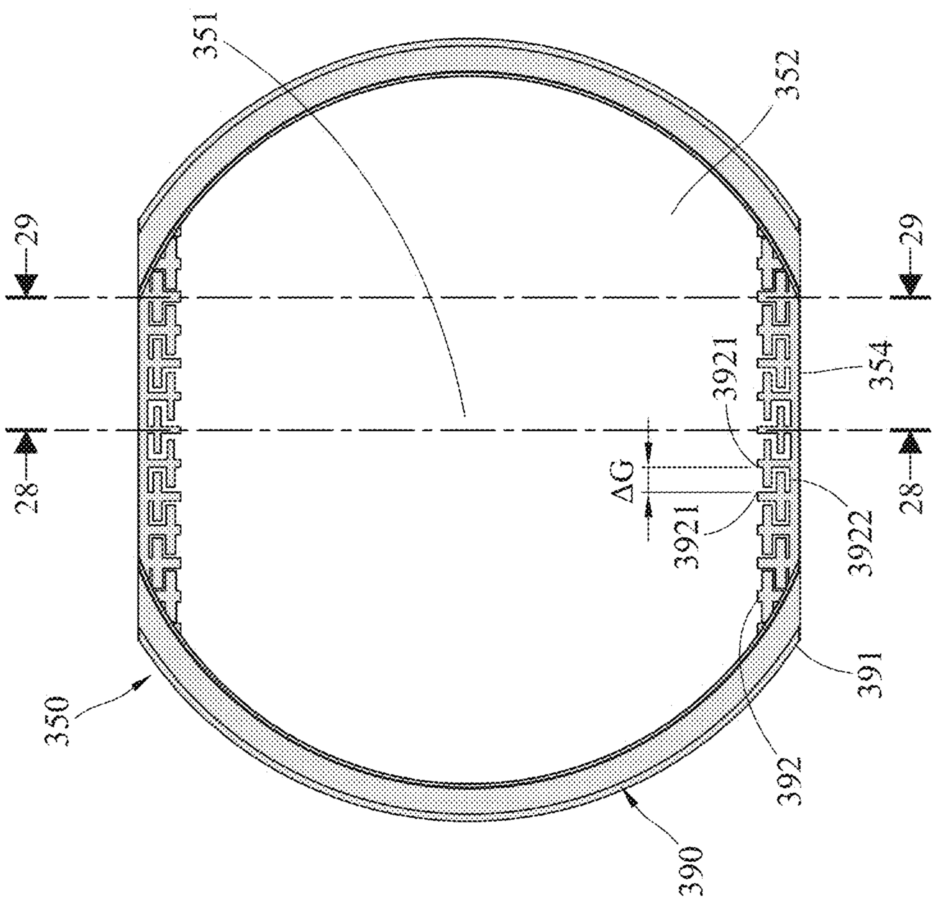
FIG. 27 is an emitting-side view of the fifth lens element in FIG. 23.
Figure 26:
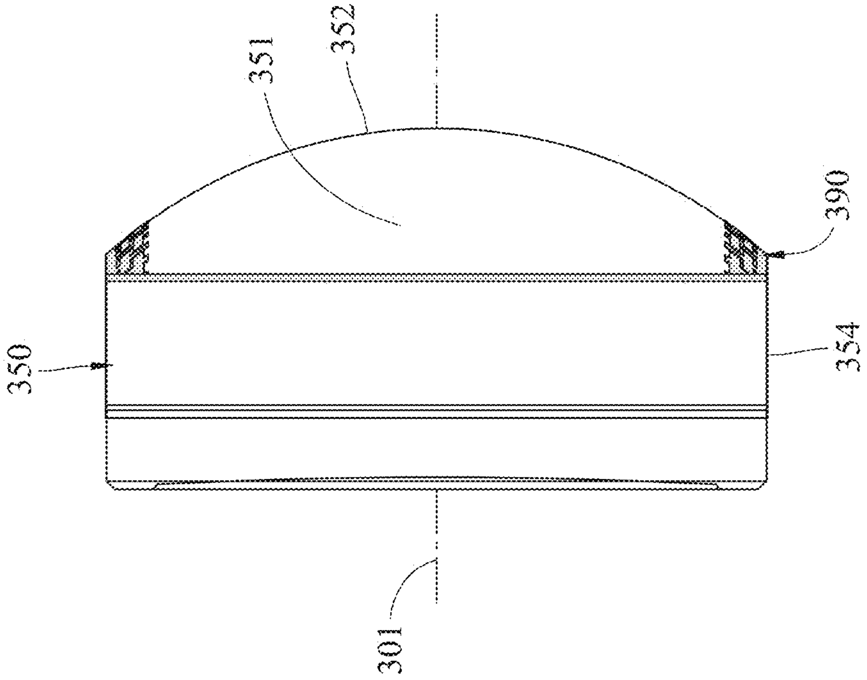
FIG. 26 is a side view of the fifth lens element in FIG. 23 along a second axis.
Figure 29:
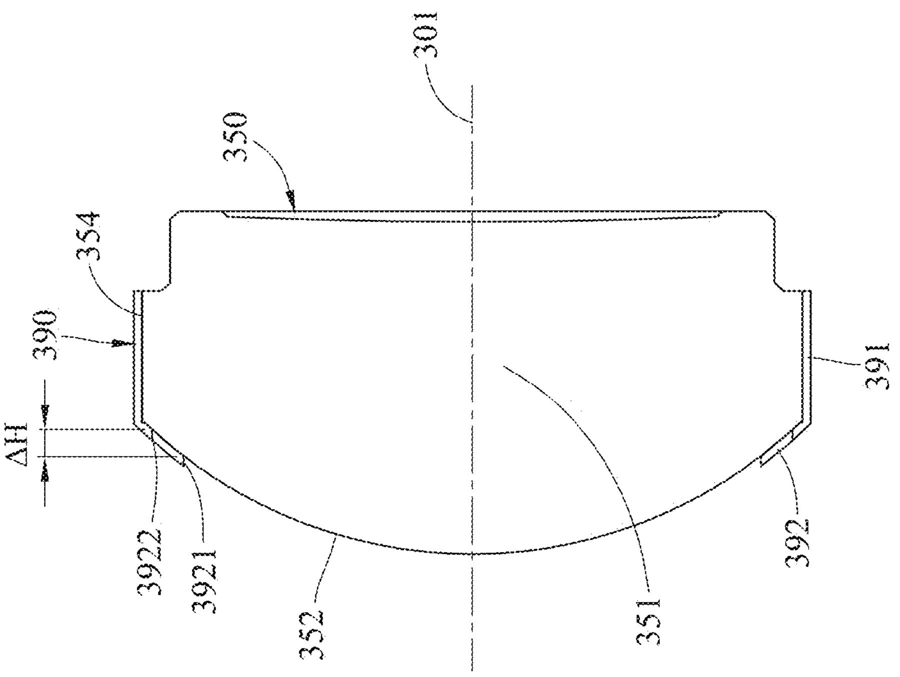
FIG. 29 is a cross-sectional view of the fifth lens element in FIG. 27 taken along line 29-29.
Figure 28:
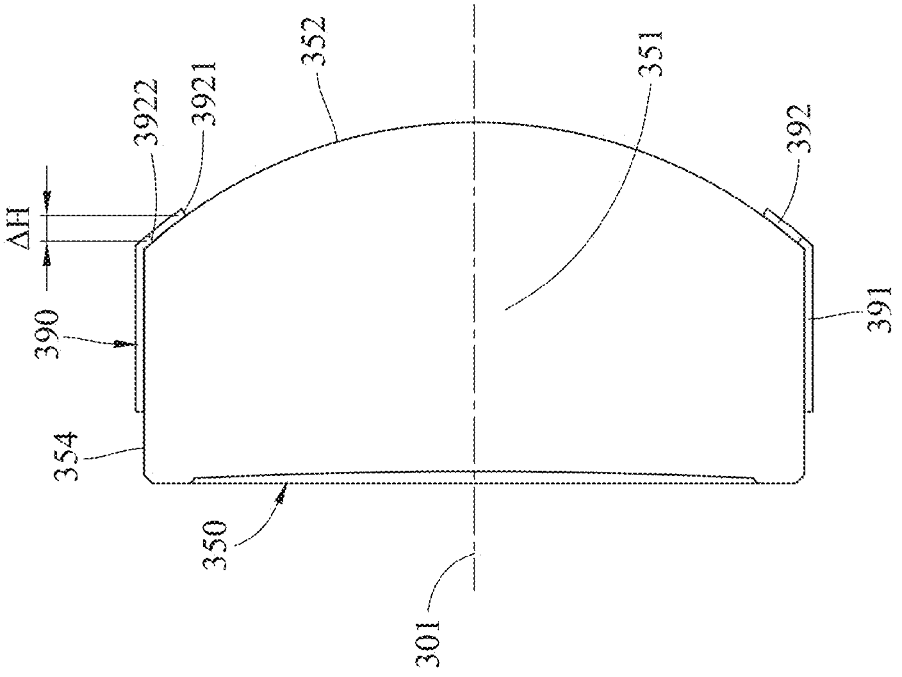
FIG. 28 is a cross-sectional view of the fifth lens element in FIG. 27 taken along line 28-28.

Please refer to FIG. 20 to FIG. 29, where FIG. 20 is an isometric view of an optical unit according to the 3rd embodiment of the present disclosure, FIG. 21 is an isometric view of the optical unit in FIG. 20 that is partially sectioned, FIG. 22 is an exploded view of the optical unit in FIG. 20, FIG. 23 is an enlarged view of a fifth lens element of the optical unit in FIG. 22, FIG. 24 is a side view of the fifth lens element in FIG. 23 along a first axis, FIG. 25 is an emitting-side view of the fifth lens element in FIG. 23, FIG. 26 is a side view of the fifth lens element in FIG. 23 along a second axis, FIG. 27 is an emitting-side view of the fifth lens element in FIG. 23, FIG. 28 is a cross-sectional view of the fifth lens element in FIG. 27 taken along line 28-28, and FIG. 29 is a cross-sectional view of the fifth lens element in FIG. 27 taken along line 29-29.

In this embodiment, the optical unit 3 is a projector lens. The optical unit 3 includes a carrier 31 and a lens assembly 32 and has a light source surface 35. The carrier 31 has a counterpart portion 31*a* that is a flat area at the inner side of the carrier 31 for easily accommodating and positioning the lens assembly 32 in the carrier 31. The lens assembly 32 has an optical path 301 and includes, in order from an object side to an image side along the optical path 301, a first lens element 310, a second lens element 320, a first spacer SP1, a third lens element 330, a fourth lens element 340, a fifth lens element 350 and two light-blocking membrane layers 390. The light source surface 35 is located at an incident side of the lens assembly 32. When the optical unit 3 is applied to an electronic device (not shown in this embodiment), an image source (not shown in this embodiment) such as a liquid crystal module or a digital light processing module can be used as a light source which is disposed on the light source surface 35 for projecting light towards the lens assembly 32. Light will be converged and then image on a projection surface (not shown in this embodiment) after passing through the lens assembly 32, wherein a focal length (f) of the lens assembly 32 is 14.5 millimeters (mm), an f-number (Fno) of the lens assembly 32 is 3.4, and an angle of projection (AOP) in the diagonal direction of the lens assembly 32 is 21.8 degrees. Note that the lens assembly 32 can also be applied to an imaging system; when a maximum image height of the lens assembly 32 is 2.5 millimeters, half of a maximum field of view (HFOV) is correspondingly 9.75 degrees, and the optical unit 3 is therefore a telephoto lens.

There are a first axis AX1 and a second axis AX2 defined on a reference plane that is perpendicular to the optical path 301, and the first axis AX1, the second axis AX2 and the optical path 301 are perpendicular to one another.

The fifth lens element 350 has an optical portion 351 that is symmetrical with respect to the first axis AX1 and the second axis AX2, and the optical path 301 passes through the optical portion 351. The fifth lens element 350 further has an optical surface 352 at an emitting side thereof. The optical surface 352 is a light-passable aspheric surface. The optical portion 351 passes through the optical surface 352, and the optical portion 351 generates refraction on the optical surface 352.

The fifth lens element 350 further has two edge portions 354 that are recessed along the first axis AX1 towards the optical path 301 and are spaced apart from the second axis AX2. The edge portions 354 correspond to counterpart portions 31*a* of the carrier 31 and are disposed opposite to the counterpart portions 31*a* so that the fifth lens element 350 is easily accommodated and positioned in the carrier 31 for increasing manufacturing efficiency.

The light-blocking membrane layers 390 are surrounding and disposed adjacent to the optical portion 351 and are coated on the optical surface 352 and the edge portions 354 of the fifth lens element 350 so as to reduce stray light generated at the junction between the optical surface 352 and the edge portions 354 and thus increase optical quality.

Each of the light-blocking membrane layers 390 has a distal side 391 and a proximal side 392 respectively at two ends thereof along the first axis AX1. The proximal side 392 is located closer to the optical portion 351 than the distal side 391. The proximal side 392 includes a plurality of extension structures 3921 and a plurality of recessed structures 3922. The extension structures 3921 and the recessed structures 3922 are disposed on the optical surface 352. Each of the extension structures 3921 extends along a direction away from the distal side 391, and the extension structures 3921 are not overlapped with one another in a direction in parallel with the optical path 301. The recessed structures 3922 are connected to and located between two adjacent extension structures 3921 and are recessed along a direction towards the distal side 391.

A thickness of each of the light-blocking membrane layers 390 gradually decreases from the recessed structures 3922 to the extension structures 3921. In other words, a thickness of each of the light-blocking membrane layers 390 gradually increases from a side of the extension structures 3921 close to the optical path 301 towards the recessed structures 3922. It is note that for clearly showing the coating range of the light-blocking membrane layers 390, the light-blocking membrane layers 390 in FIG. 28 to FIG. 29 are not at their real scale.

When a shortest distance between the extension structures 3921 at a side farthest from the distal side 391 is ΔG, the following condition is satisfied: ΔG=160 [um].

When a width of the optical portion 351 along the first axis AX1 is S1, and a width of the optical portion 351 along the second axis AX2 is S2, the following conditions are satisfied: S1=3.87 [mm]; S2=4.26 [mm]; and S1/S2=0.908.

When an average thickness of the light-blocking membrane layers 390 is T, the following condition is satisfied: 0.9 [um]≤T≤10 [um].

As shown in the cross-sectional views of FIG. 28 and FIG. 29, when a longest distance in parallel with the optical path 301 between the extension structures 3921 and the recessed structures 3922 is ΔH, the following conditions are satisfied: ΔH=152.4 [um] while in the cross-sectional view of FIG. 28; ΔH=167.2 [um] while in the cross-sectional view of FIG. 29.

4th Embodiment

Figure 30:
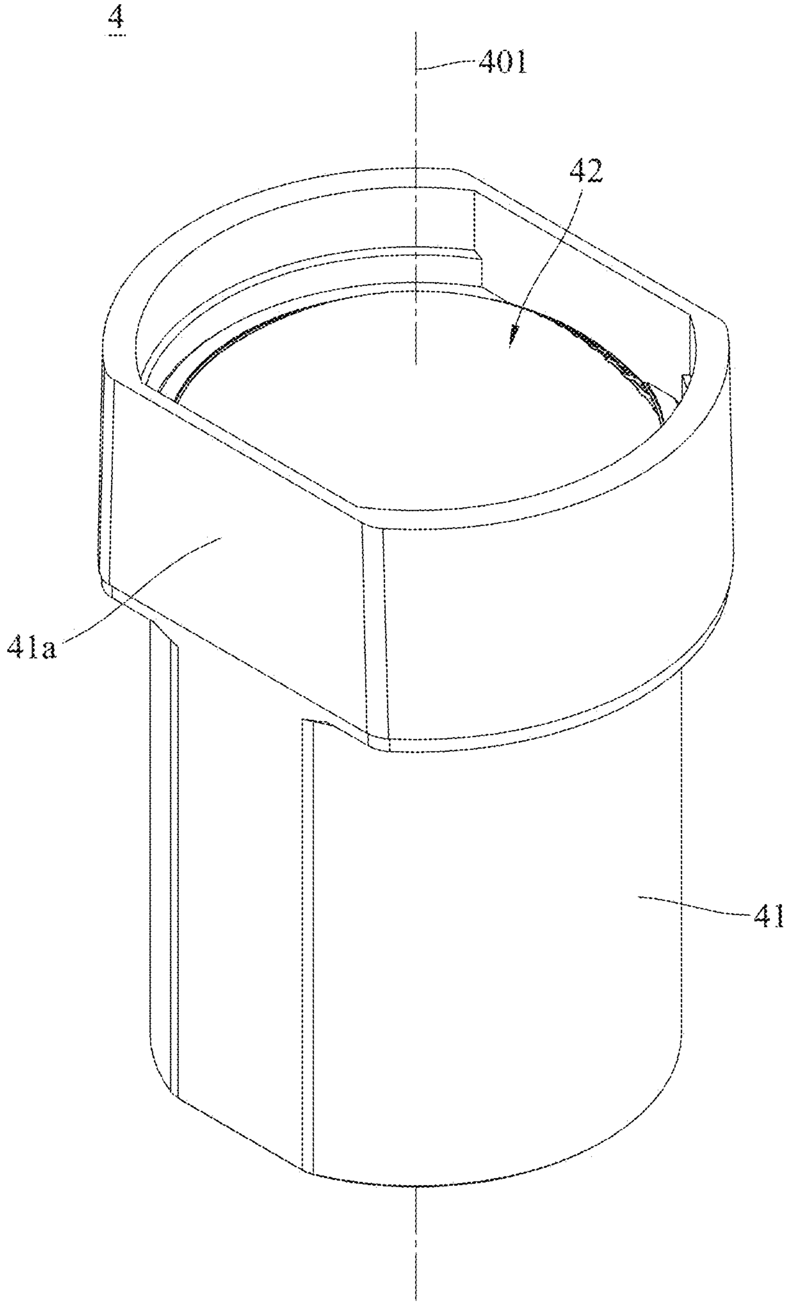
FIG. 30 is an isometric view of an optical unit according to the 4th embodiment of the present disclosure.
Figure 31:
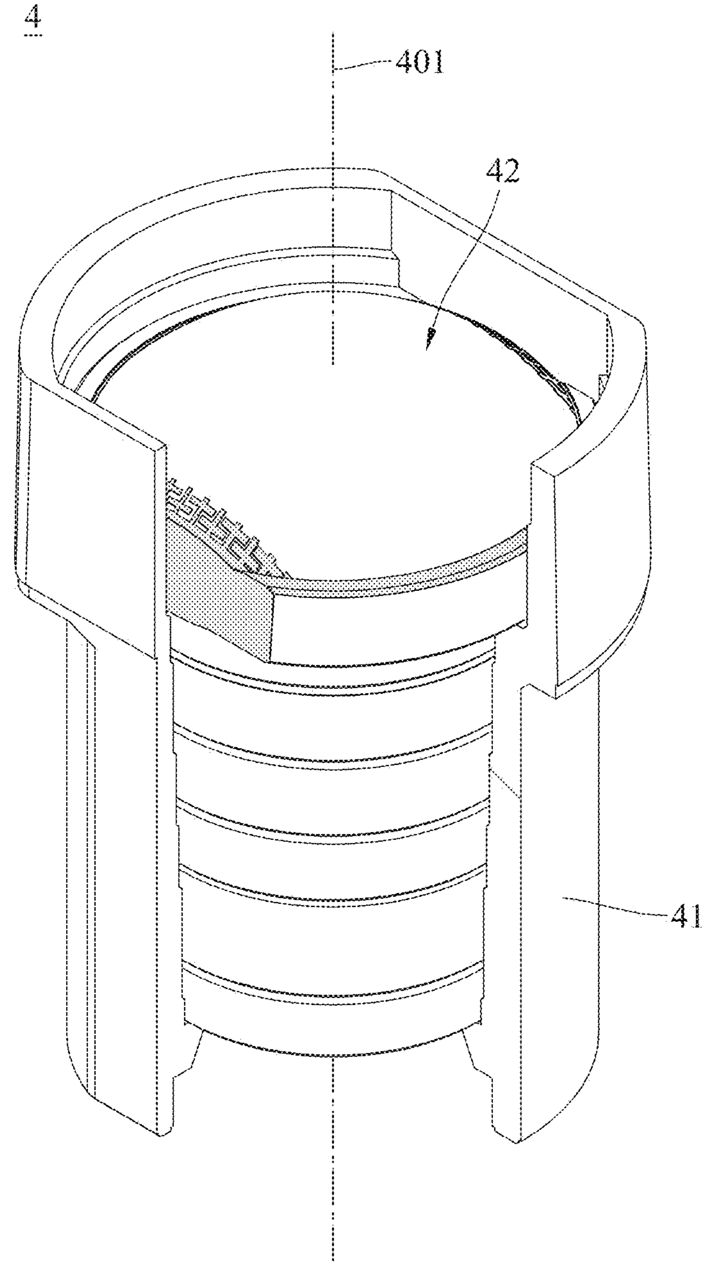
FIG. 31 is an isometric view of the optical unit in FIG. 30 that is partially sectioned.
Figure 32:
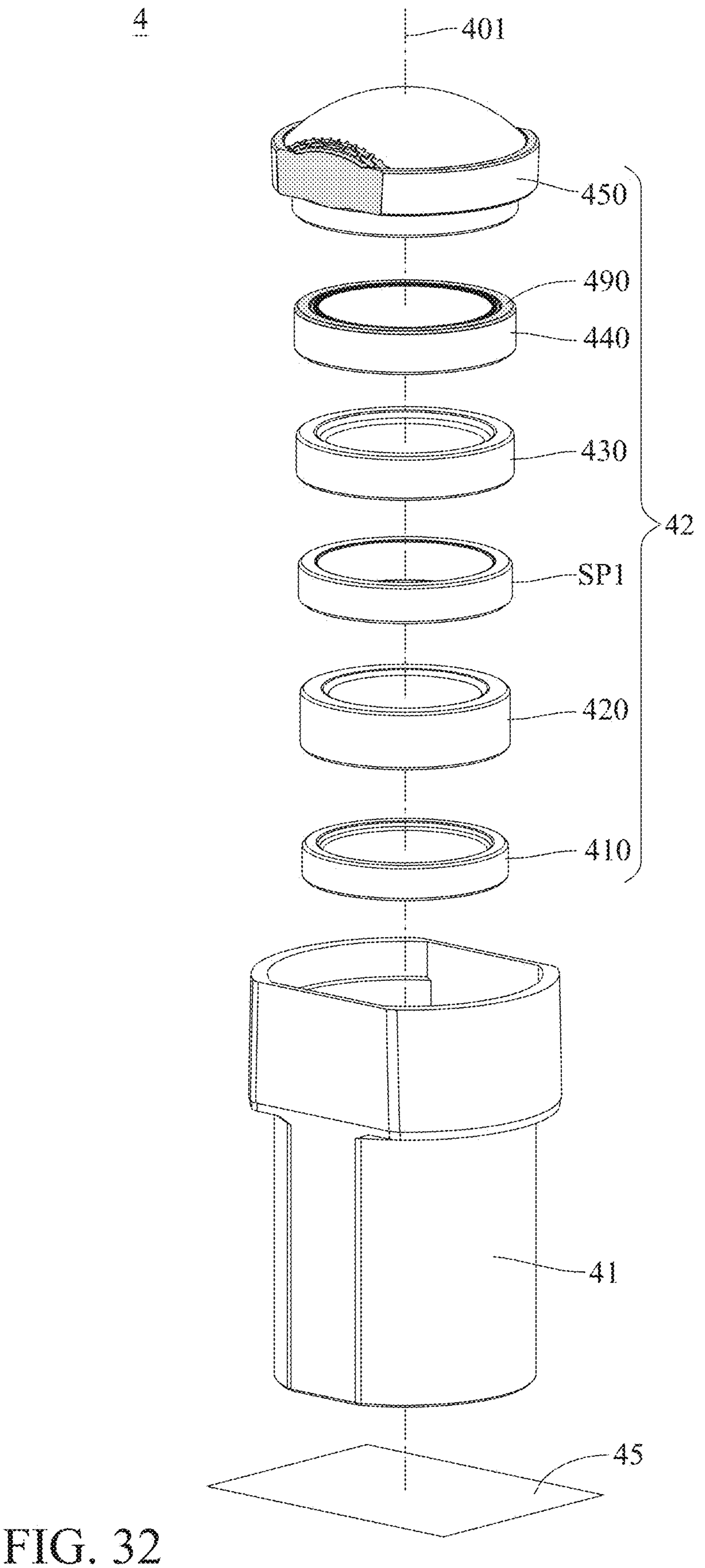
FIG. 32 is an exploded view of the optical unit in FIG. 30.
Figure 33:
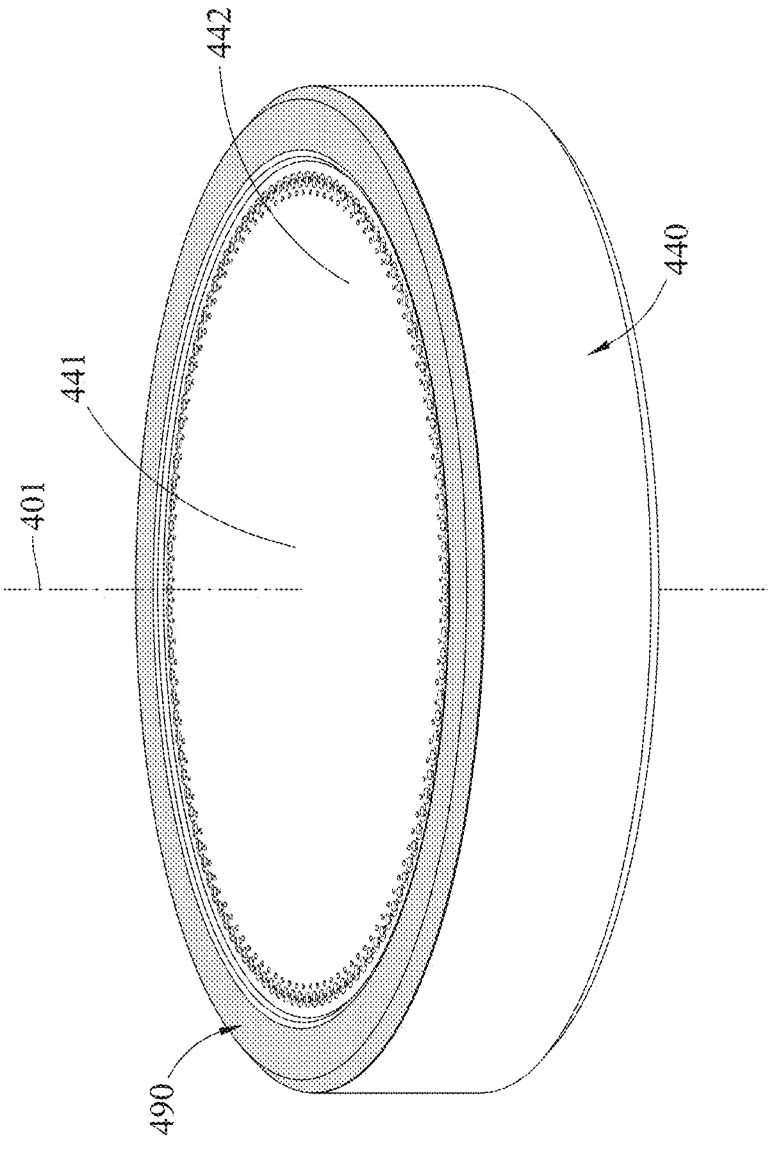
FIG. 33 is an enlarged view of a fourth lens element of the optical unit in FIG. 32.
Figure 35:
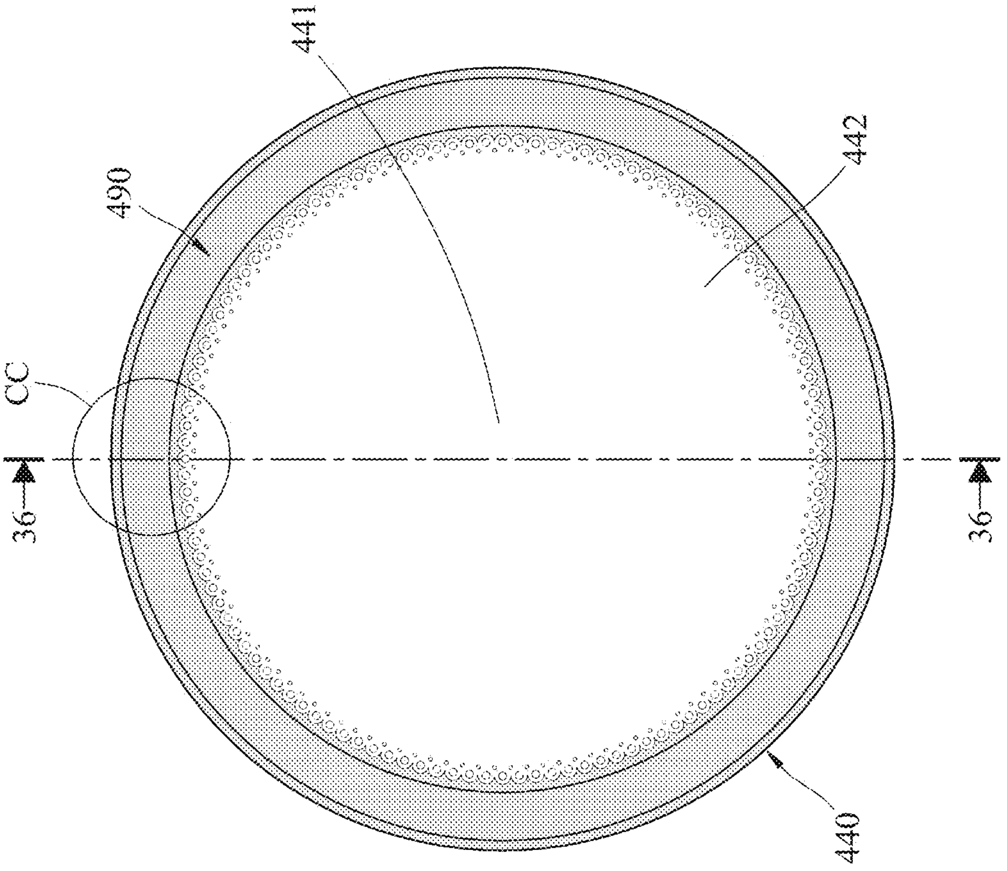
FIG. 35 is an emitting-side view of the fourth lens element in FIG. 33.
Figure 34:
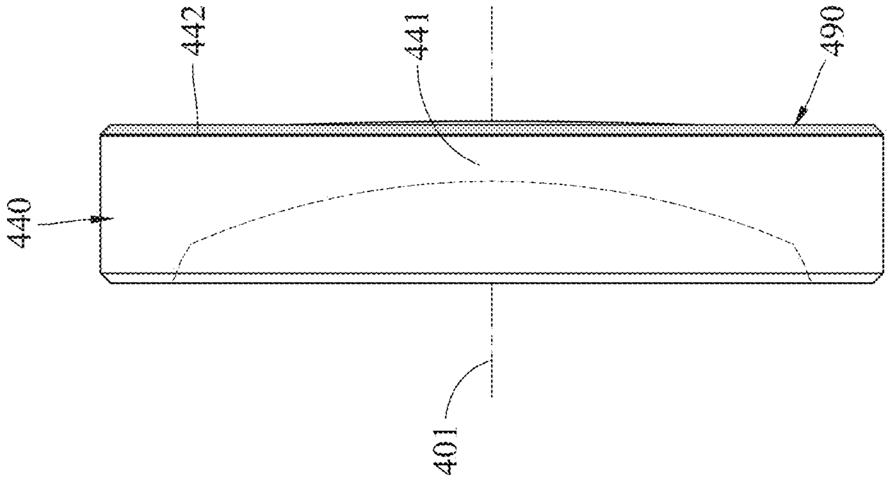
FIG. 34 is a side view of the fourth lens element in FIG. 33.
Figure 36:
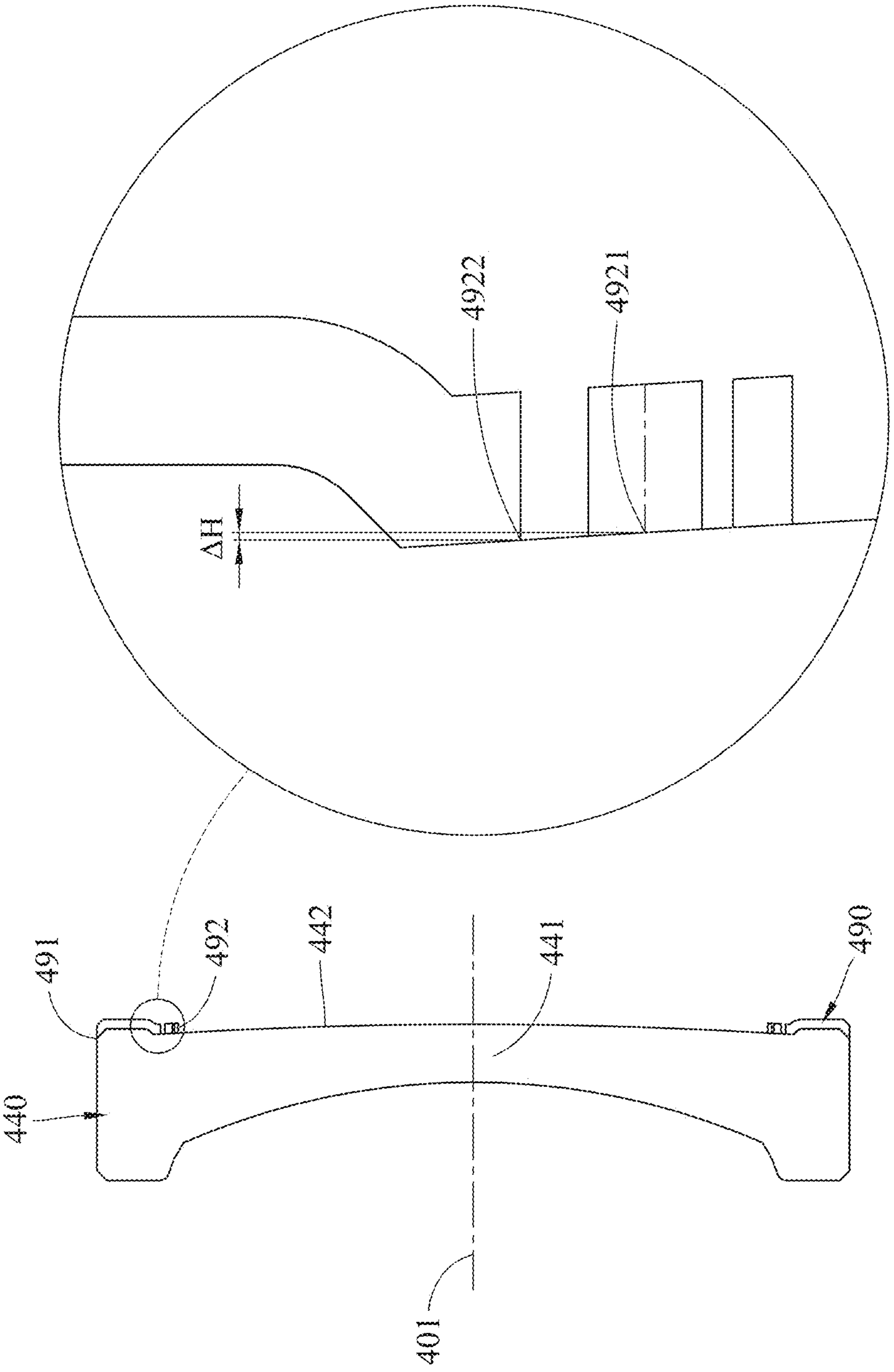
FIG. 36 is a cross-sectional view of the fourth lens element in FIG. 33 taken along line 36-36.
Figure 38:
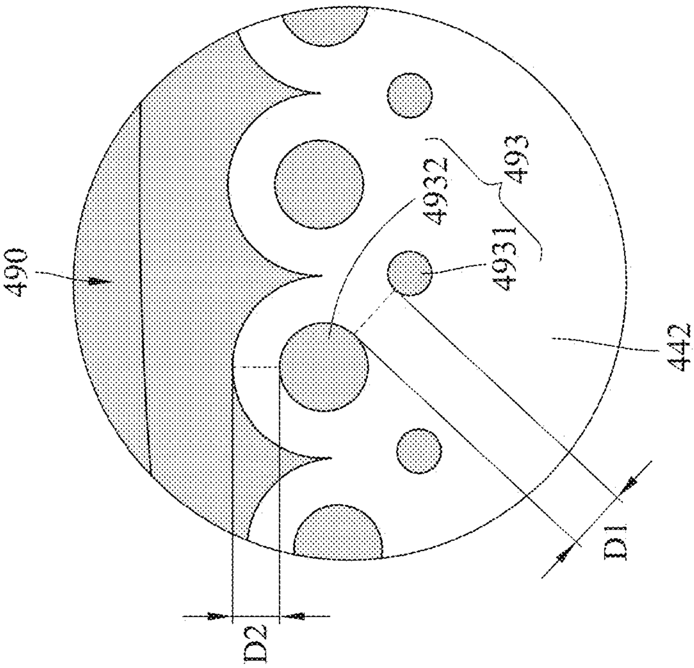
FIG. 38 is an enlarged view of DD region of the fourth lens element in FIG. 37.
Figure 37:
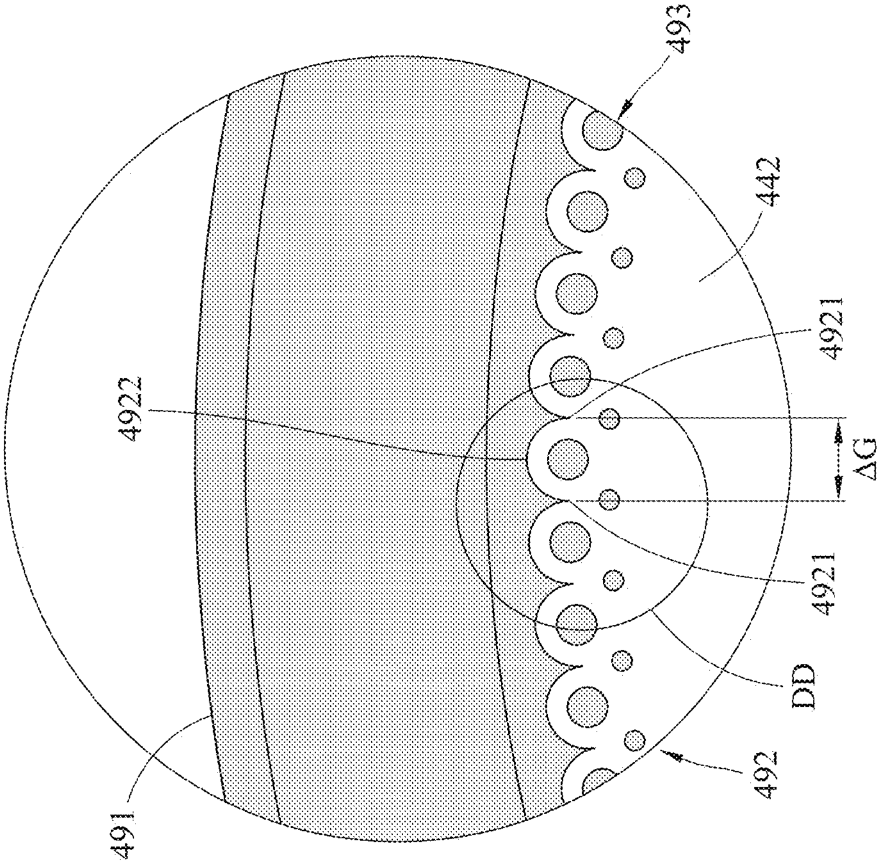
FIG. 37 is an enlarged view of CC region of the fourth lens element in FIG. 35.

Please refer to FIG. 30 to FIG. 38, where FIG. 30 is an isometric view of an optical unit according to the 4th embodiment of the present disclosure, FIG. 31 is an isometric view of the optical unit in FIG. 30 that is partially sectioned, FIG. 32 is an exploded view of the optical unit in FIG. 30, FIG. 33 is an enlarged view of a fourth lens element of the optical unit in FIG. 32, FIG. 34 is a side view of the fourth lens element in FIG. 33, FIG. 35 is an emitting-side view of the fourth lens element in FIG. 33, FIG. 36 is a cross-sectional view of the fourth lens element in FIG. 33 taken along line 36-36, FIG. 37 is an enlarged view of CC region of the fourth lens element in FIG. 35, and FIG. 38 is an enlarged view of DD region of the fourth lens element in FIG. 37.

In this embodiment, the optical unit 4 is a projector lens. The optical unit 4 includes a carrier 41 and a lens assembly 42 and has a light source surface 45. The carrier 41 accommodates the lens assembly 42. The lens assembly 42 has an optical path 401 and includes, in order from an object side to an image side along the optical path 401, a first lens element 410, a second lens element 420, a first spacer SP1, a third lens element 430, a fourth lens element 440, a light-blocking membrane layer 490 and a fifth lens element 450. The light source surface 45 is located at an incident side of the lens assembly 42. When the optical unit 4 is applied to an electronic device (not shown in this embodiment), an image source (not shown in this embodiment) such as a liquid crystal module or a digital light processing module can be used as a light source which is disposed on the light source surface 45 for projecting light towards the lens assembly 42. Light will be converged and then image on a projection surface (not shown in this embodiment) after passing through the lens assembly 42, wherein a focal length (f) of the lens assembly 42 is 14.5 millimeters (mm), an f-number (Fno) of the lens assembly 42 is 3.4, and an angle of projection (AOP) in the diagonal direction of the lens assembly 42 is 21.8 degrees. Note that the lens assembly 42 can also be applied to an imaging system; when a maximum image height of the lens assembly 42 is 2.5 millimeters, half of a maximum field of view (HFOV) is correspondingly 9.75 degrees, and the optical unit 4 is therefore a telephoto lens.

The fourth lens element 440 has an optical portion 441, and the optical path 401 passes through the optical portion 441. The fourth lens element 440 further has an optical surface 442 at an emitting side thereof. The optical surface 442 is a light-passable aspheric surface. The optical portion 441 passes through the optical surface 442, and the optical portion 441 generates refraction on the optical surface 442.

The light-blocking membrane layer 490 is surrounding and disposed adjacent to the optical portion 441 and is coated on the optical surface 442 of the fourth lens element 440.

The light-blocking membrane layer 490 has a distal side 491 and a proximal side 492. The proximal side 492 is located closer to the optical portion 441 than the distal side 491. The proximal side 492 includes a plurality of extension structures 4921 and a plurality of recessed structures 4922. The extension structures 4921 and the recessed structures 4922 are disposed on the optical surface 442. Each of the extension structures 4921 extends along a direction away from the distal side 491, and the extension structures 4921 are not overlapped with one another in a direction in parallel with the optical path 401. The recessed structures 4922 are connected to and located between two adjacent extension structures 4921 and are recessed along a direction towards the distal side 491.

The light-blocking membrane layer 490 further has a plurality of light-blocking areas 493. The light-blocking areas 493 are spaced apart from one another and disposed on the optical surface 442. The light-blocking areas 493 includes a plurality of first light-blocking areas 4931 and a plurality of second light-blocking areas 4932, and the first light-blocking areas 4931 are located closer to the optical path 401 than the second light-blocking areas 4932.

A thickness of the light-blocking membrane layer 490 gradually decreases from the recessed structures 4922 to the extension structures 4921. In other words, a thickness of the light-blocking membrane layer 490 gradually increases from a side of the extension structures 4921 close to the optical path 401 towards the recessed structures 4922. Also, a thickness of the first light-blocking areas 4931 is smaller than a thickness of the second light-blocking areas 4932. It is noted that for clearly showing the coating range of the light-blocking membrane layer 490, the light-blocking membrane layer 490 in FIG. 36 is not at its real scale.

When a shortest distance between the extension structures 4921 at a side farthest from the distal side 491 is ΔG, the following condition is satisfied: ΔG=83 [um].

When a shortest distance between the first light-blocking areas 4931 and rest areas of the light-blocking membrane layer 490 is D1, and a shortest distance between the second light-blocking areas 4932 and rest areas of the light-blocking membrane layer 490 is D2, the following conditions are satisfied: D1=27.5 [um]; D2=21.3 [um]; and D2/D1=0.775.

When an average thickness of the light-blocking membrane layer 490 is T, the following condition is satisfied: 0.9 [um]≤T≤10 [um].

As shown in the cross-sectional view of FIG. 36, when a longest distance in parallel with the optical path 401 between the extension structures 4921 and the recessed structures 4922 is ΔH, the following condition is satisfied: ΔH=2.5 [um] while in the cross-sectional view of FIG. 36.

When a longest distance in parallel with the optical path 401 between the first light-blocking areas 4931 and the second light-blocking areas 4932 is ΔHs, the following condition can be satisfied: 0.5 [um]≤ΔHs≤249.5 [um].

5th Embodiment

Figure 39:
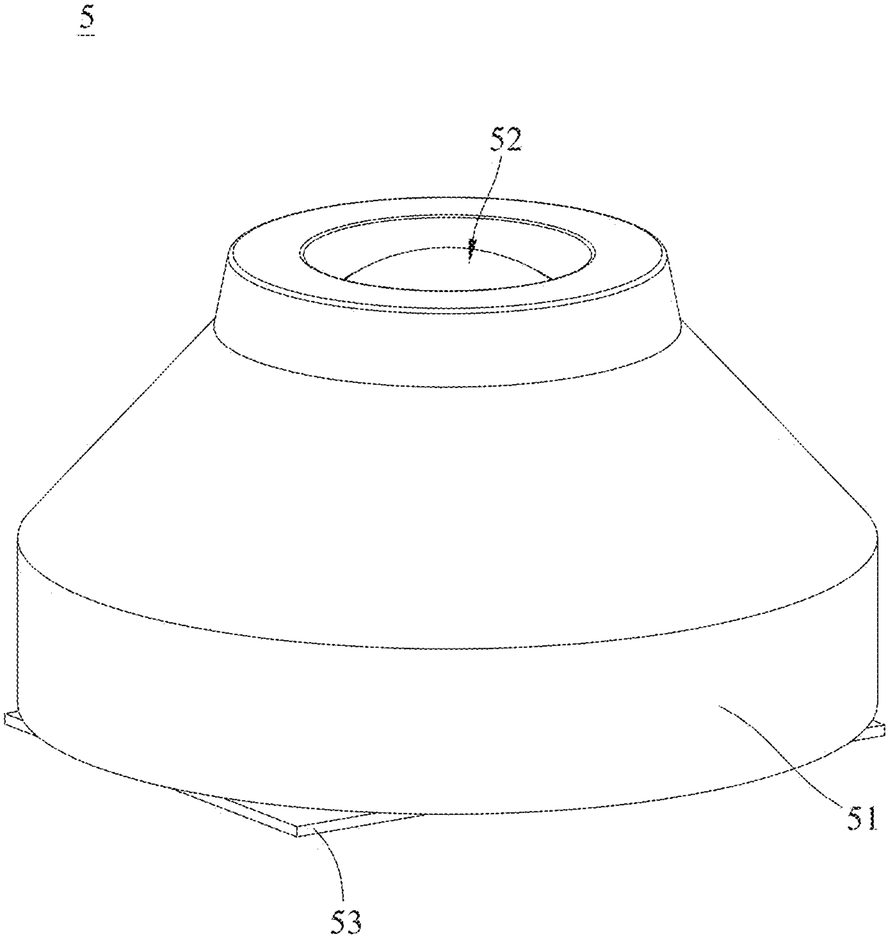
FIG. 39 is an isometric view of an optical unit according to the 5th embodiment of the present disclosure.
Figure 40:
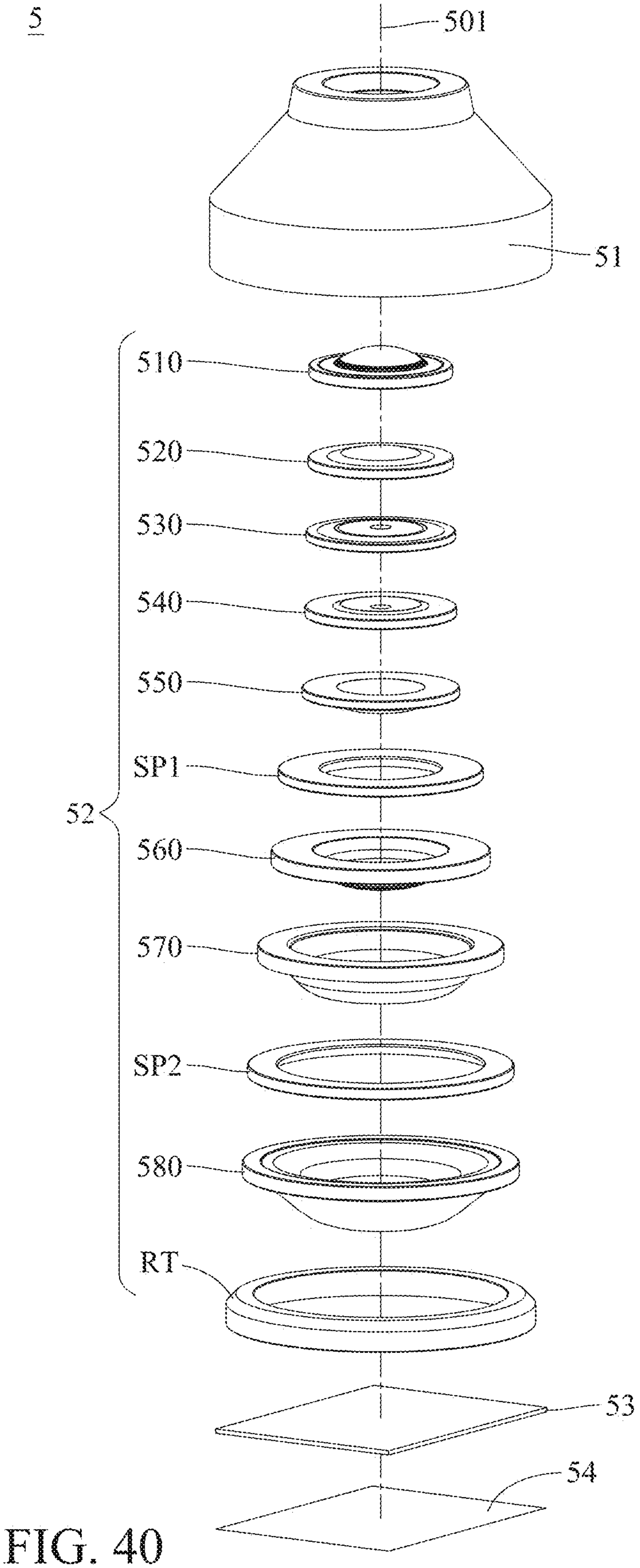
FIG. 40 is an exploded view of the optical unit in FIG. 39.
Figure 41:
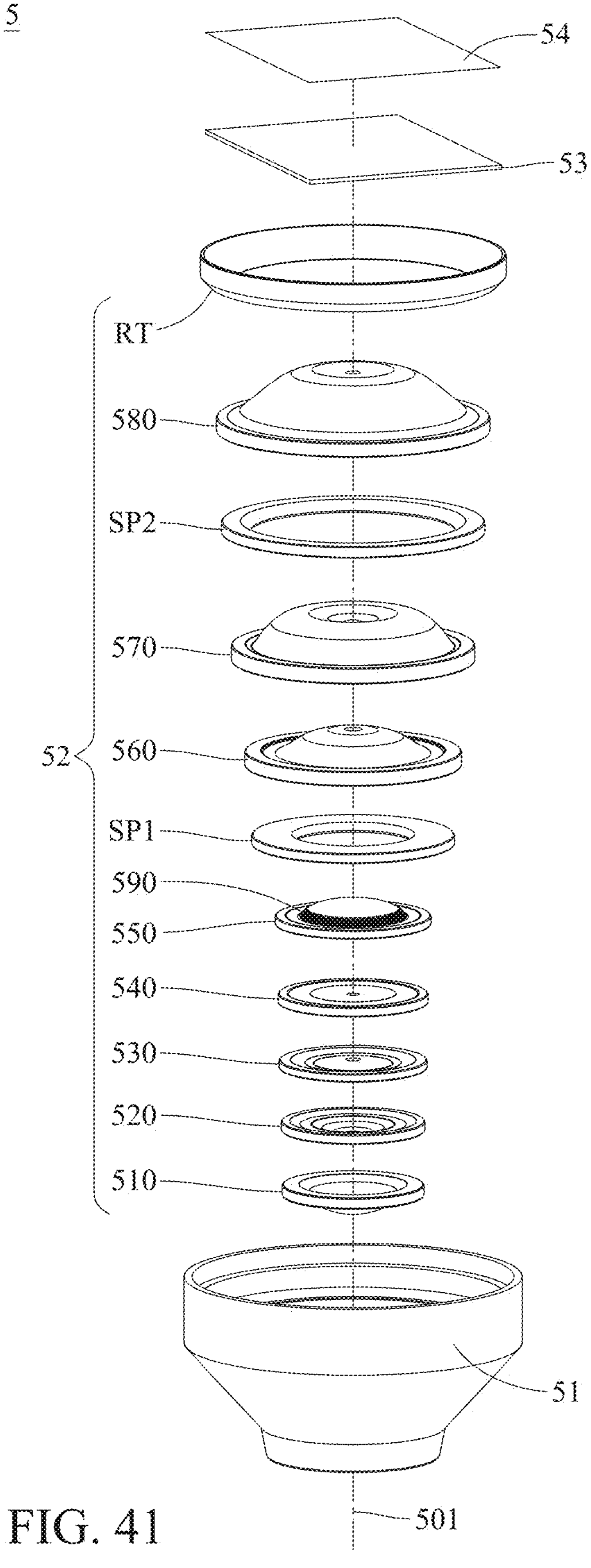
FIG. 41 is another exploded view of the optical unit in FIG. 39.
Figure 42:
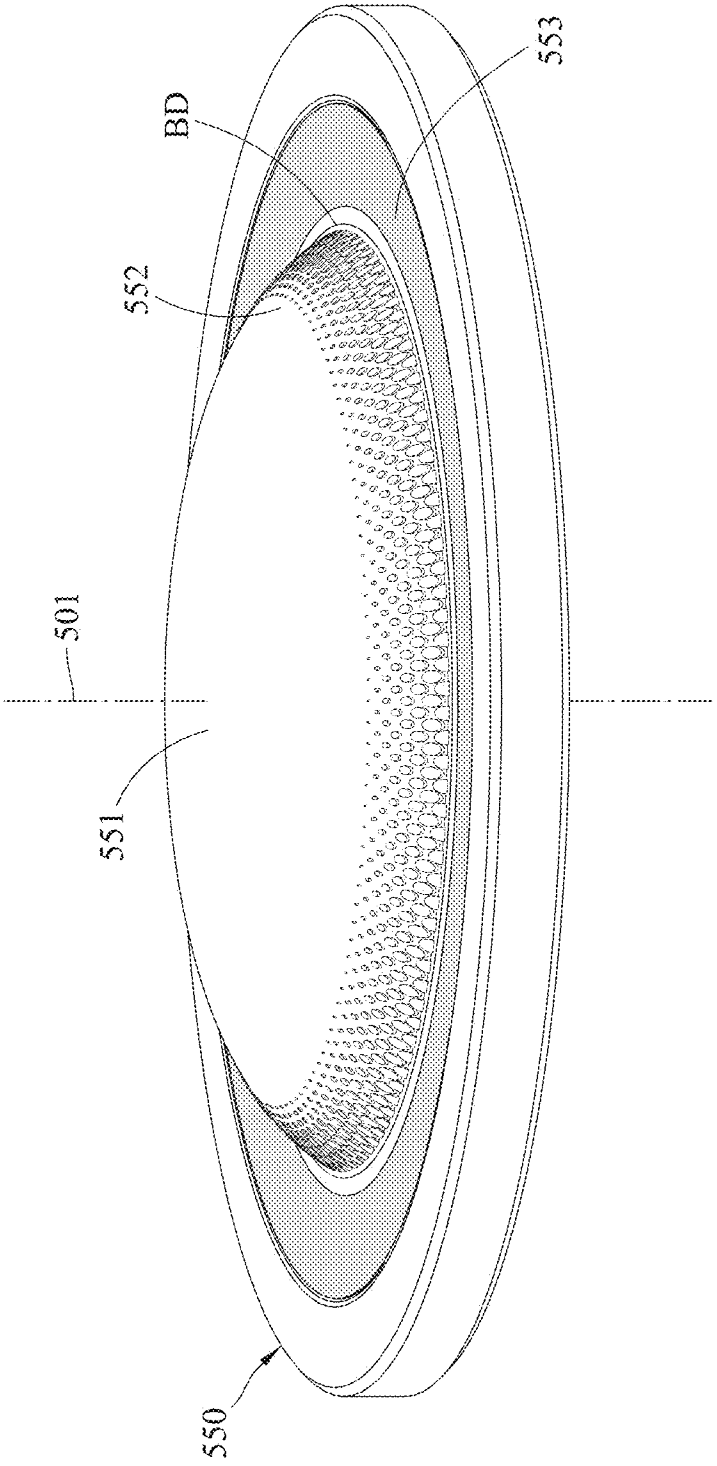
FIG. 42 is an enlarged view of a fifth lens element of the optical unit in FIG. 41.
Figure 44:
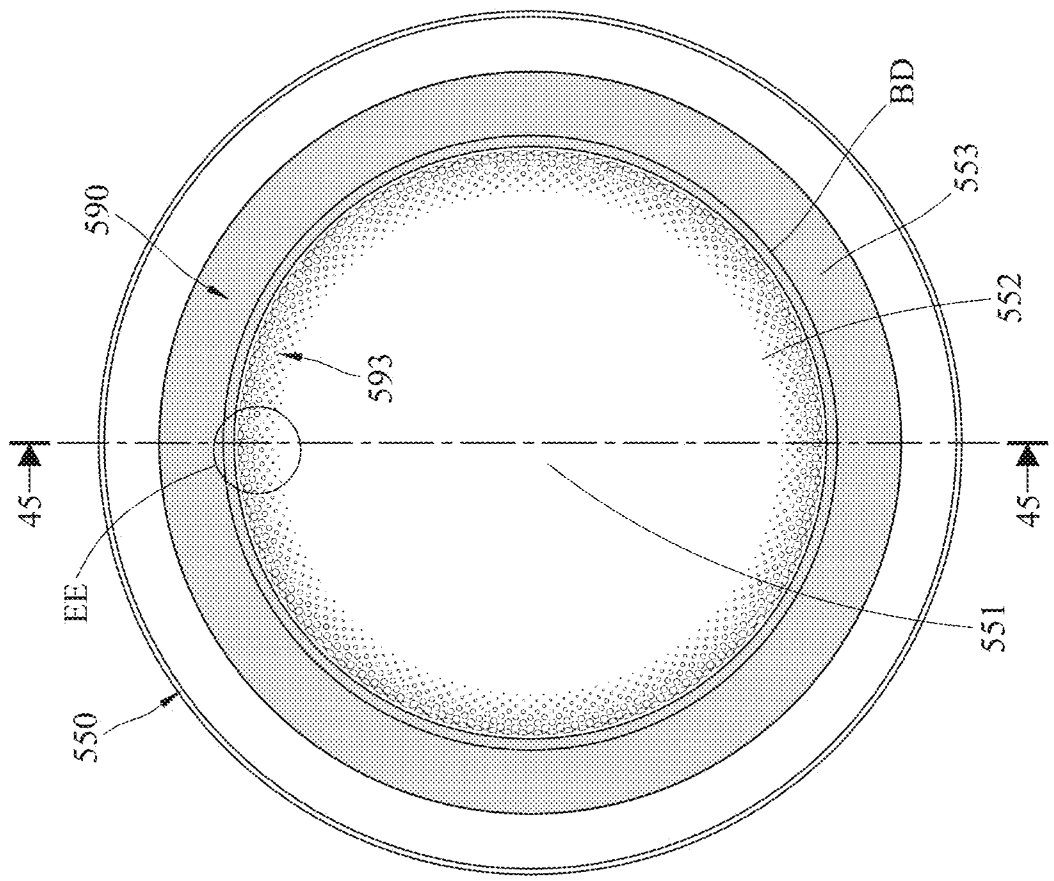
FIG. 44 is an image-side view of the fifth lens element in FIG. 42.
Figure 43:
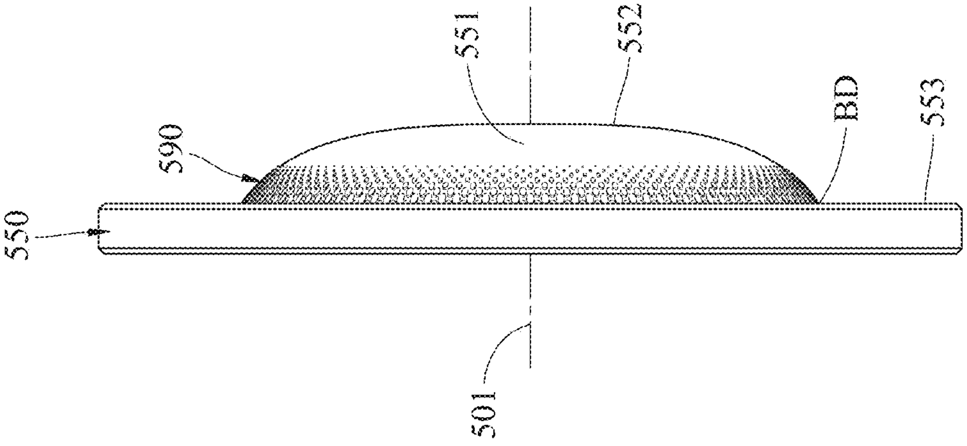
FIG. 43 is a side view of the fifth lens element in FIG. 42.
Figure 46:
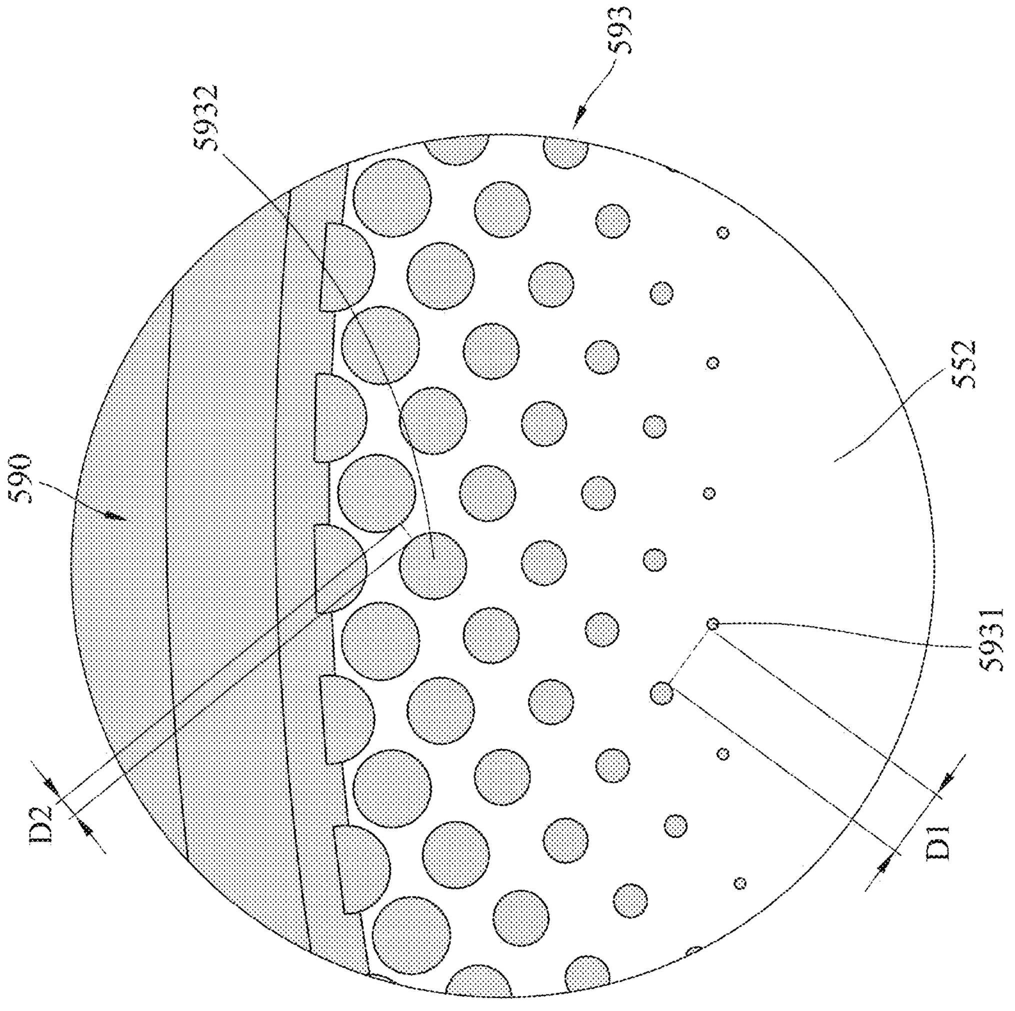
FIG. 46 is an enlarged view of EE region of the fifth lens element in FIG. 44.
Figure 45:
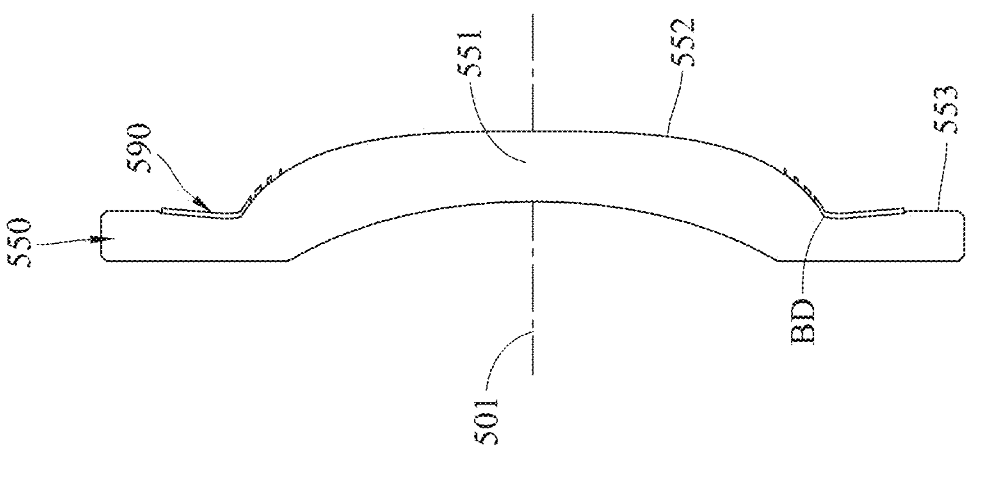
FIG. 45 is a cross-sectional view of the fifth lens element in FIG. 44 taken along line 45-45.

Please refer to FIG. 39 to FIG. 46, where FIG. 39 is an isometric view of an optical unit according to the 5th embodiment of the present disclosure, FIG. 40 is an exploded view of the optical unit in FIG. 39, FIG. 41 is another exploded view of the optical unit in FIG. 39, FIG. 42 is an enlarged view of a fifth lens element of the optical unit in FIG. 41, FIG. 43 is a side view of the fifth lens element in FIG. 42, FIG. 44 is an image-side view of the fifth lens element in FIG. 42, FIG. 45 is a cross-sectional view of the fifth lens element in FIG. 44 taken along line 45-45, and FIG. 46 is an enlarged view of EE region of the fifth lens element in FIG. 44.

In this embodiment, the optical unit 5 is an image lens. The optical unit 5 includes a carrier 51, a lens assembly 52 and a filter 53 and has an image surface 54. The carrier 51 accommodates the lens assembly 52. The lens assembly 52 has an optical path 501 and includes, in order from an object side to an image side along the optical path 501, a first lens element 510, a second lens element 520, a third lens element 530, a fourth lens element 540, a fifth lens element 550, a light-blocking membrane layer 590, a first spacer SP1, a sixth lens element 560, a seventh lens element 570, a second spacer SP2, an eighth lens element 580 and a retainer RT. The filter 53 is located at an image side of the lens assembly 52. The image surface 54 is located at an image side of the filter 53. Light will be converged and then image on the image surface 54 after passing through the lens assembly 52. When a maximum image height of the lens assembly 52 is 8.2 millimeters (mm), half of a maximum field of view (HFOV) is correspondingly 42.5 degrees, and the optical unit 5 is therefore a wide-angle lens.

The fifth lens element 550 has an optical portion 551, and the optical path 501 passes through the optical portion 551. The fifth lens element 550 further has an optical surface 552 and a connection surface 553 at an image side thereof. The optical surface 552 is a light-passable aspheric surface. The optical portion 551 passes through the optical surface 552, and the optical portion 551 generates refraction on the optical surface 552. The connection surface 553 is connected to the optical surface 552 with a boundary BD therebetween.

The light-blocking membrane layer 590 is surrounding and disposed adjacent to the optical portion 551 and is coated on the optical surface 552, the boundary BD and the connection surface 553 of the fifth lens element 550 so as to reduce stray light generated at the boundary BD and thus increase optical quality.

The light-blocking membrane layer 590 has a plurality of light-blocking areas 593. The light-blocking areas 593 are spaced apart from one another and disposed on the optical surface 552. The light-blocking areas 593 includes a plurality of first light-blocking areas 5931 and a plurality of second light-blocking areas 5932, and the first light-blocking areas 5931 are located closer to the optical path 501 than the second light-blocking areas 5932.

A thickness of the first light-blocking areas 5931 is smaller than a thickness of the second light-blocking areas 5932. It is noted that for clearly showing the coating range of the light-blocking membrane layer 590, the light-blocking membrane layer 590 in FIG. 45 is not at its real scale.

When a shortest distance between the first light-blocking areas 5931 and rest areas of the light-blocking membrane layer 590 is D1, and a shortest distance between the second light-blocking areas 5932 and rest areas of the light-blocking membrane layer 590 is D2, the following conditions are satisfied: D1=15.7 [um]; D2=4.45 [um]; and D2/D1=0.286.

When an average thickness of the light-blocking membrane layer 590 is T, the following condition is satisfied: 0.9 [um]≤T≤10 [um].

When a longest distance in parallel with the optical path 501 between the first light-blocking areas 5931 and the second light-blocking areas 5932 is ΔHs, the following condition can be satisfied: 0.5 [um]≤ΔHs≤249.5 [um].

6th Embodiment

Figure 47:
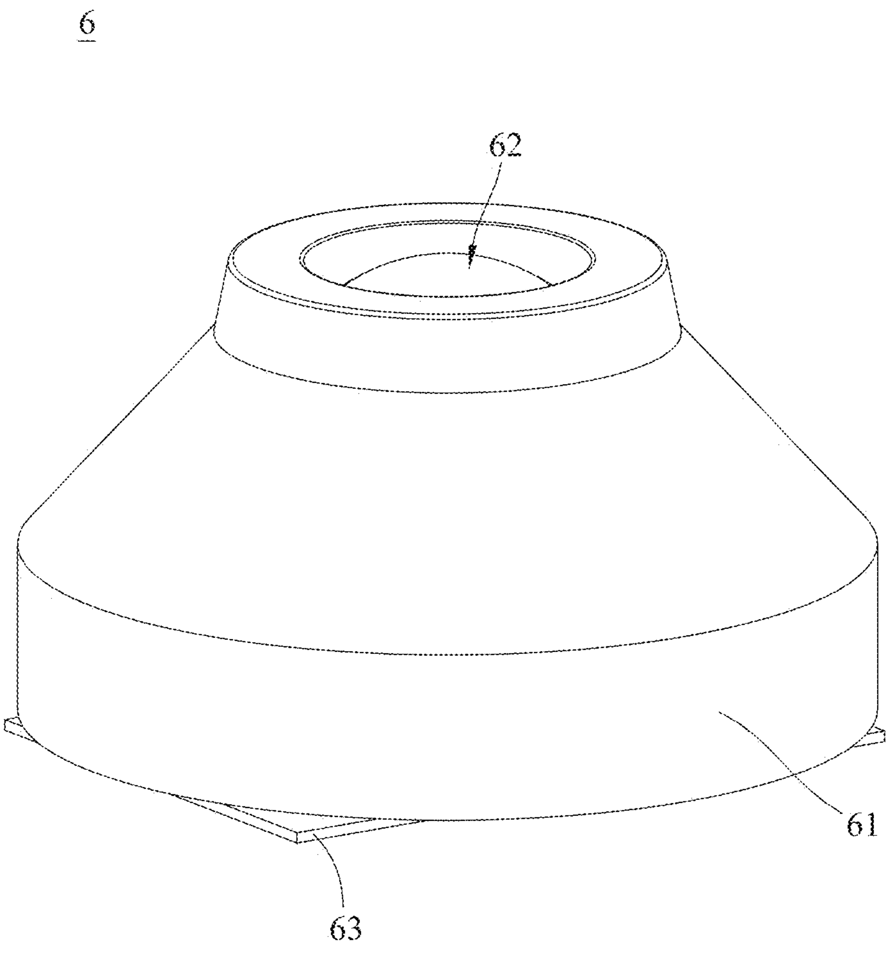
FIG. 47 is an isometric view of an optical unit according to the 6th embodiment of the present disclosure.
Figure 48:
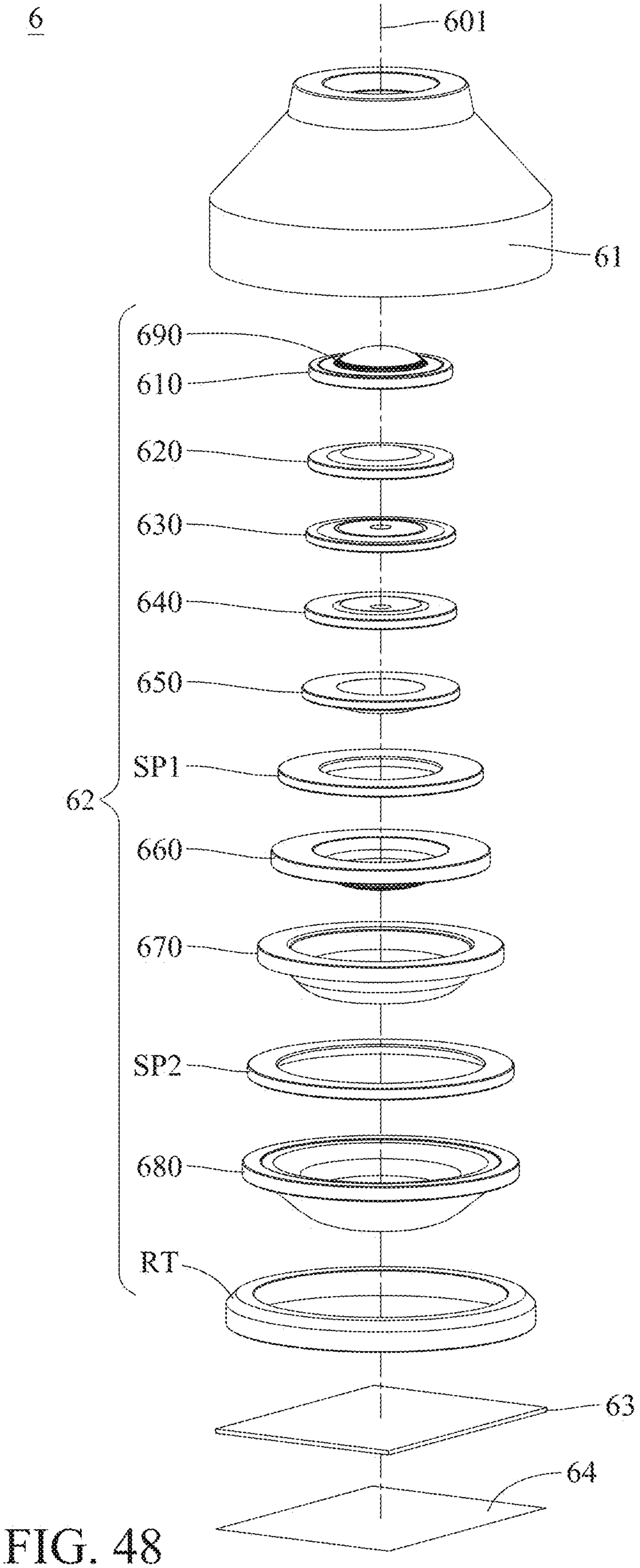
FIG. 48 is an exploded view of the optical unit in FIG. 47.
Figure 49:
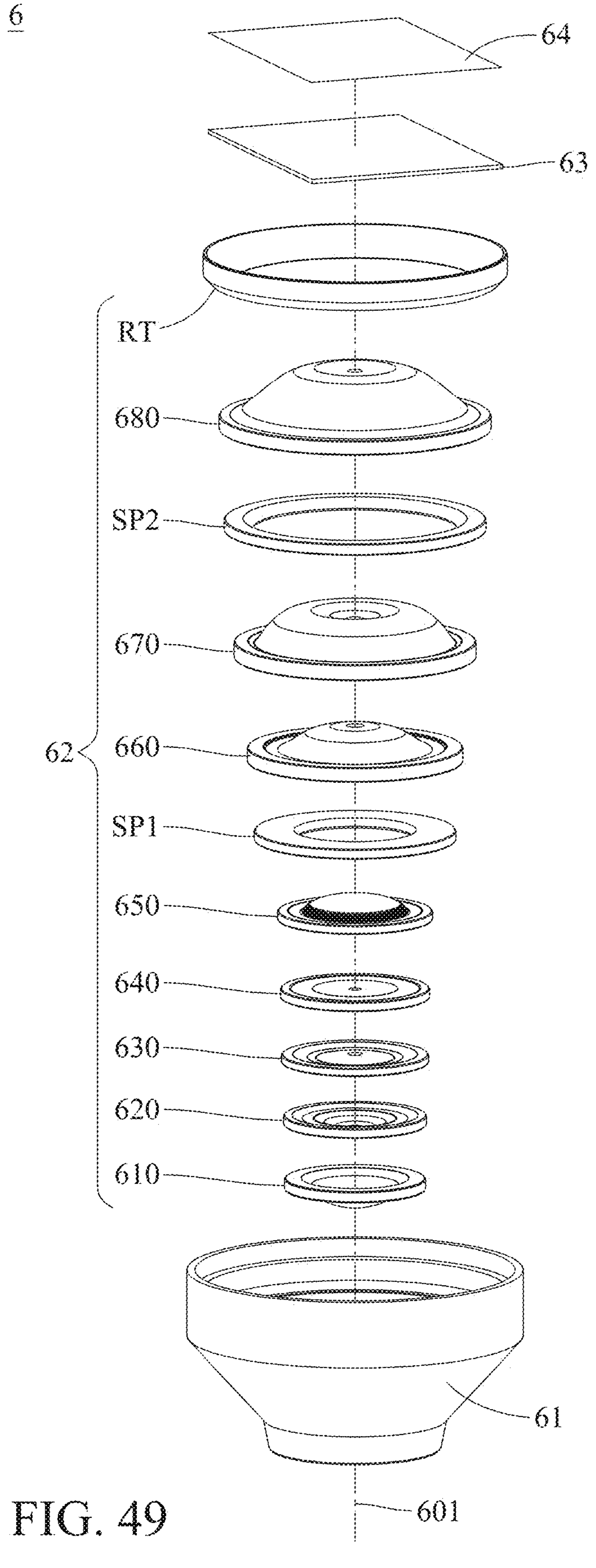
FIG. 49 is another exploded view of the optical unit in FIG. 47.
Figure 50:
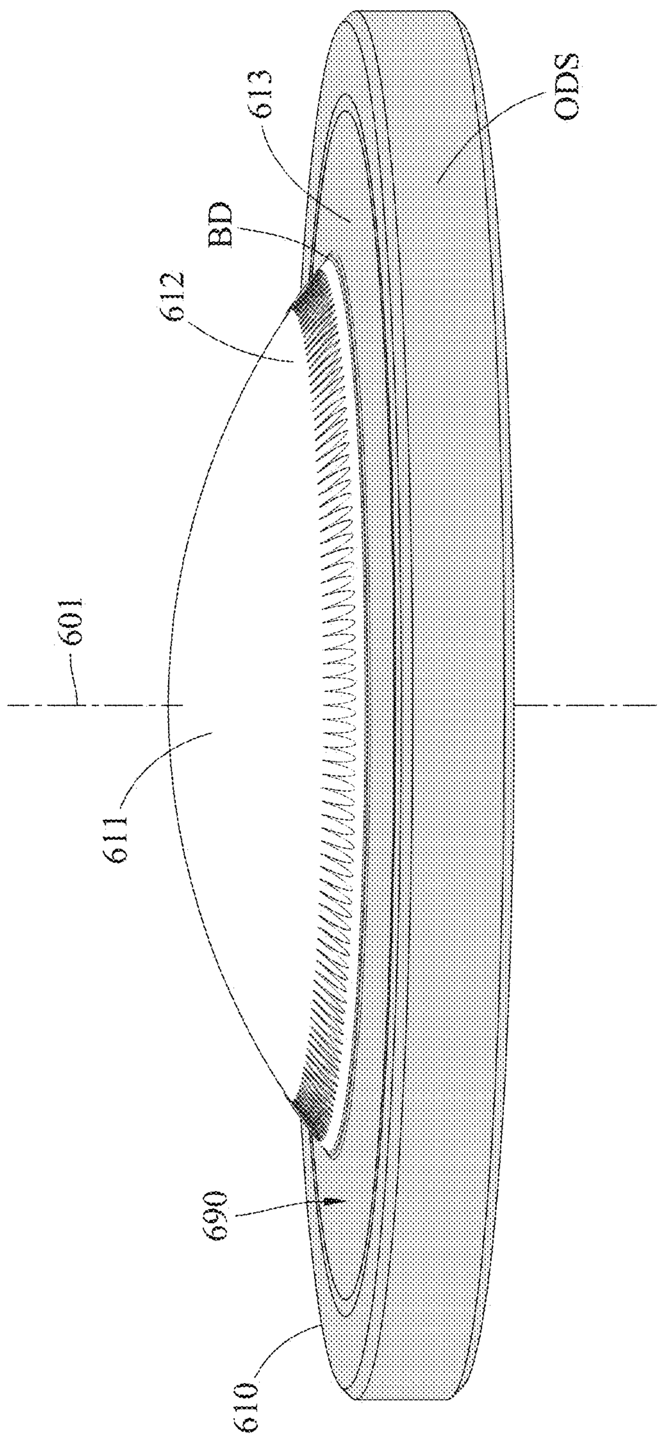
FIG. 50 is an enlarged view of a first lens element of the optical unit in FIG. 48.
Figure 53:
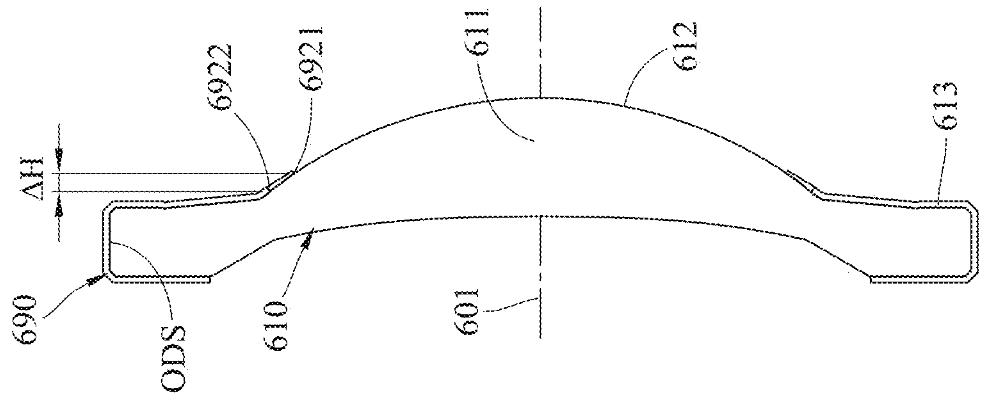
FIG. 53 is a cross-sectional view of the first lens element in FIG. 52 taken along line 53-53.
Figure 52:
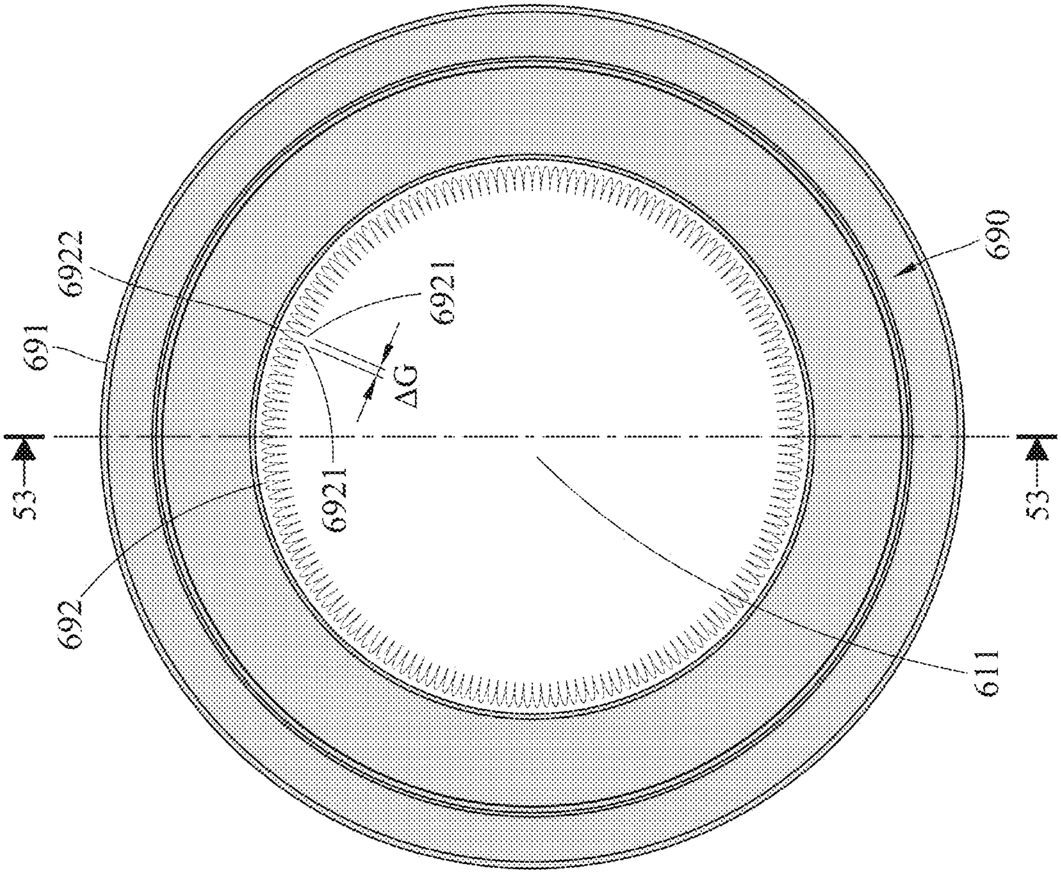
FIG. 52 is an object-side view of the first lens element in FIG. 50.
Figure 51:
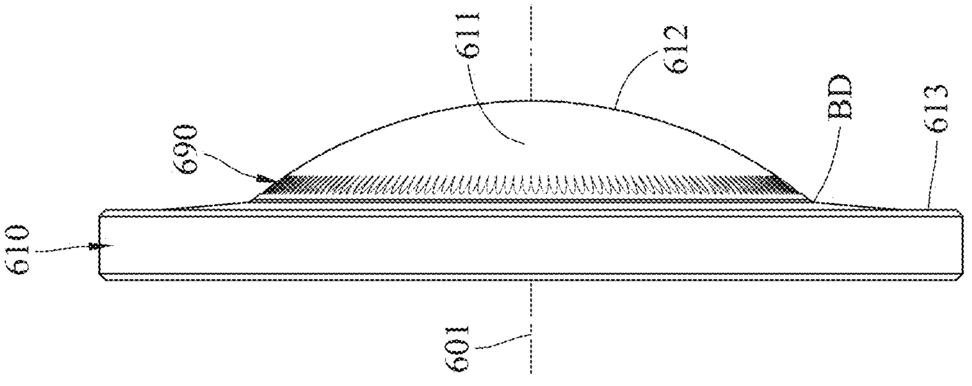
FIG. 51 is a side view of the first lens element in FIG. 50.

Please refer to FIG. 47 to FIG. 53, where FIG. 47 is an isometric view of an optical unit according to the 6th embodiment of the present disclosure, FIG. 48 is an exploded view of the optical unit in FIG. 47, FIG. 49 is another exploded view of the optical unit in FIG. 47, FIG. 50 is an enlarged view of a first lens element of the optical unit in FIG. 48, FIG. 51 is a side view of the first lens element in FIG. 50, FIG. 52 is an object-side view of the first lens element in FIG. 50, and FIG. 53 is a cross-sectional view of the first lens element in FIG. 52 taken along line 53-53.

In this embodiment, the optical unit 6 is an image lens. The optical unit 6 includes a carrier 61, a lens assembly 62 and a filter 63 and has an image surface 64. The carrier 61 accommodates the lens assembly 62. The lens assembly 62 has an optical path 601 and includes, in order from an object side to an image side along the optical path 601, a light-blocking membrane layer 690, a first lens element 610, a second lens element 620, a third lens element 630, a fourth lens element 640, a fifth lens element 650, a first spacer SP1, a sixth lens element 660, a seventh lens element 670, a second spacer SP2, an eighth lens element 680 and a retainer RT. The filter 63 is located at an image side of the lens assembly 62. The image surface 64 is located at an image side of the filter 63. Light will be converged and then image on the image surface 64 after passing through the lens assembly 62. When a maximum image height of the lens assembly 62 is 8.2 millimeters (mm), half of a maximum field of view (HFOV) is correspondingly 42.5 degrees, and the optical unit 6 is therefore a wide-angle lens.

The first lens element 610 has an optical portion 611, and the optical path 601 passes through the optical portion 611. The first lens element 610 further has an optical surface 612 and a connection surface 613 at an object side thereof. The optical surface 612 is a light-passable aspheric surface. The optical portion 611 passes through the optical surface 612, and the optical portion 611 generates refraction on the optical surface 612. The connection surface 613 is connected to the optical surface 612 with a boundary BD therebetween.

The light-blocking membrane layer 690 is surrounding and disposed adjacent to the optical portion 611 and is coated on the optical surface 612, the boundary BD, the connection surface 613, an outer diameter surface ODS and a non-optical-effect area (not numbered) at an image side of the first lens element 610 so as to reduce stray light generated at the boundary BD, the junction between the connection surface 613 and the outer diameter surface ODS, and the junction between the outer diameter surface ODS and the non-optical-effect area and thus increase optical quality.

The light-blocking membrane layer 690 has a distal side 691 and a proximal side 692. The proximal side 692 is located closer to the optical portion 611 than the distal side 691. The proximal side 692 includes a plurality of extension structures 6921 and a plurality of recessed structures 6922. The extension structures 6921 and the recessed structures 6922 are disposed on the optical surface 612. Each of the extension structures 6921 extends along a direction away from the distal side 691, and the extension structures 6921 are not overlapped with one another in a direction in parallel with the optical path 601. The recessed structures 6922 are connected to and located between two adjacent extension structures 6921 and are recessed along a direction towards the distal side 691.

A thickness of the light-blocking membrane layer 690 gradually decreases from the recessed structures 6922 to the extension structures 6921. In other word, a thickness of the light-blocking membrane layer 690 gradually increases from a side of the extension structures 6921 close to the optical path 601 towards the recessed structures 6922. It is noted that for clearly showing the coating range of the light-blocking membrane layer 690, the light-blocking membrane layer 690 in FIG. 53 is not at its real scale.

When a shortest distance between the extension structures 6921 at a side farthest from the distal side 691 is ΔG, the following condition is satisfied: ΔG=7 [um].

When an average thickness of the light-blocking membrane layer 690 is T, the following condition is satisfied: 0.9 [um]≤T≤10 [um].

As shown in the cross-sectional views of FIG. 53, when a longest distance in parallel with the optical path 601 between the extension structures 6921 and the recessed structures 6922 is ΔH, the following condition is satisfied: ΔH=1.25 [um] while in the cross-sectional view of FIG. 53.

7th Embodiment

Figure 54:
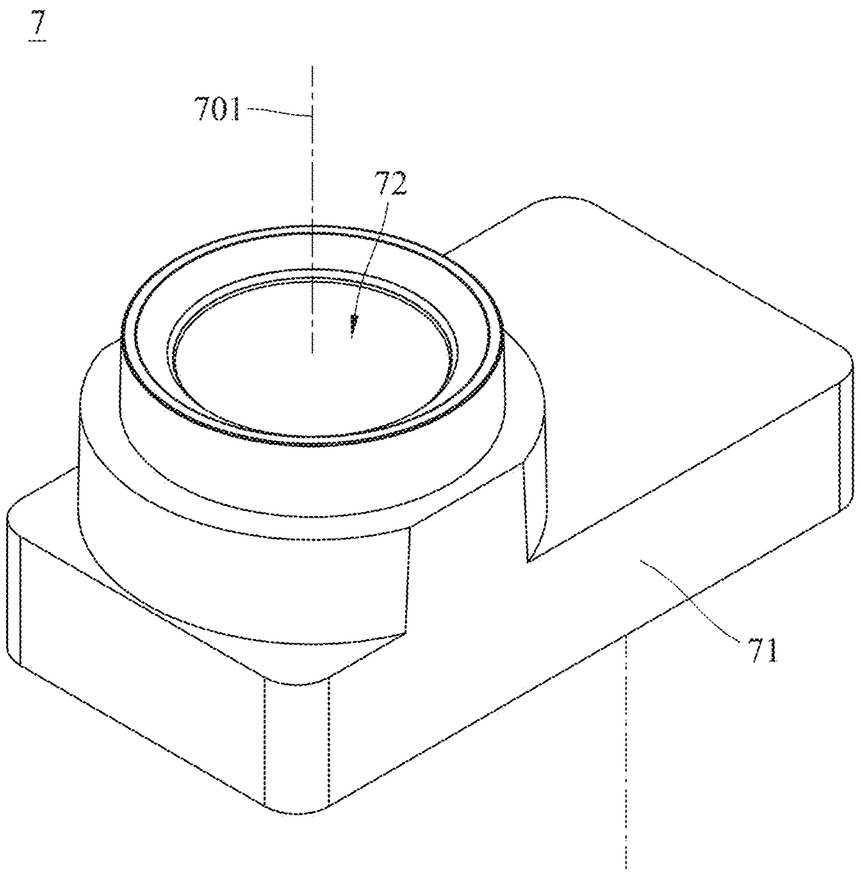
FIG. 54 is an isometric view of an optical unit according to the 7th embodiment of the present disclosure.
Figure 55:
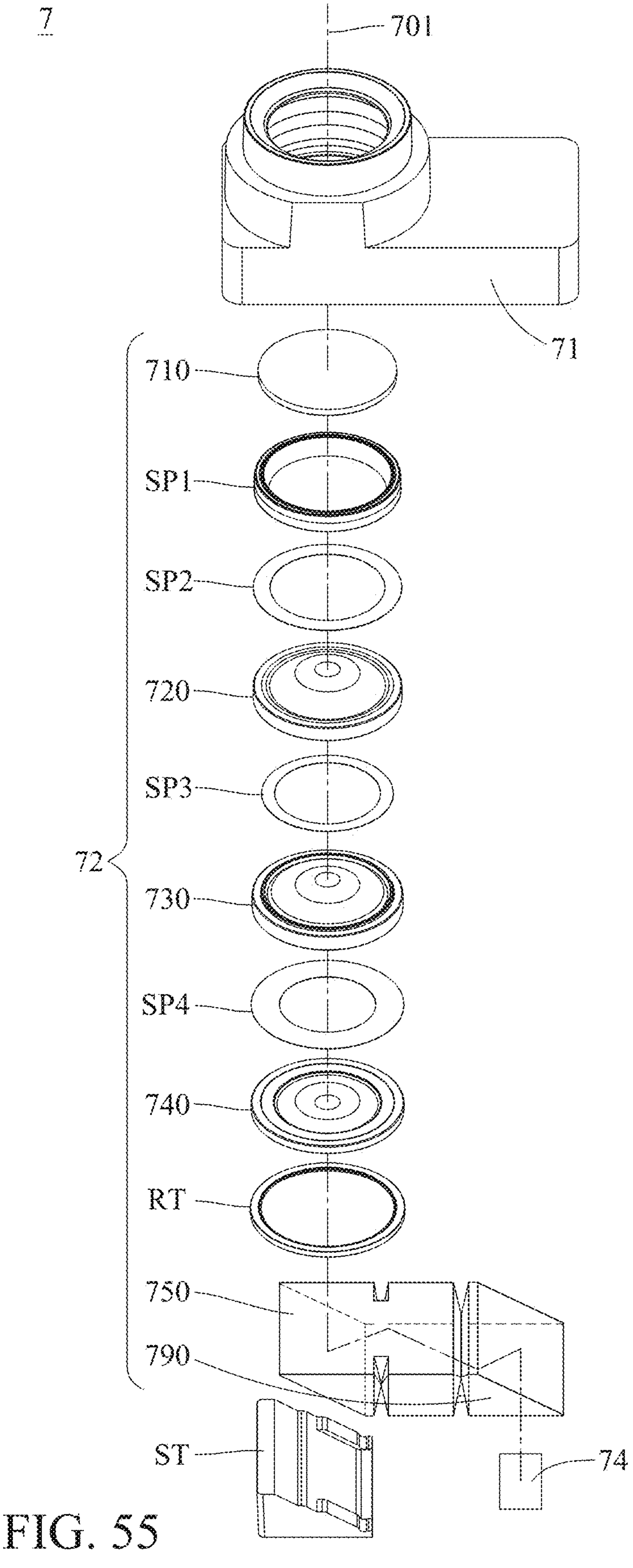
FIG. 55 is an exploded view of the optical unit in FIG. 54.
Figure 56:
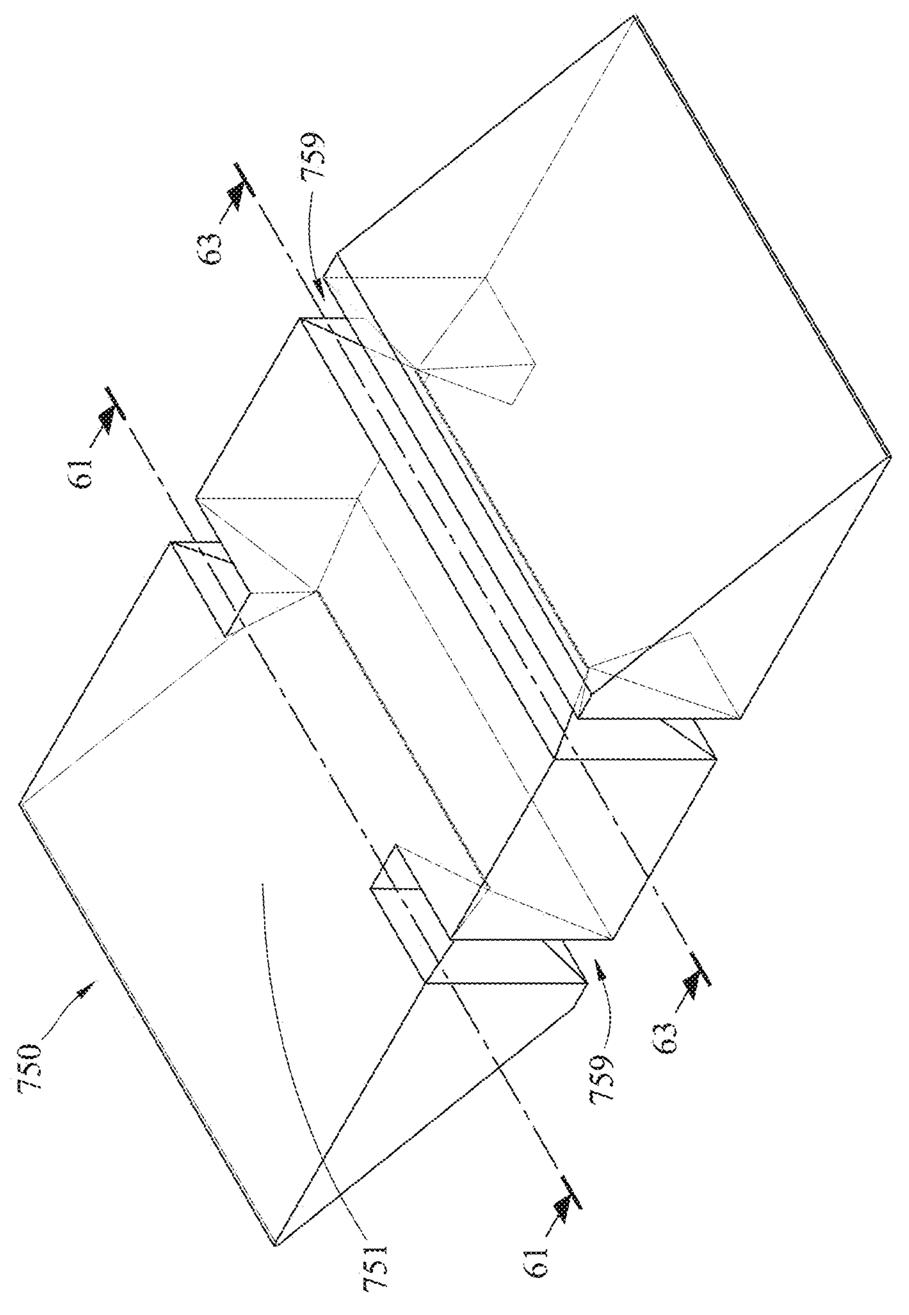
FIG. 56 is an enlarged view of a reflection component of the optical unit in FIG. 55.
Figure 57:
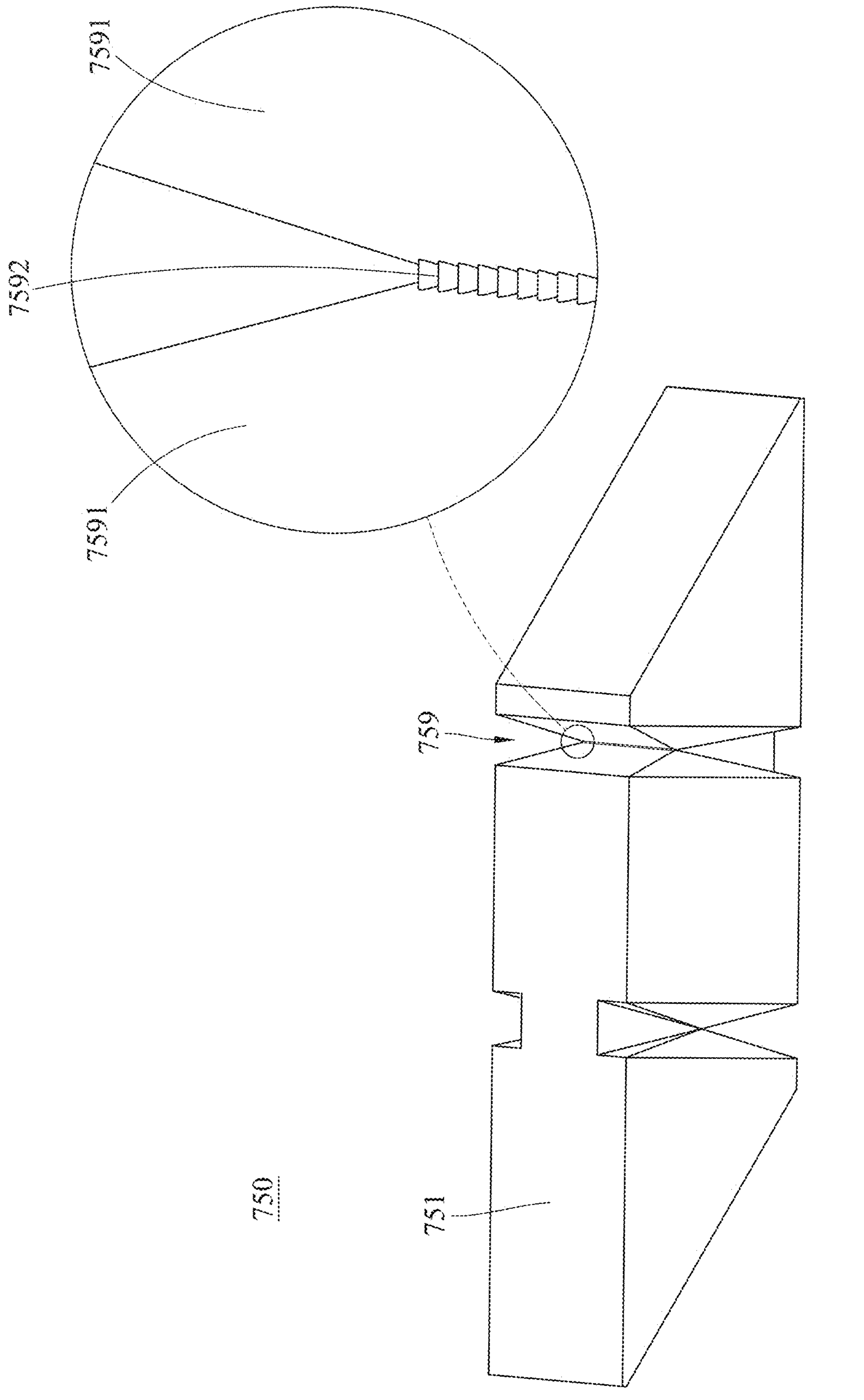
FIG. 57 is an isometric view of the reflection component in FIG. 56 with no light-blocking membrane layer coated thereon.
Figure 58:
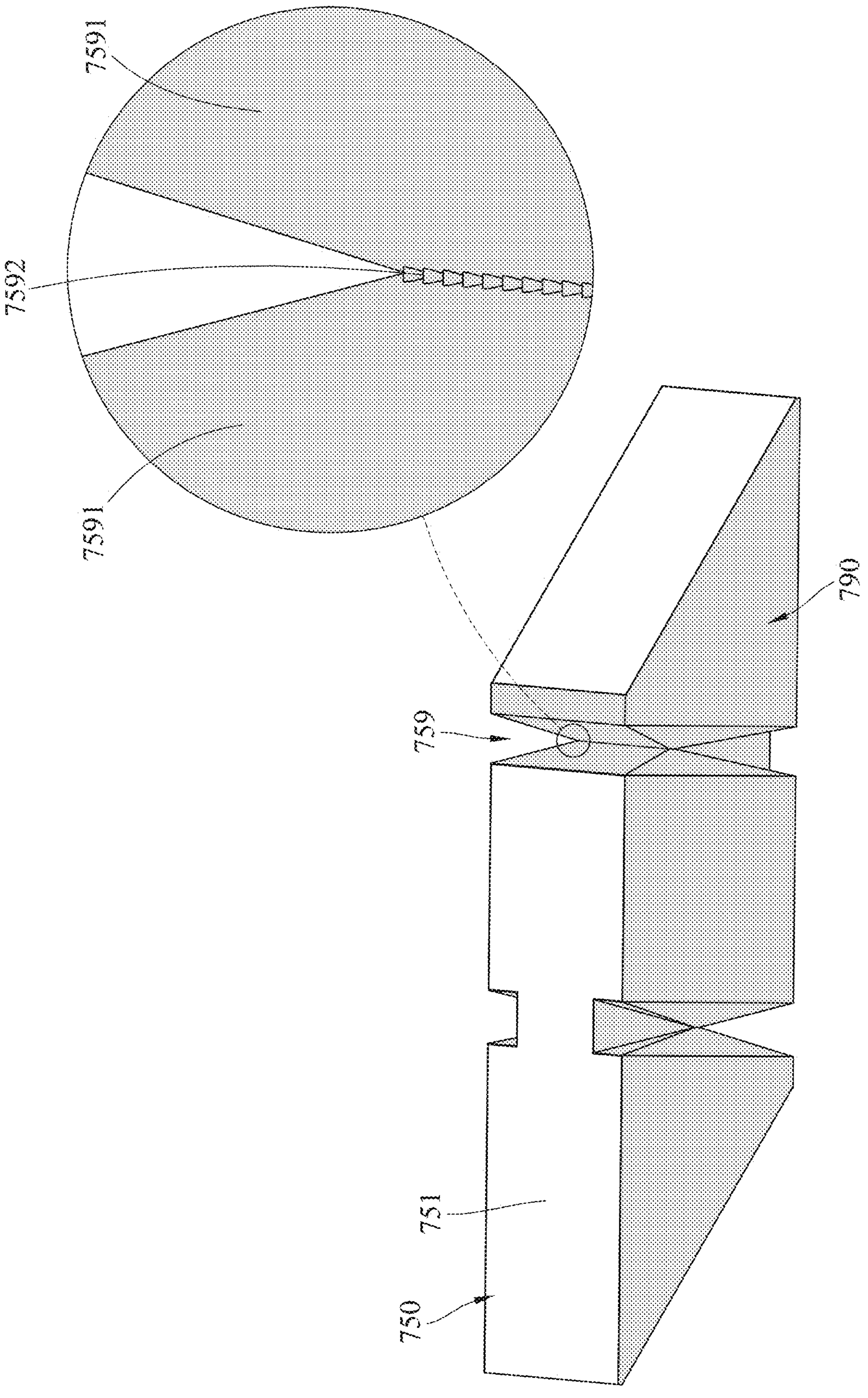
FIG. 58 is an isometric view of the reflection component in FIG. 56 with a light-blocking membrane layer coated thereon.
Figure 59:
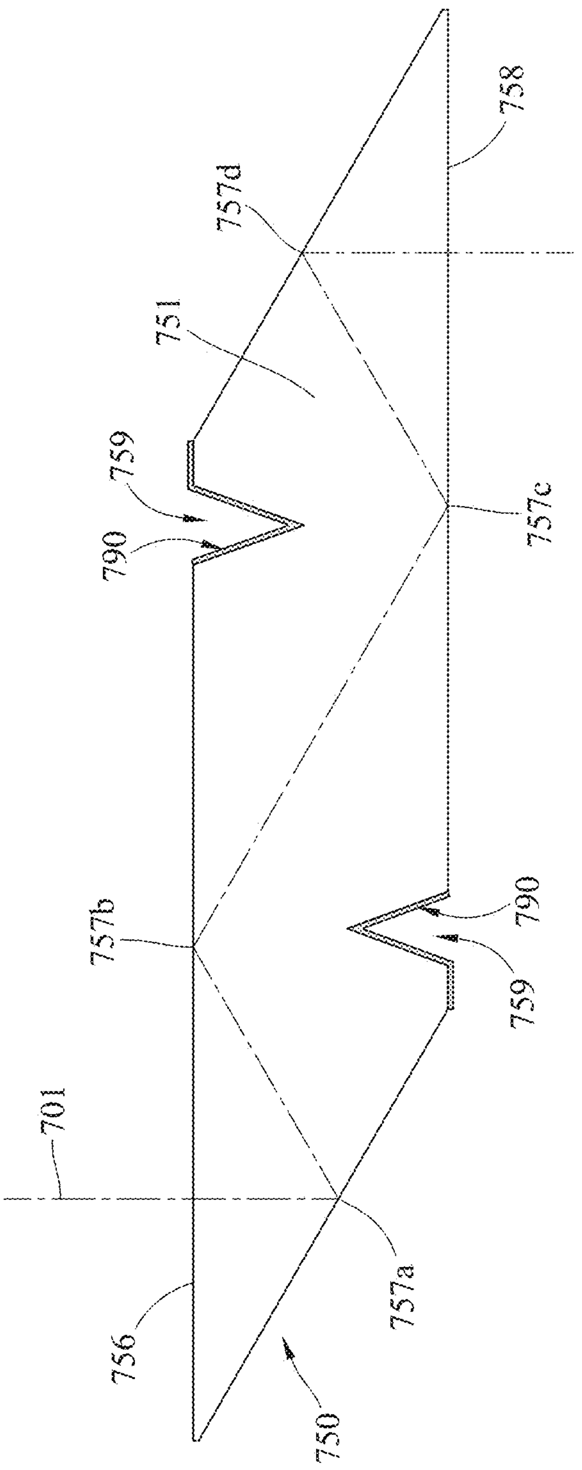
FIG. 59 is a side view of the reflection component in FIG. 58.
Figure 60:
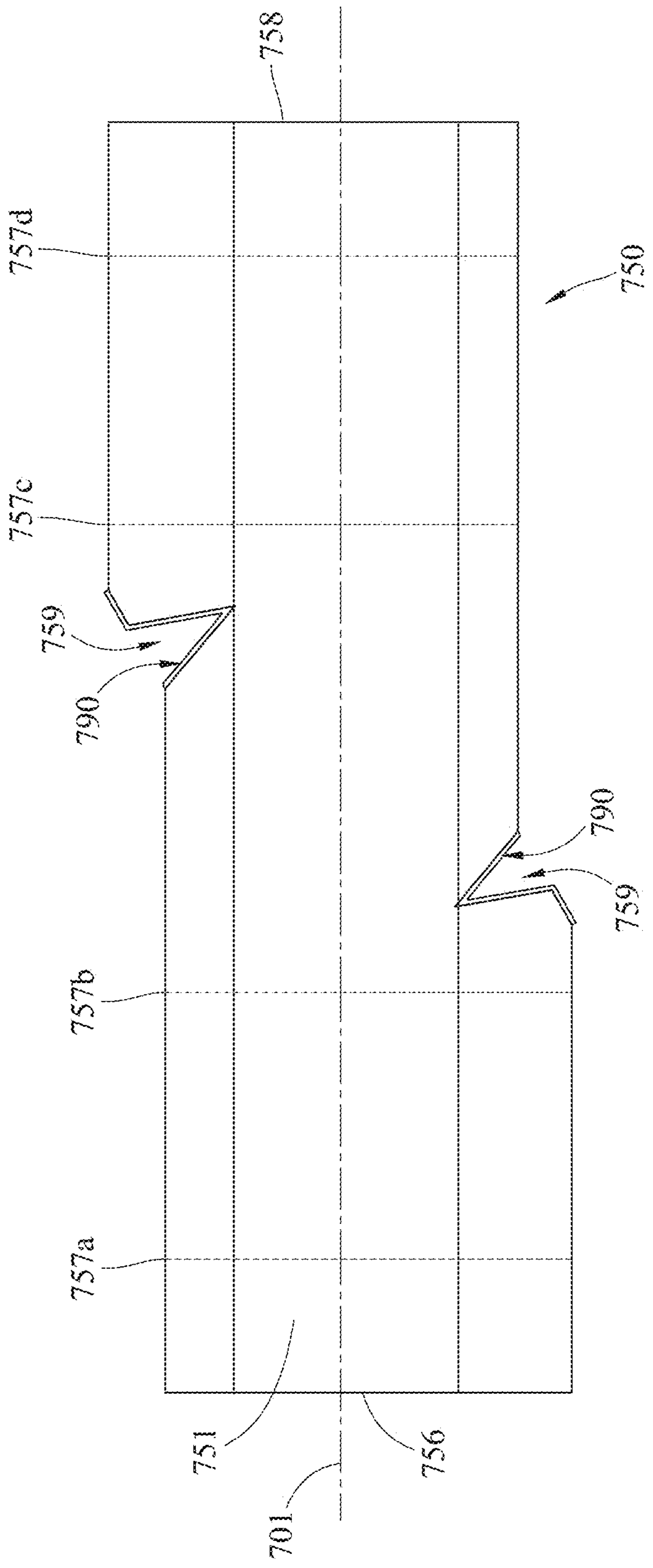
FIG. 60 is another side view of the reflection component in FIG. 58.
Figure 61:
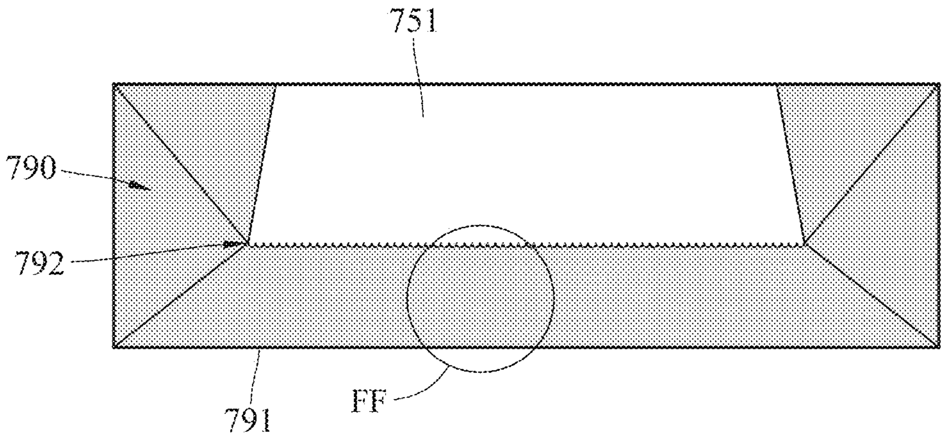
FIG. 61 is a cross-sectional view of the reflection component in FIG. 56 taken along line 61-61.
Figure 62:
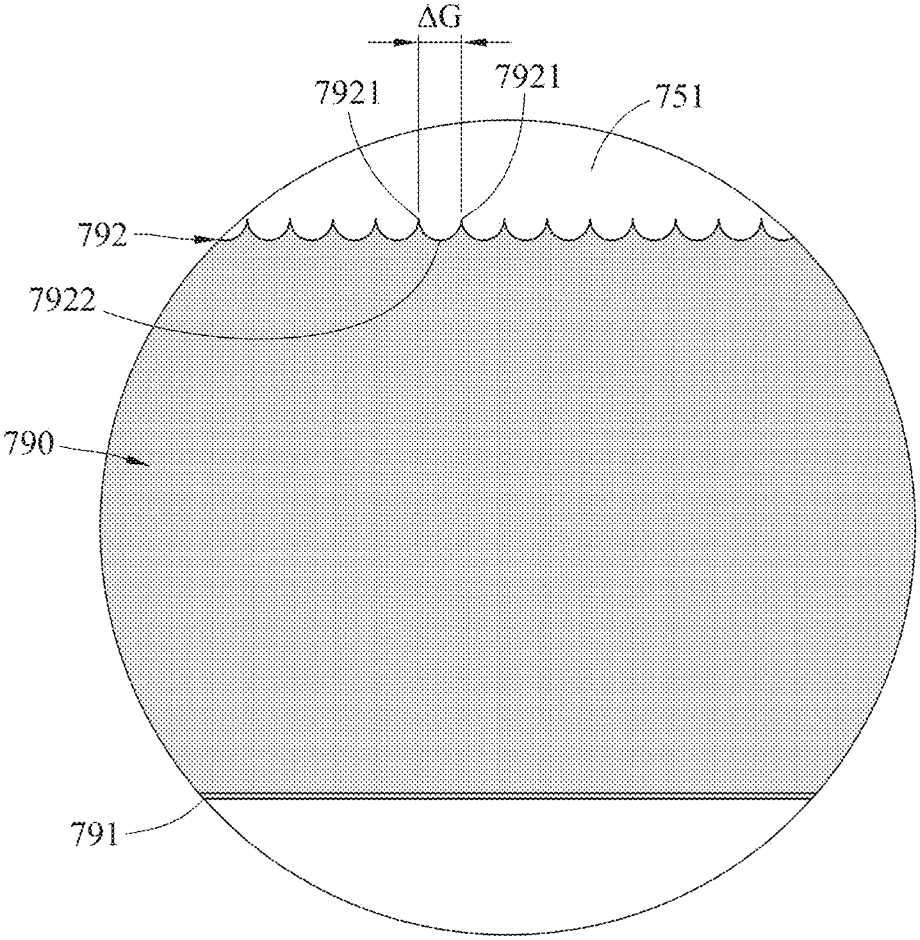
FIG. 62 is an enlarged view of FF region of the reflection component in FIG. 61.
Figure 63:
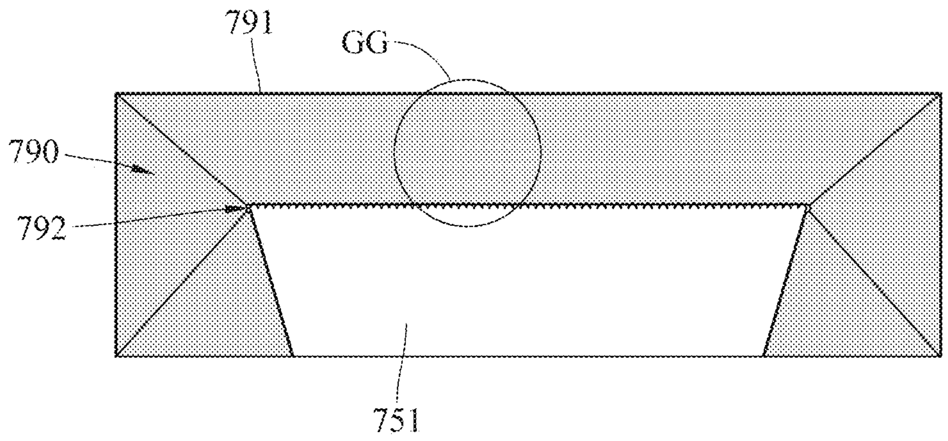
FIG. 63 is a cross-sectional view of the reflection component in FIG. 56 taken along line 63-63.
Figure 64:
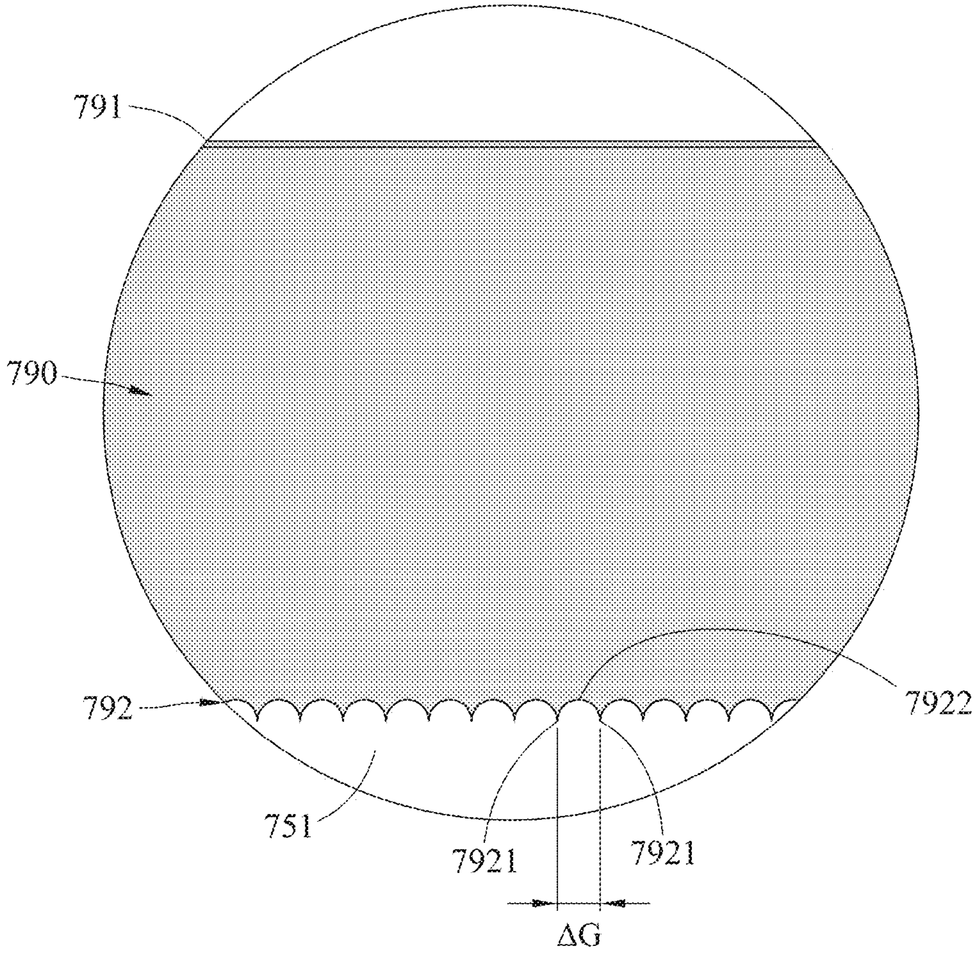
FIG. 64 is an enlarged view of GG region of the reflection component in FIG. 63.

Please refer to FIG. 54 to FIG. 64, where FIG. 54 is an isometric view of an optical unit according to the 7th embodiment of the present disclosure, FIG. 55 is an exploded view of the optical unit in FIG. 54, FIG. 56 is an enlarged view of a reflection component of the optical unit in FIG. 55, FIG. 57 is an isometric view of the reflection component in FIG. 56 with no light-blocking membrane layer coated thereon, FIG. 58 is an isometric view of the reflection component in FIG. 56 with a light-blocking membrane layer coated thereon, FIG. 59 is a side view of the reflection component in FIG. 58, FIG. 60 is another side view of the reflection component in FIG. 58, FIG. 61 is a cross-sectional view of the reflection component in FIG. 56 taken along line 61-61, FIG. 62 is an enlarged view of FF region of the reflection component in FIG. 61, FIG. 63 is a cross-sectional view of the reflection component in FIG. 56 taken along line 63-63, and FIG. 64 is an enlarged view of GG region of the reflection component in FIG. 63.

In this embodiment, the optical unit 7 is an image lens. The optical unit 7 includes a carrier 71, a lens assembly 72 and a supporter ST and has an image surface 74. The carrier 71 accommodates the lens assembly 72. The lens assembly 72 has an optical path 701 and includes, in order from an object side to an image side along the optical path 701, a first lens element 710, a first spacer SP1, a second spacer SP2, a second lens element 720, a third spacer SP3, a third lens element 730, a fourth spacer SP4, a fourth lens element 740, a retainer RT, a reflection component 750 and a light-blocking membrane layer 790. The supporter ST is located closer to the image side than part of the reflection component 750 and is used for the reflection component 750 to abut thereon. The image surface 74 is located at an image side of the reflection component 750. Light will be reflected by the reflection component 750 after passing through the lens assembly 72 and then will be converged and image on the image surface 74.

The reflection component 750 has an optical portion 751, and the optical path 701 passes through the optical portion 751. The reflection component 750 further has, in order from the object side to the image side along the optical path 701, an incident surface 756, a first reflection surface 757*a*, a second reflection surface 757*b*, a third reflection surface 757*c*, a fourth reflection surface 757*d* and an emitting surface 758, and the optical portion 751 generates reflection on the first reflection surface 757*a* to the fourth reflection surface 757*d*. The incident surface 756 and the emitting surface 758 can be light-passable aspheric surfaces so as to provide a light convergence function or a light divergence function and thus to reduce the quantity of the components in the lens assembly 72.

The reflection component 750 further has two V-shaped grooves 759. The V-shaped grooves 759 each have two light-blocking surfaces 7591 and a plurality of curved protrusions 7592. In each V-shaped groove 759, the light-blocking surfaces 7591 are gradually spaced apart from each other from the optical portion 751 along a direction away from the optical path 701, and the curved protrusions 7592 are sequentially arranged and are connected to the light-blocking surfaces 7591.

The light-blocking membrane layer 790 is disposed adjacent to the optical portion 751 and is coated on the light-blocking surfaces 7591 and the curved protrusions 7592 of the V-shaped grooves 759 of the reflection component 750. Please refer to FIG. 57 to FIG. 58, which show the steps before and after coating the light-blocking membrane layer 790 on the reflection component 750.

The light-blocking membrane layer 790 has a distal side 791 and a proximal side 792 respectively at two ends thereof close to the V-shaped groove 759. The proximal side 792 is located closer to the optical portion 751 than the distal side 791. The proximal side 792 includes a plurality of extension structures 7921 and a plurality of recessed structures 7922. The extension structures 7921 are disposed at a side of the V-shaped groove 759 close to the optical path 701. Each of the extension structures 7921 extends along a direction away from the distal side 791, and the extension structures 7921 are not overlapped with one another in a direction in parallel with the optical path 701. The recessed structures 7922 are connected to and located between two adjacent extension structures 7921 and are recessed along a direction towards the distal side 791. In this embodiment, the extension structures 7921 can also be disposed on at least one of the incident surface 756, the first reflection surface 757*a*, the second reflection surface 757*b*, the third reflection surface 757*c*, the fourth reflection surface 757*d* and the emitting surface 758 based on actual requirements.

A thickness of the light-blocking membrane layer 790 gradually decreases from the recessed structures 7922 to the extension structures 7921. In other words, a thickness of the light-blocking membrane layer 790 gradually increases from a side of the extension structures 7921 close to the optical path 701 towards the recessed structures 7922. It is noted that for clearly showing the coating range of the light-blocking membrane layer 790, the light-blocking membrane layer 790 on the V-shaped groove 759 in FIG. 59 to FIG. 60 is not at its real scale.

When a shortest distance between the extension structures 7921 at a side farthest from the distal side 791 is ΔG, the following condition is satisfied: ΔG=75 [um].

When an average thickness of the light-blocking membrane layer 790 is T, the following condition is satisfied: 0.9 [um]≤T≤10 [um].

8th Embodiment

Figure 65:
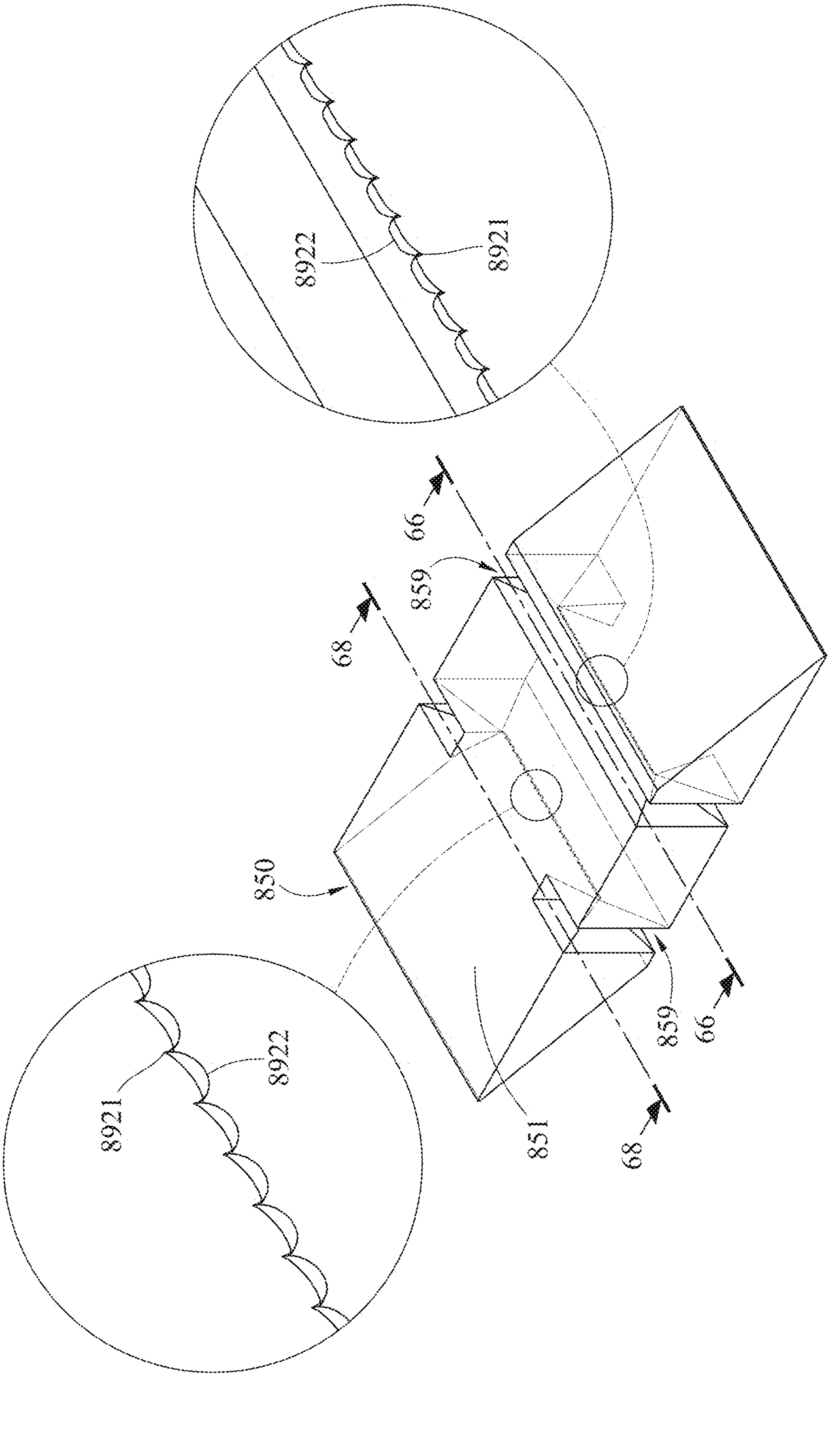
FIG. 65 is an isometric view of a reflection component of an optical unit according to the 8th embodiment of the present disclosure.
Figure 66:
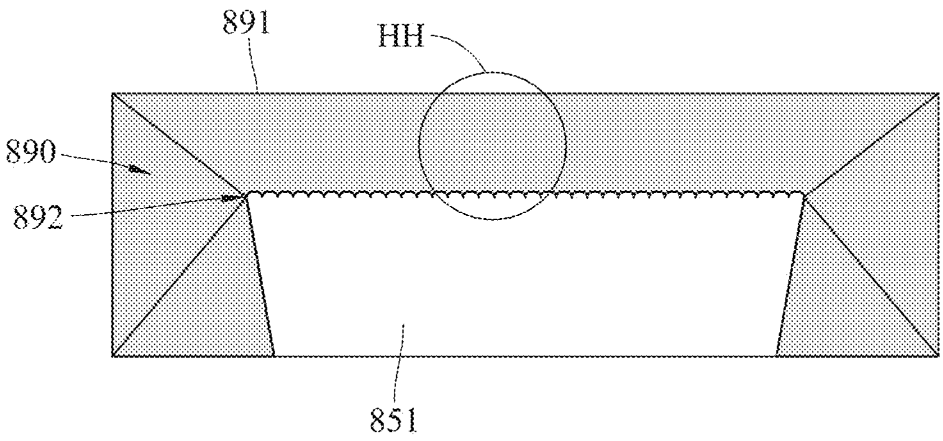
FIG. 66 is a cross-sectional view of the reflection component in FIG. 65 taken along line 66-66.
Figure 67:
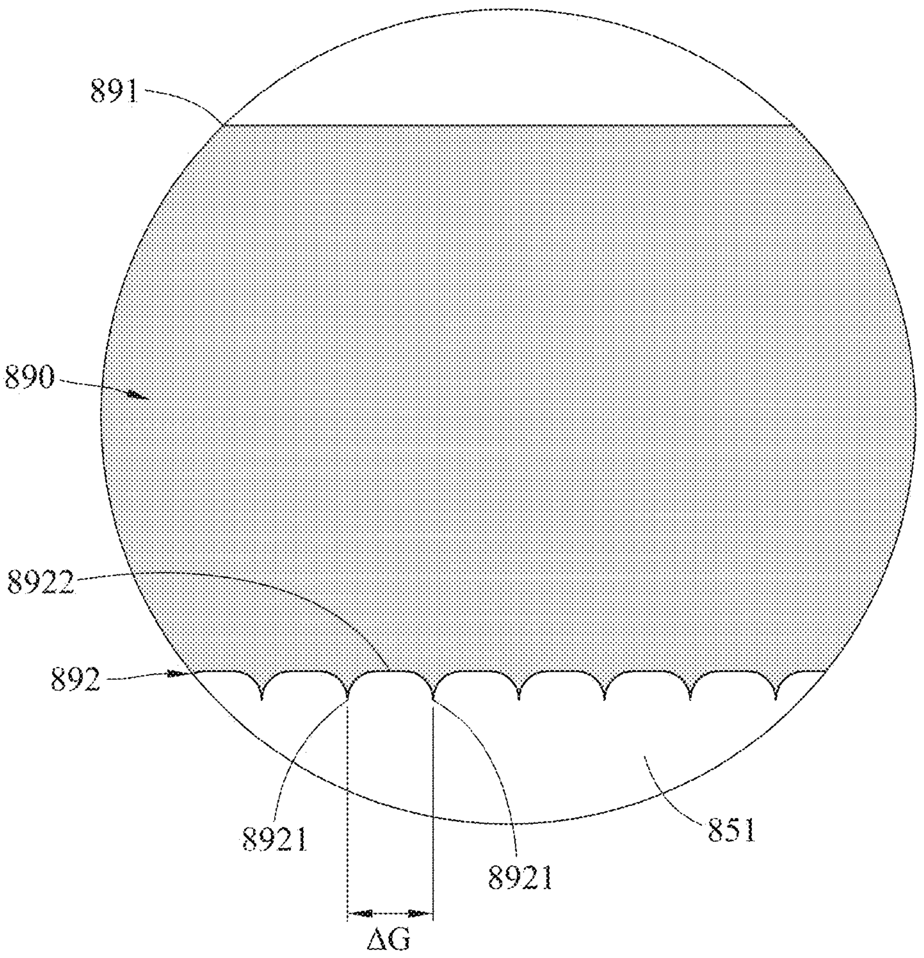
FIG. 67 is an enlarged view of HH region of the reflection component in FIG. 66.
Figure 68:
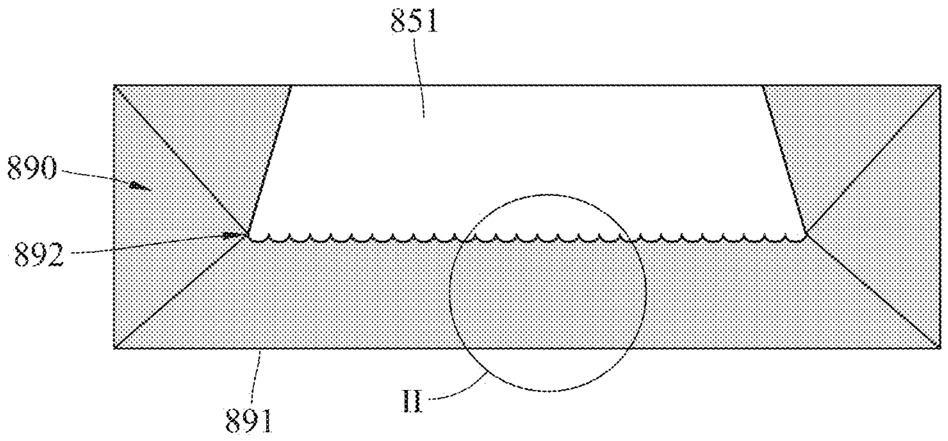
FIG. 68 is a cross-sectional view of the reflection component in FIG. 65 taken along line 68-68.
Figure 69:
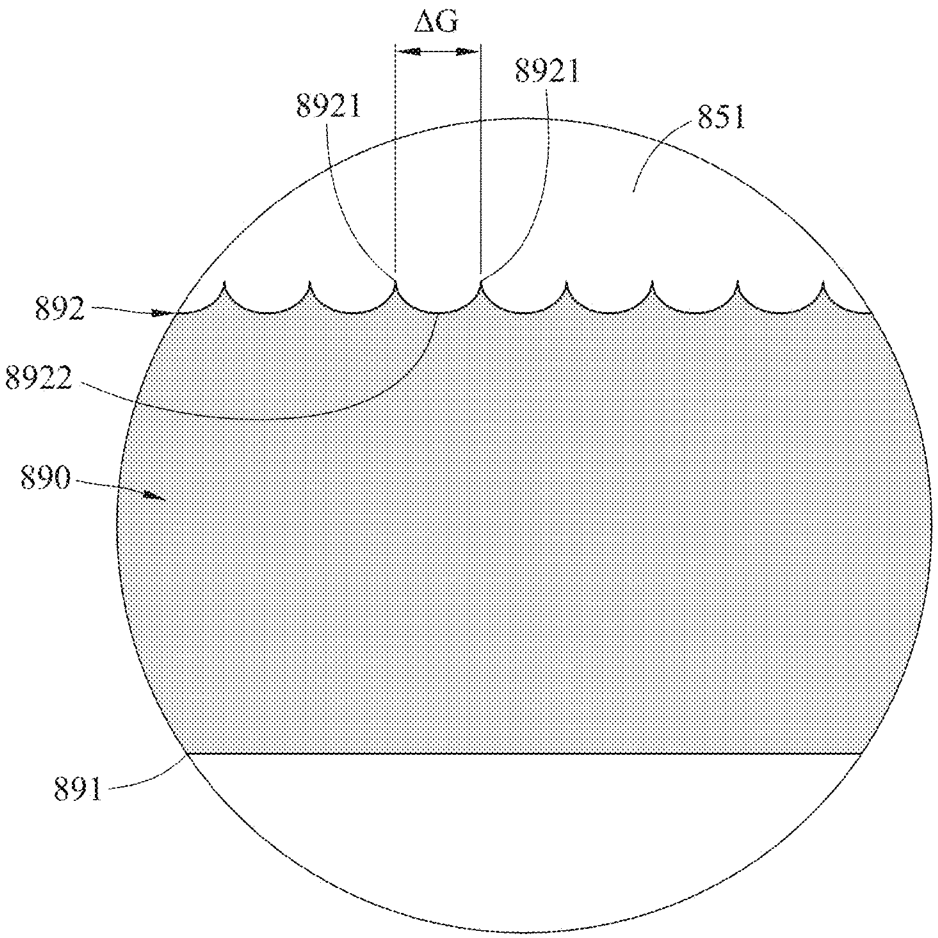
FIG. 69 is an enlarged view of II region of the reflection component in FIG. 68.

Please refer to FIG. 65 to FIG. 69, where FIG. 65 is an isometric view of a reflection component of an optical unit according to the 8th embodiment of the present disclosure, FIG. 66 is a cross-sectional view of the reflection component in FIG. 65 taken along line 66-66, FIG. 67 is an enlarged view of HH region of the reflection component in FIG. 66, FIG. 68 is a cross-sectional view of the reflection component in FIG. 65 taken along line 68-68, and FIG. 69 is an enlarged view of II region of the reflection component in FIG. 68.

Note that this embodiment is similar to the 7th embodiment, and only differences between this and the 7th embodiments will be illustrated.

The shapes of the curved protrusions 8592 of this embodiment are different from that of the curved protrusions 7592 of the 7th embodiment, such that the shape of the light-blocking membrane layer 890 coated on the curved protrusions 8592 is also different from that of the 7th embodiment, thereby causing the shapes of the extension structures 8921 and the recessed structures 8922 are also different from that of the 7th embodiment.

When a shortest distance between the extension structures 8921 at a side farthest from the distal side 891 is ΔG, the following condition is satisfied: ΔG=0.15 [um].

9th Embodiment

Figure 70:
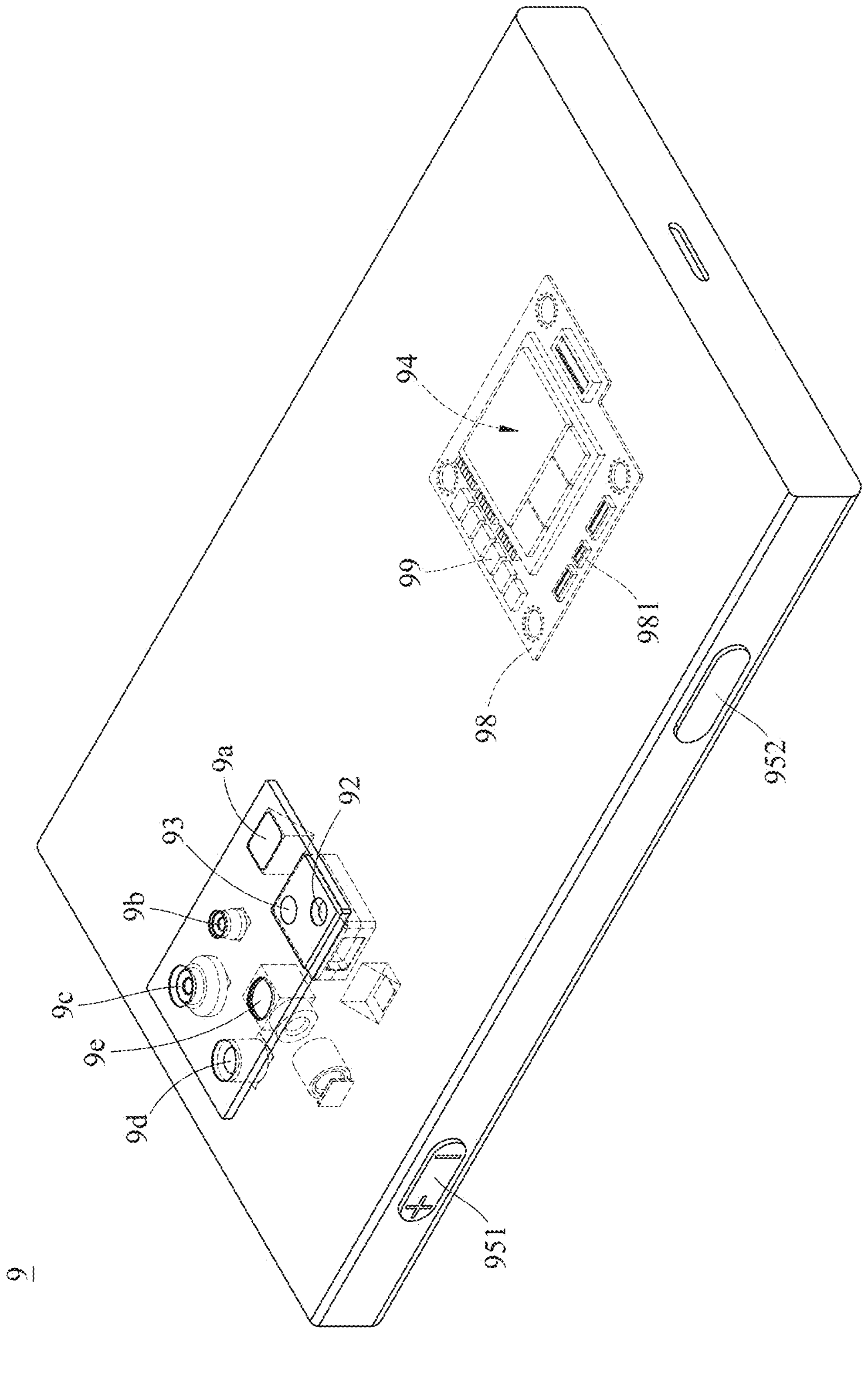
FIG. 70 is an isometric view of an electronic device according to the 9th embodiment of the present disclosure.
Figure 71:
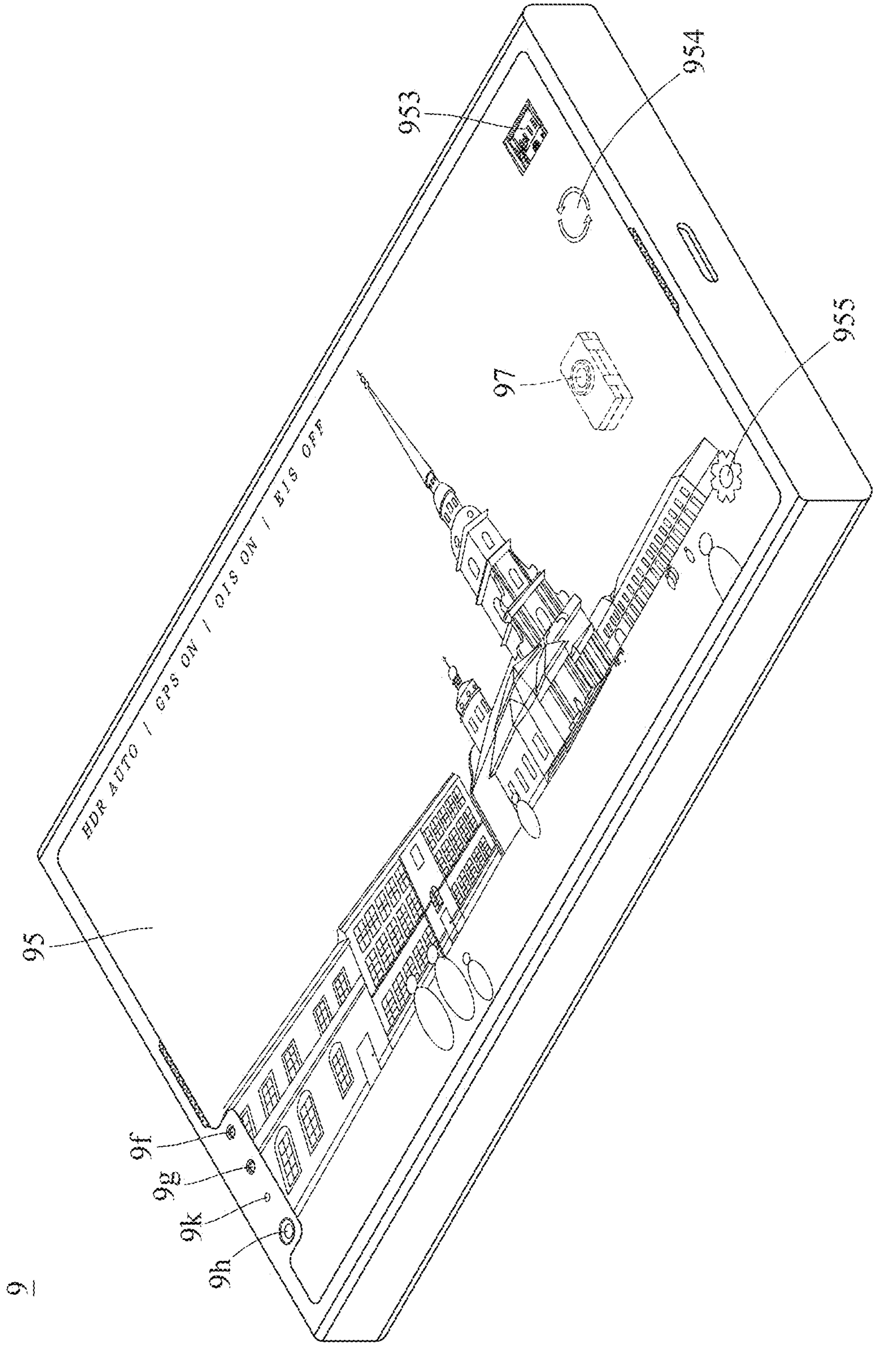
FIG. 71 is another isometric view of the electronic device in FIG. 70.
Figure 72:
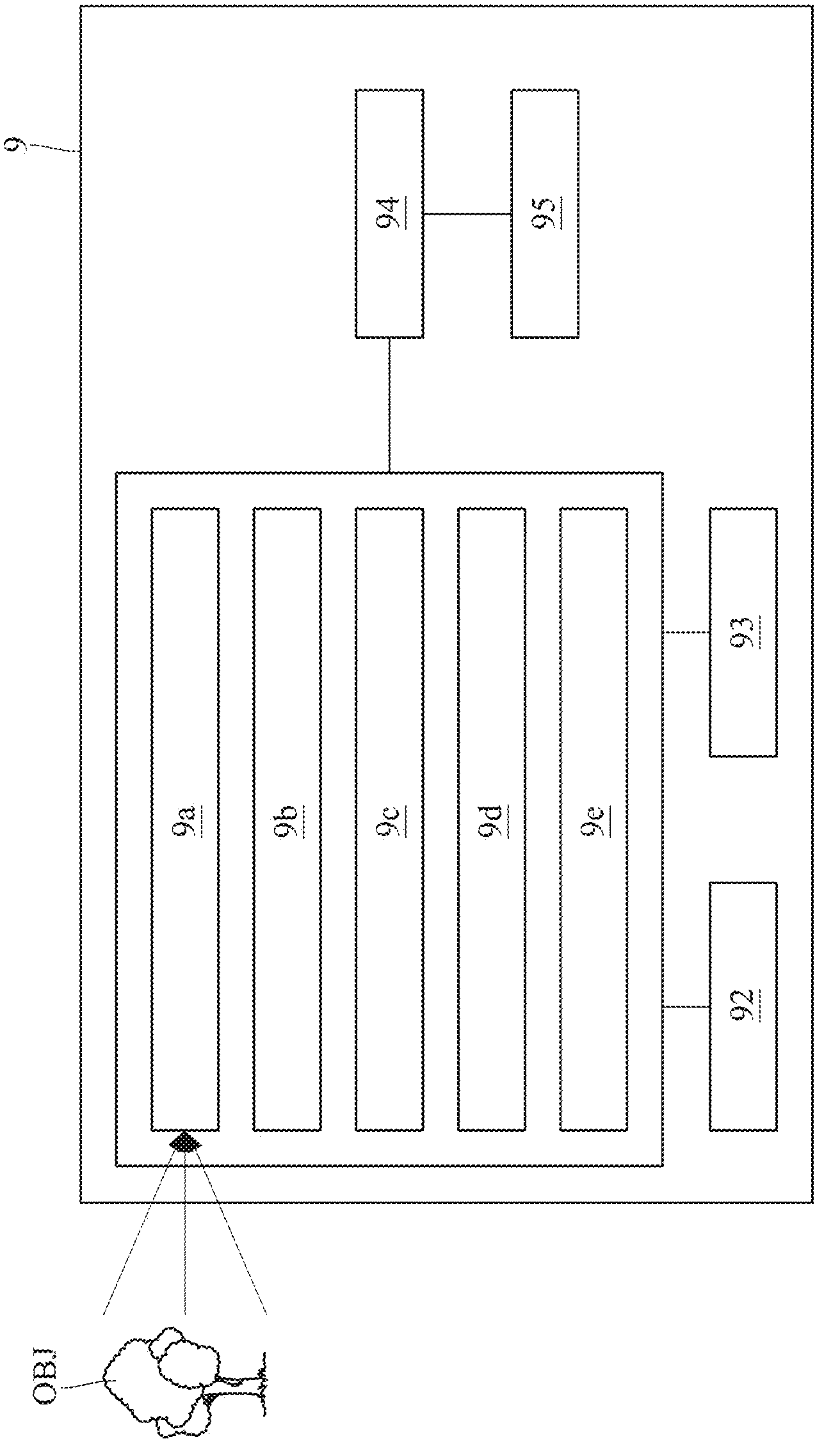
FIG. 72 is a block diagram of the electronic device in FIG. 70.

Please refer to FIG. 70 to FIG. 72, where FIG. 70 is an isometric view of an electronic device according to the 9th embodiment of the present disclosure, FIG. 71 is another isometric view of the electronic device in FIG. 70, and FIG. 72 is a block diagram of the electronic device in FIG. 70.

In this embodiment, an electronic device 9 is a mobile device such as a computer, a smartphone, a smart wearable device, a camera drone, and a driving recorder and displayer, but the present disclosure is not limited thereto. The electronic device 9 includes an optical unit 9*a*, an optical unit 9*b*, an optical unit 9*c*, an optical unit 9*d*, an optical unit 9*e*, an optical unit 9*f*, an optical unit 9*g*, an optical unit 9*h*, a flash module 92, a focus assist module 93, an image signal processor, a display module 95, an image software processor, a biometric identification device 97 and image sensor(s).

Each of the optical unit 9*a*, the optical unit 9*b*, the optical unit 9*c*, the optical unit 9*d*, the optical unit 9*e*, the optical unit 9*f*, the optical unit 9*g* and the optical unit 9*h* can include one of the lens assemblies 12-72 abovementioned in the 1st to the 7th embodiments, and the image sensor(s) can be disposed on one of the image surfaces 14-24 and 54-74 of the lens assemblies 12-22 and 52-72 for converting an optical signal into an electric signal.

The optical unit 9*a*, the optical unit 9*b*, the optical unit 9*c*, the optical unit 9*d* and the optical unit 9*e* are disposed on the same side of the electronic device 9. The optical unit 9*f*, the optical unit 9*g*, the optical unit 9*h* and the display module 95 are disposed on the opposite side of the electronic device 9. The display module 95 can be a user interface, so that the optical units 9*f*, 9*g* and 9*h* can be front-facing cameras of the electronic device 9 for taking selfies, but the present disclosure is not limited thereto.

Figure 73:
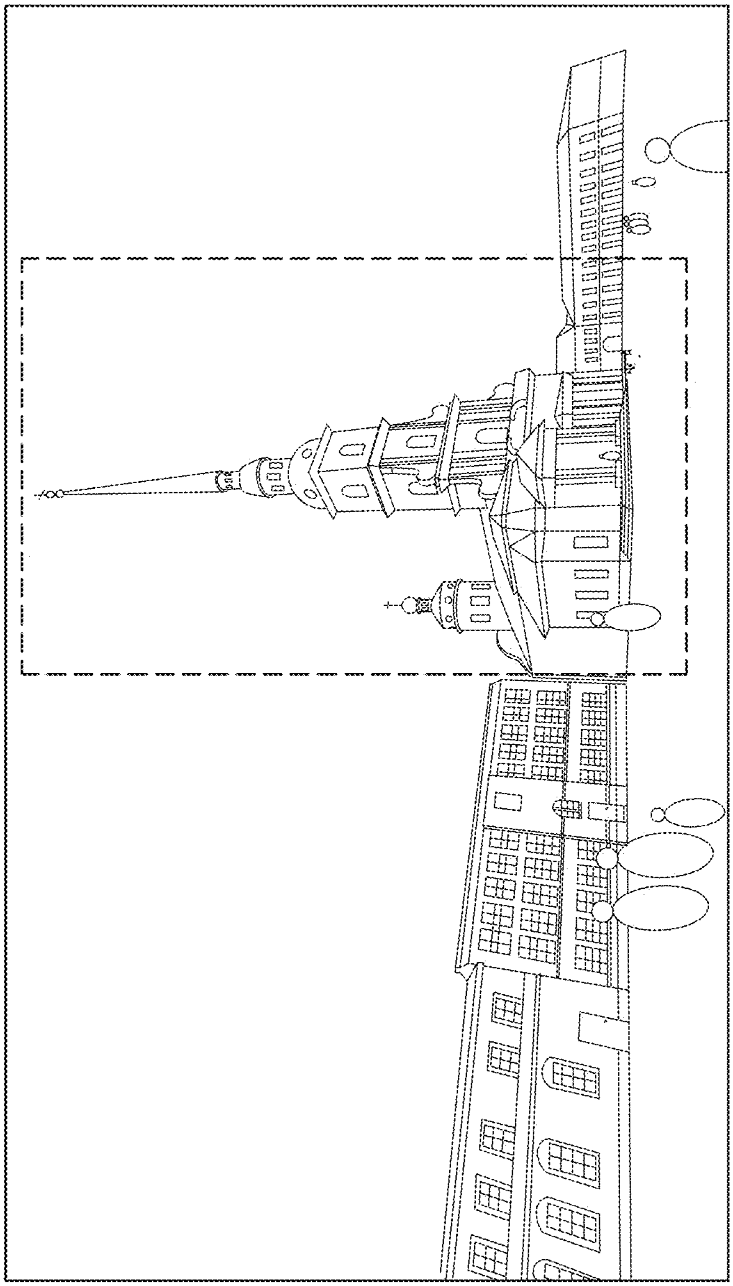
FIG. 73 shows an image captured by the electronic device in FIG. 70 with an equivalent focal length ranging between 11 mm and 14 mm.
Figure 74:
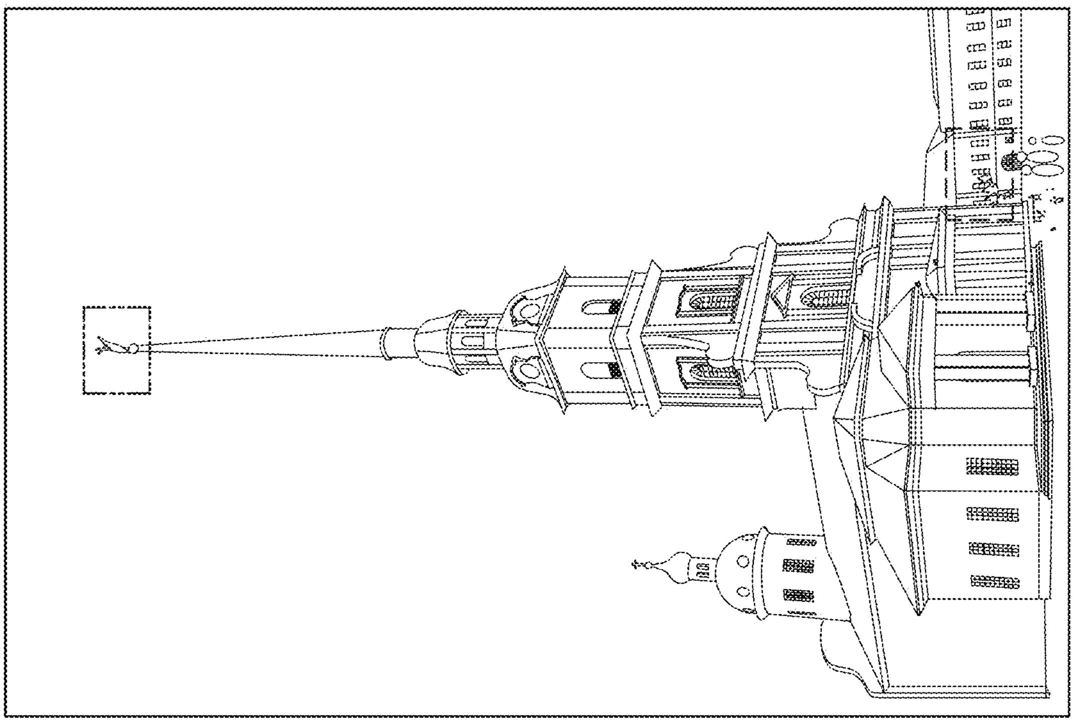
FIG. 74 shows an image captured by the electronic device in FIG. 70 with an equivalent focal length ranging between 22 mm and 30 mm.
Figure 75:
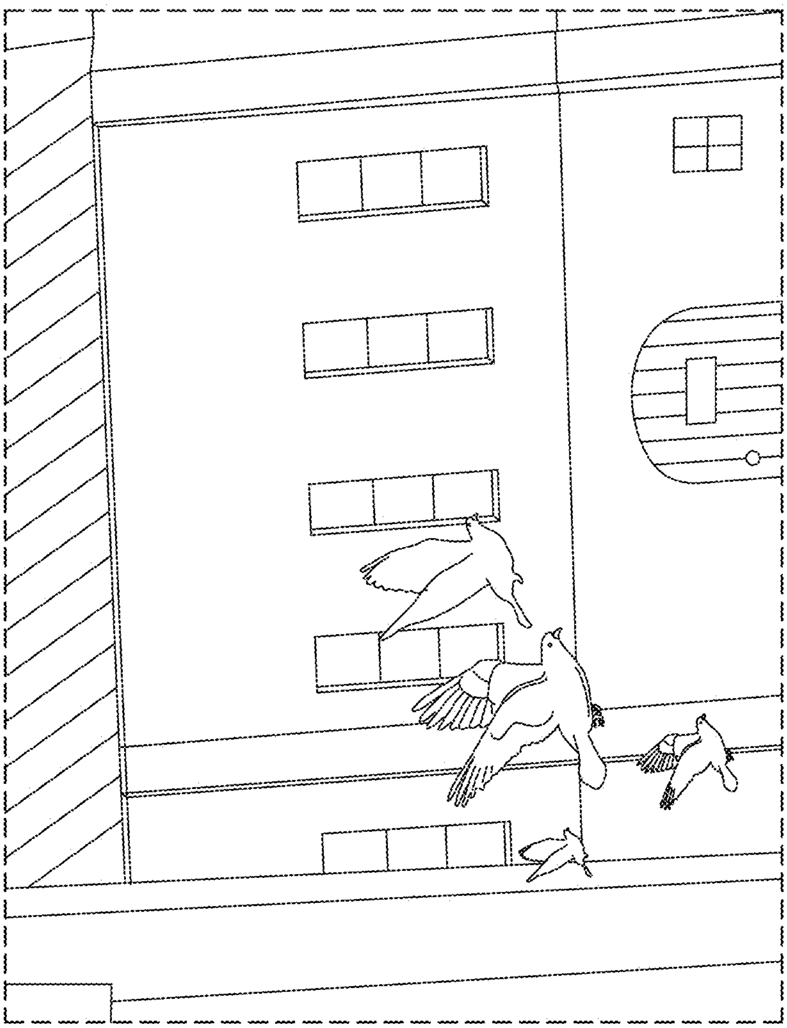
FIG. 75 shows an image captured by the electronic device in FIG. 70 with an equivalent focal length ranging between 60 mm and 300 mm.
Figure 76:
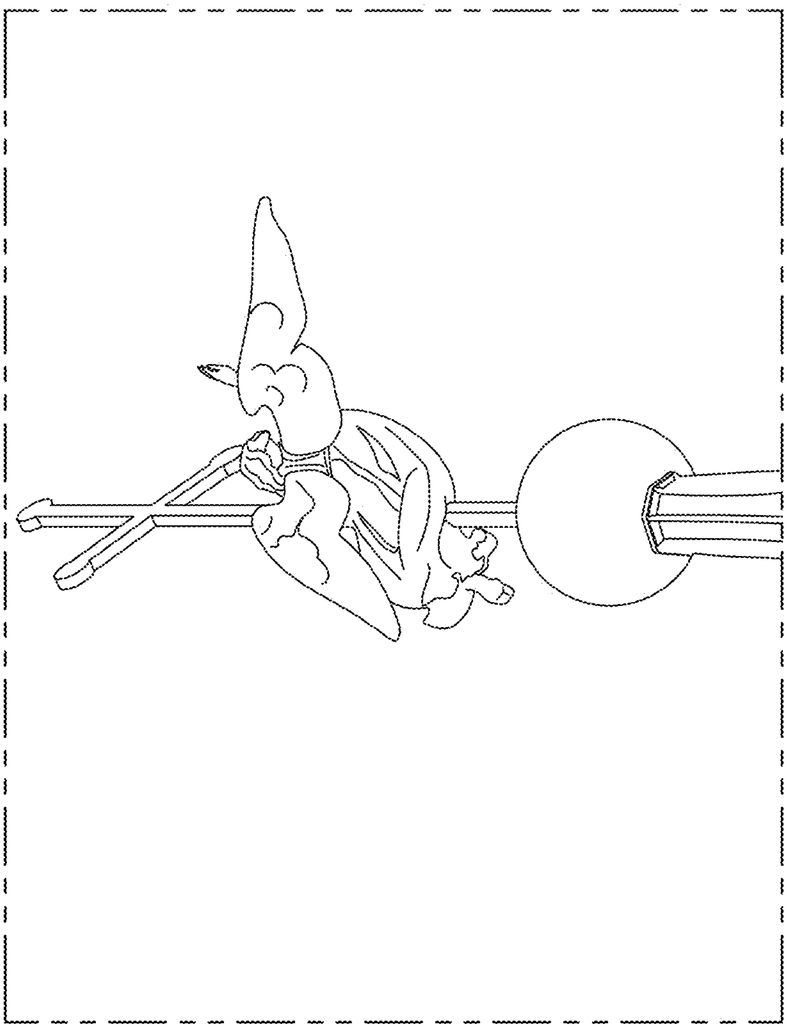
FIG. 76 shows an image captured by the electronic device in FIG. 70 with an equivalent focal length ranging between 400 mm and 600 mm.

The optical unit 9*a* is an ultra-telephoto image capturing module, the optical unit 9*b* is a macro-photo image capturing module, the optical unit 9*c* is a wide-angle image capturing module, the optical unit 9*d* is an ultra-wide-angle image capturing module, the optical unit 9*e* is a telephoto image capturing module, the optical unit 9*f* is an ultra-wide-angle image capturing module, the optical unit 9*g* is a wide-angle image capturing module, and the optical unit 9*h* is a ToF (time of flight) image capturing module. In this embodiment, the optical unit 9*a*, the optical unit 9*b*, the optical unit 9*c*, the optical unit 9*d* and the optical unit 9*e* have different fields of view, such that the electronic device 9 can have various magnification ratios so as to meet the requirement of optical zoom functionality. For example, the ultra-wide-angle image capturing module 9*d* with the maximum field of view ranging between 105 degrees and 125 degrees can achieve an image with an equivalent focal length between 11 mm and 14 mm. In this case, the image captured by the ultra-wide-angle image capturing module 9*d* can refer to FIG. 73, which shows an image captured by the electronic device 9 with an equivalent focal length ranging between 11 mm and 14 mm, and the captured image as shown in FIG. 73 includes the whole cathedral, surrounding buildings and people on the square. The captured image as shown in FIG. 73 has a relatively large field of view and depth of view, but it often has a relatively large degree of distortion. The wide-angle image capturing module 9*c* with the maximum field of view ranging between 70 degrees and 90 degrees can achieve an image with an equivalent focal length between 22 mm and 30 mm. In this case, the image captured by the wide-angle image capturing module 9*c* can refer to FIG. 74, which shows an image captured by the electronic device 9 with an equivalent focal length ranging between 22 mm and 30 mm, and the captured image as shown in FIG. 74 includes the whole cathedral and people in front of the cathedral. The zoom-telephoto image capturing module 9*e* with the maximum field of view ranging between 10 degrees and 40 degrees can achieve an image with an equivalent focal length between 60 mm and 300 mm, and the zoom-telephoto image capturing module 9*e* can be regarded as able to provide 5× magnification. In this case, the image captured by the zoom-telephoto image capturing module 9*e* can refer to FIG. 75, which shows an image captured by the electronic device 9 with an equivalent focal length ranging between 60 mm and 300 mm, and the captured image as shown in FIG. 75 includes the birds flying in front of the cathedral. The captured image as shown in FIG. 75 has a relatively small field of view and depth of view, and the zoom-telephoto image capturing module 9*e* can be used for shooting moving targets. For this, an optical element driving unit (not shown) can drive the lens assembly to quickly and continuously autofocus on the target, such that the captured image of the target would not be blurred due to long focusing distance. When imaging, the zoom-telephoto image capturing module 9*e* can further perform optical zoom for imaged objects so as to obtain clearer images. Said magnification ratio of one optical unit is defined as a ratio of the maximum focal length to the minimum focal length of the optical unit. For instance, the magnification ratio of the zoom-telephoto image capturing module 9*e* is 5× magnification. The ultra-telephoto image capturing module 9*a* with the maximum field of view ranging between 4 degrees and 8 degrees can achieve an image with an equivalent focal length between 400 mm and 600 mm. In this case, the image captured by the ultra-telephoto image capturing module 9*a* can refer to FIG. 76, which shows an image captured by the electronic device 9 with an equivalent focal length ranging between 400 mm and 600 mm, and the captured image as shown in FIG. 76 includes the angel-and-cross-topped spire of the cathedral. The captured image as shown in FIG. 76 has a further smaller field of view and depth of view, and the lens assembly of the ultra-telephoto image capturing module 9*a* may easily capture an out of focus image due to slight camera shake. For this, the optical element driving unit can provide a feedback force to correct the shake so as to achieve optical image stabilization while providing a force to drive the lens assembly of the ultra-telephoto image capturing module 9*a* to focus on a target. In addition, the optical unit 9*h* can determine depth information of the imaged object. In this embodiment, the electronic device 9 includes multiple optical unit 9*a*, 9*b*, 9*c*, 9*d*, 9*e*, 9*f*, 9*g* and 9*h*, but the present disclosure is not limited to the number and arrangement of optical units. The equivalent focal lengths to which the abovementioned optical units correspond are estimated values based on particular conversion functions, and the estimated values may be different from actual focal lengths of the optical unit due to designs of the lens assemblies and sizes of the image sensors.

When a user captures images of an object OBJ, light rays converge in the optical unit 9*a*, the optical unit 9*b*, the optical unit 9*c* or the optical unit 9*e* to generate images, and the flash module 92 is activated for light supplement. The focus assist module 93 detects the object distance of the imaged object OBJ to achieve fast auto focusing. The image signal processor is configured to optimize the captured image to improve image quality. The light beam emitted from the focus assist module 93 can be either conventional infrared or laser.

In addition, the light rays may converge in the optical unit 9*f*, 9*g* or 9*h* to generate images. The electronic device 9 can include a reminder light 9*k* that can be illuminated to remind the user that the optical unit 9*f*, 9*g* or 9*h* of the electronic device 9 is working. The display module 95 can be a touch screen or physical buttons such as a zoom button 951 and a shutter release button 952. The user is able to interact with the display module 95 and the image software processor having multiple functions to capture images and complete image processing. The image processed by the image software processor can be displayed on the display module 95. The user can replay the previously captured image through an image playback button 953 of the display module 95, can choose a suitable optical unit for shooting through an optical units switching button 954 of the display module 95, and can properly adjust shooting parameters according to current shooting situations through an integrated menu button 955 of the display module 95.

Figure 77:
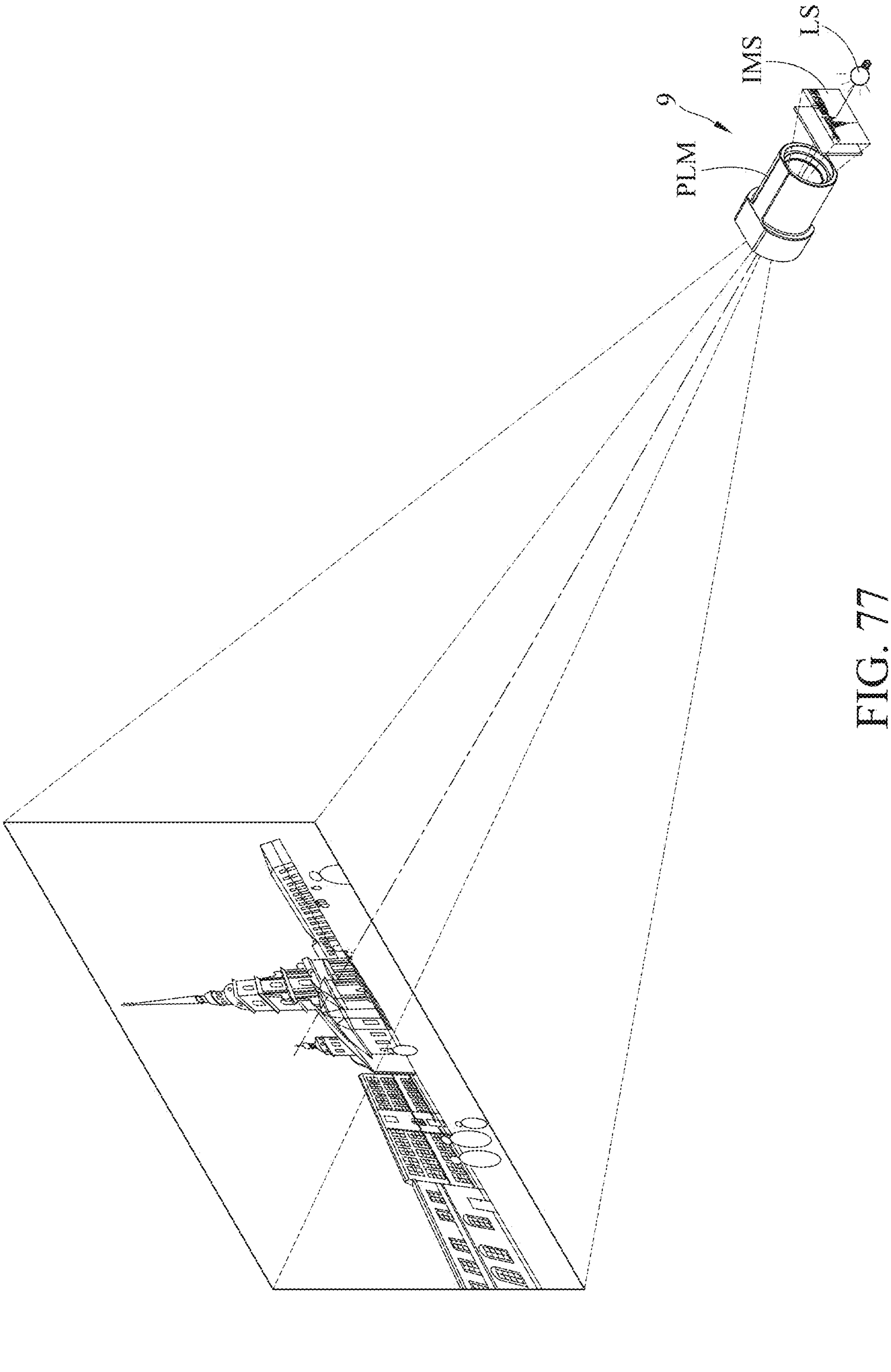
FIG. 77 to FIG. 78 show application scenarios of the electronic device in FIG. 70 as a projector.
Figure 78:
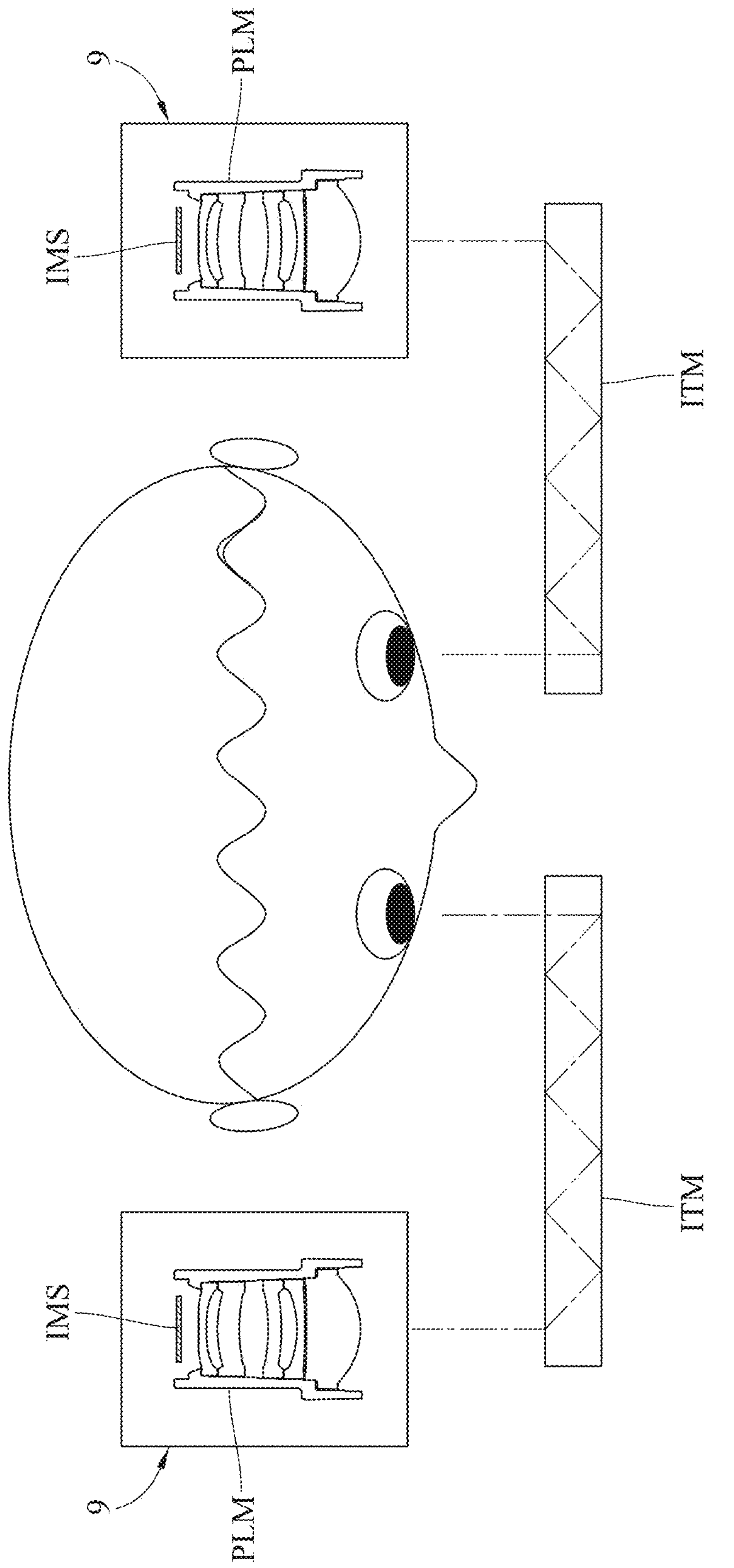

When the lens assembly in the optical unit 9*a*, the optical unit 9*b*, the optical unit 9*c*, the optical unit 9*d*, the optical unit 9*e*, the optical unit 9*f*, the optical unit 9*g* or the optical unit 9*h* is applied to a projection system, a light source LS can be disposed at the incident side of the lens assembly, such that the electronic device 9 can be used as a projector, which can refer to FIG. 77 and FIG. 78 showing application scenarios of the electronic device 9 as a projector. One or more among the optical unit 9*a*, the optical unit 9*b*, the optical unit 9*c*, the optical unit 9*d*, the optical unit 9*e*, the optical unit 9*f*, the optical unit 9*g* and the optical unit 9*h* can be used as a projection lens module PLM to project an image source IMS to a plane or human's eyes via the abovementioned lens assembly and an image transmission module ITM, wherein the image transmission module ITM can be a waveguide or an optical path folding lens assembly, but the present disclosure is not limited thereto.

Further, the electronic device 9 further includes a circuit board 98 and a plurality of electronic components 99 disposed on the circuit board 98. The optical unit 9*a*, 9*b*, 9*c*, 9*d*, 9*e*, 9*f*, 9*g*, and 9*h* are electrically connected to the electronic components 99 via connectors 981 on the circuit board 98. The electronic components 99 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, but the present disclosure is not limited thereto.

The electronic components 99 can also include a storage unit, a random access memory for storing image information, a gyroscope, and a position locator for facilitating the navigation or positioning of the electronic device 9. In this embodiment, the image signal processor, the image software processor and the random access memory are integrated into a single chip system 94, but the present disclosure is not limited thereto. In some other embodiments, the electronic components can also be integrated in the optical unit or can also be disposed on one of the circuit boards. In addition, the user can use the biometric identification device 97 to turn on and unlock the electronic device 9.

The smartphone in this embodiment is only exemplary for showing the lens assembly and the optical unit of the present disclosure installed in an electronic device, and the present disclosure is not limited thereto. The lens assembly and the optical unit can be optionally applied to optical systems with a movable focus. Furthermore, the lens assembly and the optical unit feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens assembly, having an optical path, and the lens assembly comprising:

a reflection component, having an optical portion and a V-shaped groove, wherein the optical path passes through the optical portion, the V-shaped groove has two light-blocking surfaces and a plurality of curved protrusions, the two light-blocking surfaces are gradually spaced apart from each other from the optical portion along a direction away from the optical path, and the plurality of curved protrusions are sequentially arranged and are connected to the two light-blocking surfaces; and a light-blocking membrane layer, coated on the plurality of curved protrusions and at least one of the two light-blocking surfaces of the V-shaped groove of the reflection component and adjacent to the optical portion, and the light-blocking membrane layer having:

a distal side; and a proximal side, located closer to the optical portion than the distal side, and the proximal side comprising:

two extension structures, disposed at a side of the V-shaped groove close to the optical path and extending along a direction away from the distal side, wherein the two extension structures are not overlapped with each other in a direction in parallel with the optical path; and a recessed structure, connected to the two extension structures and recessed along a direction towards the distal side;

wherein the two extension structures and the recessed structure are formed by coating the light-blocking membrane layer on the plurality of curved protrusions.

2. The lens assembly according to claim 1, wherein a thickness of the light-blocking membrane layer gradually increases from a side of the two extension structures close to the optical path towards the recessed structure.

3. The lens assembly according to claim 1, wherein the light-blocking membrane layer comprises a photosensitive layer.

4. The lens assembly according to claim 3, wherein the light-blocking membrane layer further comprises a cover layer that insulates the photosensitive layer from air.

5. The lens assembly according to claim 1, wherein an average thickness of the light-blocking membrane layer is T, and the following condition is satisfied:

$$0.9\ [\mathrm{um}] \le T \le 10\ [\mathrm{um}].$$

6. The lens assembly according to claim 1, wherein a thickness of the light-blocking membrane layer gradually decreases from the recessed structure to the two extension structures.

7. The lens assembly according to claim 1, wherein the reflection component has at least one aspheric surface where the optical portion passes.

8. The lens assembly according to claim 1, wherein the light-blocking membrane layer further has a plurality of light-blocking areas that are spaced apart from one another, the plurality of light-blocking areas comprise a first light-blocking area and a second light-blocking area, and the first light-blocking area is located closer to the optical path than the second light-blocking area;

wherein a shortest distance between the first light-blocking area and rest areas of the light-blocking membrane layer is D1, a shortest distance between the second light-blocking area and rest areas of the light-blocking membrane layer is D2, and the following condition is satisfied:

$$0.15 \le D2/D1 \le 1.5.$$

9. The lens assembly according to claim 1, wherein the reflection component further has a first light-passable opening and a second light-passable opening that are surrounded by the light-blocking membrane layer, and the first light-passable opening is closer to the optical path than the second light-passable opening;

wherein a reference plane perpendicular to the optical path is defined, a projection area of the first light-passable opening on the reference plane is HA1, a shortest distance between the first light-passable opening and the optical path on the reference plane is HD1, a projection area of the second light-passable opening on the reference plane is HA2, a shortest distance between the second light-passable opening and the optical path on the reference plane is HD2, and the following condition is satisfied:

$$0.02 \le (HA2\hat{\ }0.5/HD2)/(HA1\hat{\ }0.5/HD1) \le 0.98.$$

10. The lens assembly according to claim 1, wherein the reflection component has an incident surface, at least one reflection surface and an emitting surface that are sequentially passed by the optical portion along the optical path, and the two extension structures are disposed on one of the incident surface, the at least one reflection surface and the emitting surface.

11. The lens assembly according to claim 1, wherein the reflection component further has:

an optical surface where the optical portion passes; and a connection surface, connected to the optical surface with a boundary;

wherein the light-blocking membrane layer is coated on the optical surface and the boundary, and the two extension structures are coated on part of the optical surface.

12. An optical unit, comprising:

the lens assembly of claim 1.

13. An electronic device, comprising:

the optical unit of claim 12.

14. A lens assembly, having an optical path, and the lens assembly comprising:

an optical component, having an optical portion and a V-shaped groove, wherein the optical path passes through the optical portion, the V-shaped groove has a plurality of protrusions that are sequentially arranged; and a light-blocking membrane layer, coated on the plurality of protrusions of the optical component and adjacent to the optical portion, and the light-blocking membrane layer having:

a distal side; and a proximal side, located closer to the optical portion than the distal side, and the proximal side comprising:

two extension structures, extending along a direction away from the distal side, wherein the two extension structures are not overlapped with each other in a direction in parallel with the optical path; and a recessed structure, connected to the two extension structures and recessed along a direction towards the distal side;

wherein the two extension structures and the recessed structure are formed by coating the light-blocking membrane layer on the plurality of protrusions.

15. The lens assembly according to claim 14, wherein a thickness of the light-blocking membrane layer gradually increases from a side of the two extension structures close to the optical path towards the recessed structure.

16. The lens assembly according to claim 14, wherein the light-blocking membrane layer comprises a photosensitive layer.

17. The lens assembly according to claim 16, wherein the light-blocking membrane layer further comprises a cover layer that insulates the photosensitive layer from air.

18. The lens assembly according to claim 14, wherein an average thickness of the light-blocking membrane layer is T, and the following condition is satisfied:

$$0.9\ [\mathrm{um}] \le T \le 10\ [\mathrm{um}].$$

19. The lens assembly according to claim 14, wherein a thickness of the light-blocking membrane layer gradually decreases from the recessed structure to the two extension structures.

20. The lens assembly according to claim 14, wherein the optical component has at least one aspheric surface where the optical portion passes.

21. The lens assembly according to claim 14, wherein the light-blocking membrane layer further has a plurality of light-blocking areas that are spaced apart from one another, the plurality of light-blocking areas comprise a first light-blocking area and a second light-blocking area, and the first light-blocking area is located closer to the optical path than the second light-blocking area;

wherein a shortest distance between the first light-blocking area and rest areas of the light-blocking membrane layer is D1, a shortest distance between the second light-blocking area and rest areas of the light-blocking membrane layer is D2, and the following condition is satisfied:

$$0.15 \le D2/D1 \le 1.5.$$

22. The lens assembly according to claim 14, wherein the optical component further has a first light-passable opening and a second light-passable opening that are surrounded by the light-blocking membrane layer, and the first light-passable opening is closer to the optical path than the second light-passable opening;

wherein a reference plane perpendicular to the optical path is defined, a projection area of the first light-passable opening on the reference plane is HA1, a shortest distance between the first light-passable opening and the optical path on the reference plane is HD1, a projection area of the second light-passable opening on the reference plane is HA2, a shortest distance between the second light-passable opening and the optical path on the reference plane is HD2, and the following condition is satisfied:

$$0.02 \le (HA2\hat{}0.5/HD2)/(HA1\hat{}0.5/HD1) \le 0.98.$$

23. The lens assembly according to claim 14, wherein the optical component has an incident surface, at least one reflection surface and an emitting surface that are sequentially passed by the optical portion along the optical path, and the two extension structures are disposed on one of the incident surface, the at least one reflection surface and the emitting surface.

24. The lens assembly according to claim 14, wherein the optical component further has:

an optical surface where the optical portion passes; and a connection surface, connected to the optical surface with a boundary;

wherein the light-blocking membrane layer is coated on the optical surface and the boundary, and the two extension structures are coated on part of the optical surface.

25. An optical unit, comprising:

the lens assembly of claim 14.

26. An electronic device, comprising:

the optical unit of claim 25.

* * * * *